US012356094B2

United States Patent
Makigawa et al.

(10) Patent No.: US 12,356,094 B2
(45) Date of Patent: Jul. 8, 2025

(54) EVENT DETECTION DEVICE

(71) Applicant: Sony Semiconductor Solutions Corporation, Kanagawa (JP)

(72) Inventors: Kiyoshi Makigawa, Kanagawa (JP); Norio Shoji, Kanagawa (JP); Yusuke Ikeda, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 124 days.

(21) Appl. No.: 18/547,949

(22) PCT Filed: Jan. 17, 2022

(86) PCT No.: PCT/JP2022/001326
§ 371 (c)(1),
(2) Date: Aug. 25, 2023

(87) PCT Pub. No.: WO2022/196068
PCT Pub. Date: Sep. 22, 2022

(65) Prior Publication Data
US 2024/0187754 A1   Jun. 6, 2024

(30) Foreign Application Priority Data

Mar. 15, 2021   (JP) .................................. 2021-041389

(51) Int. Cl.
*H04N 25/47*     (2023.01)
*H04N 25/709*    (2023.01)
*H04N 25/78*     (2023.01)

(52) U.S. Cl.
CPC ........... *H04N 25/47* (2023.01); *H04N 25/709* (2023.01); *H04N 25/78* (2023.01)

(58) Field of Classification Search
CPC ....... H04N 25/47; H04N 25/709; H04N 25/78
See application file for complete search history.

(56) References Cited

U.S. PATENT DOCUMENTS 8,094,226 B2 * 1/2012 Hattori .................. H04N 25/76
348/308
11,483,507 B2 * 10/2022 Niwa ................... H04N 25/671
(Continued)

FOREIGN PATENT DOCUMENTS

| JP | 2018136491 A | 8/2018 |
| JP | 2019195135 A | 11/2019 |
| WO | 2020066432 A1 | 4/2020 |

OTHER PUBLICATIONS

International Search Report (PCT/ISA/210), International Application No. PCT/JP2022/001326, dated Mar. 8, 2022.

*Primary Examiner* — Nicholas G Giles
(74) *Attorney, Agent, or Firm* — Michael Best & Friedrich LLP

(57) ABSTRACT

Event detection devices are disclosed. in one example, an event detection device includes a photodiode that generates a photoelectric conversion current, a conversion transistor that converts the photoelectric conversion current into a voltage and outputs the voltage from a gate, an amplification transistor that amplifies a voltage between a gate having a potential according to the photoelectric conversion current and a source having a reference potential and outputs the voltage from a drain, a potential supply unit that supplies a predetermined potential lower than the reference potential to an anode of the photodiode, a back gate of the conversion transistor, and a back gate of the amplification transistor, and a potential controller that controls the predetermined potential based on a temperature affectable to a threshold voltage of at least one of the conversion transistor or the amplification transistor.

20 Claims, 41 Drawing Sheets

(56) References Cited

U.S. PATENT DOCUMENTS

2009/0251576 A1* 10/2009 Hattori .................. H04N 25/76
348/294
2018/0058926 A1     3/2018  Suh
2020/0260032 A1*  8/2020  Niwa ..................... H04N 25/75

* cited by examiner

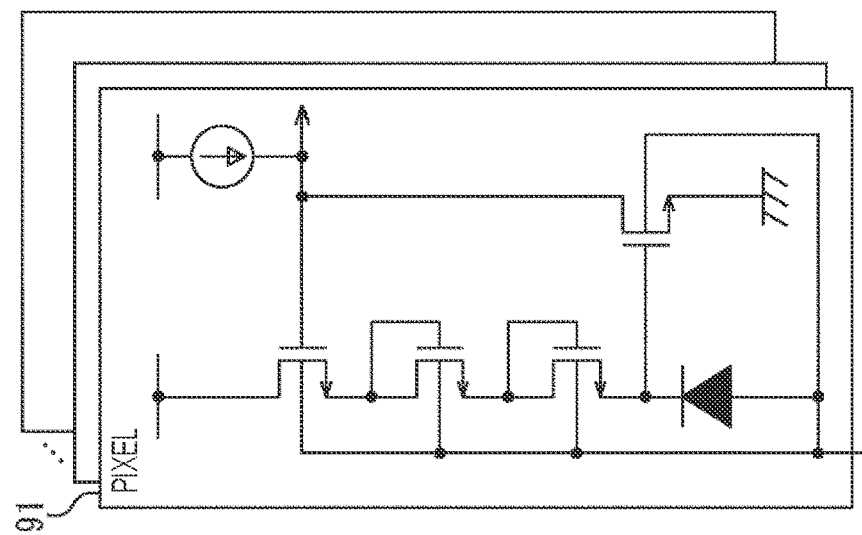
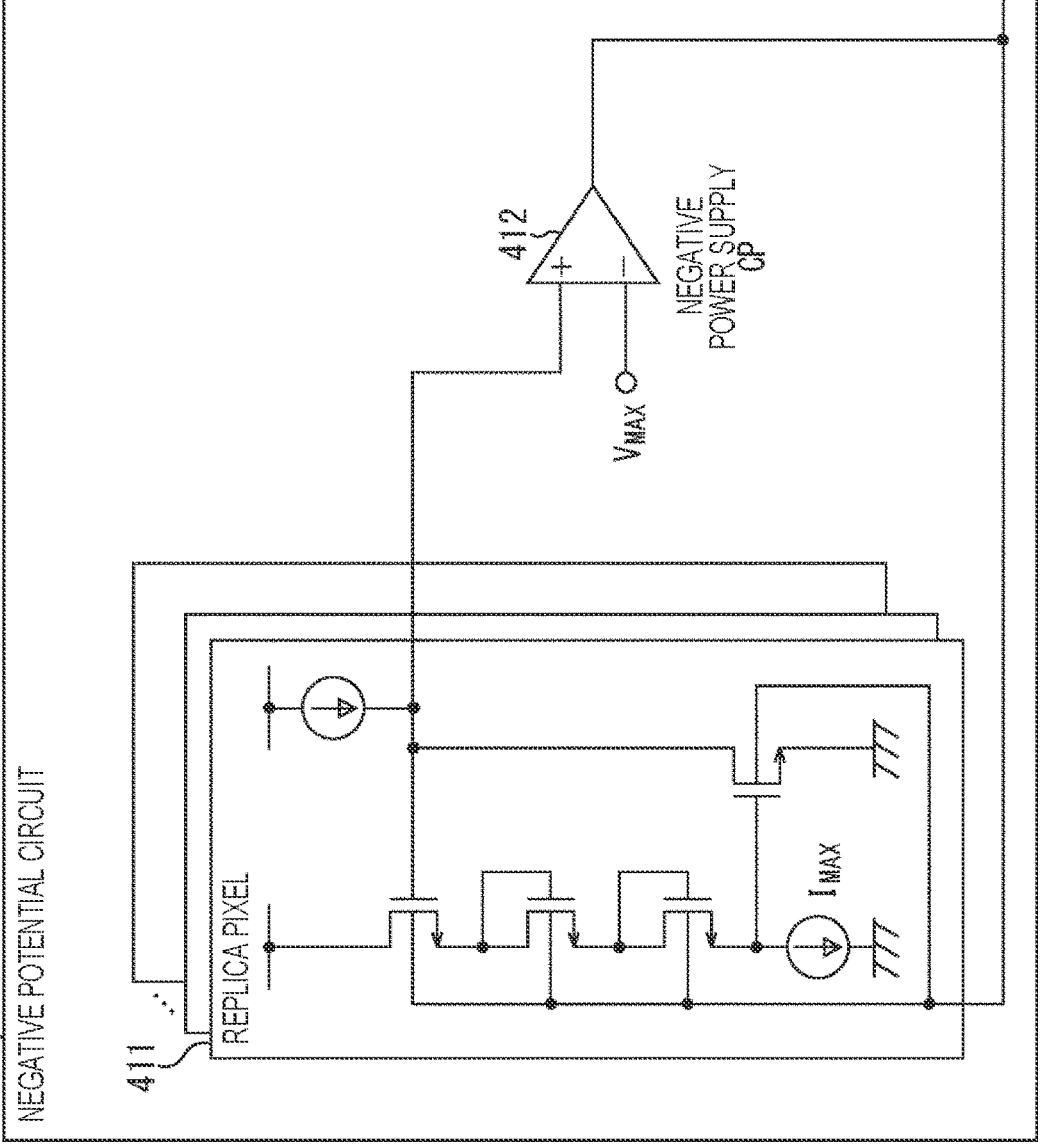
FIG. 33

FIG. 36
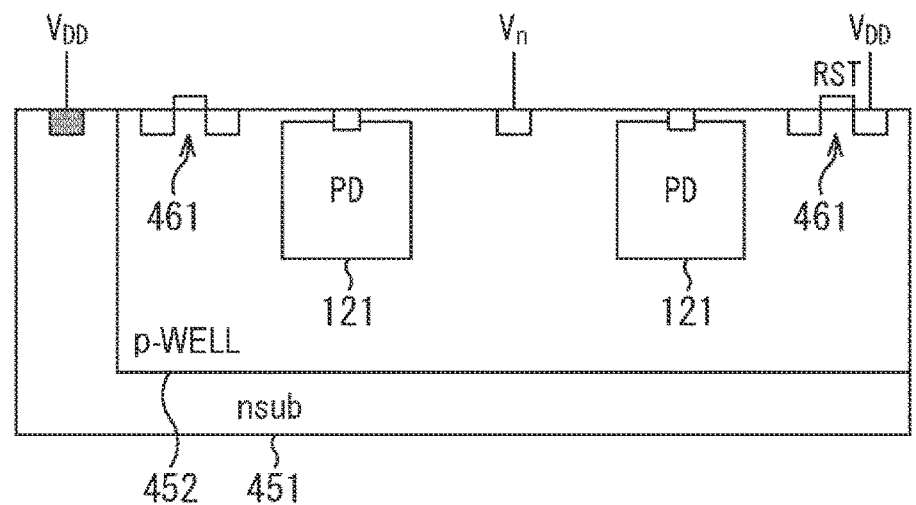
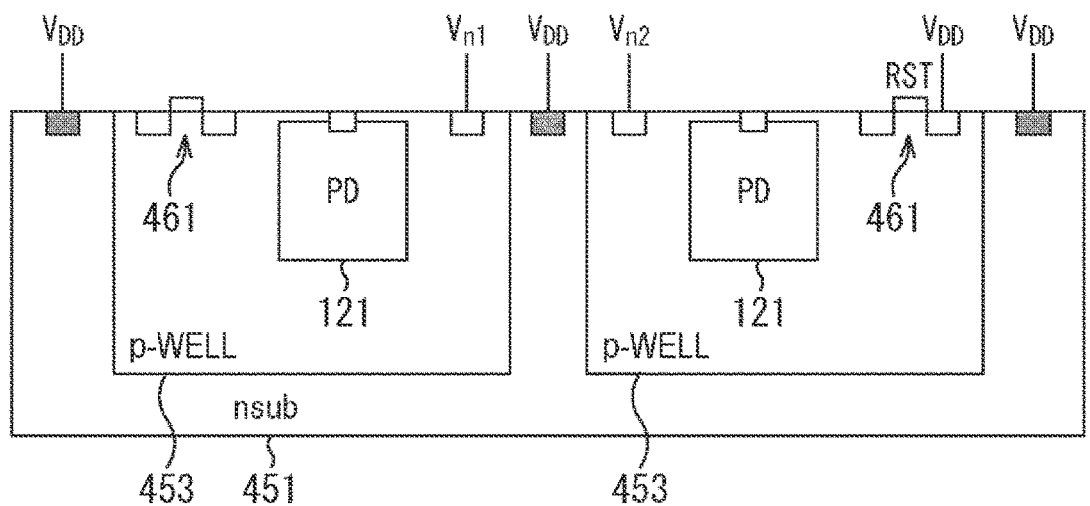

EVENT DETECTION DEVICE

TECHNICAL FIELD

The present technology relates to an event detection device, and particularly to an event detection device that can achieve a voltage-current conversion circuit capable of converting a photoelectric conversion current into a voltage more appropriately.

BACKGROUND ART

An asynchronous solid-state imaging element having an address event detection circuit for each pixel has been proposed, the address event detection circuit detecting, for every pixel address, that an amount of light of the pixel exceeds a threshold value as an address event in real time. In this solid-state imaging element, a photodiode and a voltage-current conversion circuit that outputs a voltage obtained by converting a current flowing through the photodiode are disposed for each pixel.

In order to improve the characteristics of the voltage-current conversion circuit, for example, Patent Document 1 discloses that a fixed negative potential is supplied to a substrate provided with a photodiode.

CITATION LIST

Patent Document

Patent Document 1: Japanese Patent Application Laid-Open No. 2019-195135

SUMMARY OF THE INVENTION

Problems to be Solved by the Invention

In the technology disclosed in Patent Document 1, since the gain of the voltage-current conversion circuit is low, there is a possibility that a signal-noise rate (SNR) of a pixel signal generated on the basis of a voltage signal output from the voltage-current conversion circuit becomes low.

In addition, in the technology disclosed in Patent Document 1, since an output voltage of the voltage-current conversion circuit greatly depends on temperature, there is a possibility that a sufficient dynamic range cannot be secured in a case where an output range of the output voltage becomes large.

The present technology has been made in view of such circumstances, and an object of the present technology is to achieve a voltage-current conversion circuit capable of converting a photoelectric conversion current into a voltage more appropriately.

Solutions to Problems

An event detection device according to a first aspect of the present technology includes a photodiode that photoelectrically converts incident light and generates a photoelectric conversion current, a conversion transistor that converts the photoelectric conversion current into a voltage and outputs the voltage from a gate, an amplification transistor that amplifies a voltage between a gate having a potential according to the photoelectric conversion current and a source having a reference potential determined in advance and outputs the voltage from a drain, a potential supply unit that supplies a predetermined potential lower than the reference potential to an anode of the photodiode, a back gate of the conversion transistor, and a back gate of the amplification transistor, and a potential controller that controls the predetermined potential on the basis of information regarding a temperature affectable to a threshold voltage of at least one of the conversion transistor or the amplification transistor.

An event detection device according to a second aspect of the present technology includes a photodiode that photoelectrically converts incident light and generates a photoelectric conversion current, a first conversion transistor that converts the photoelectric conversion current into a voltage and outputs the voltage from a gate, a second conversion transistor that has a drain short-circuited to a gate and converts the photoelectric conversion current to a voltage and outputs the voltage from a gate, an amplification transistor that amplifies a voltage between a gate having a potential according to the photoelectric conversion current and a source having a reference potential determined in advance and outputs the voltage from a drain, and a potential supply unit that supplies a predetermined potential lower than the reference potential to an anode of the photodiode, a back gate of the first conversion transistor, a back gate of the second conversion transistor, and a back gate of the amplification transistor.

In the first aspect of the present technology, a predetermined potential lower than the reference potential is supplied to an anode of a photodiode that photoelectrically converts incident light and generates a photoelectric conversion current, a back gate of a conversion transistor that converts the photoelectric conversion current into a voltage and outputs the voltage from a gate, and a back gate of an amplification transistor that amplifies a voltage between a gate having a potential according to the photoelectric conversion current and a source having a reference potential determined in advance and outputs the voltage from a drain, and the predetermined potential is controlled on the basis of information regarding a temperature affectable to a threshold voltage of at least one of the conversion transistor or the amplification transistor.

In the second aspect of the present technology, a predetermined potential lower than the reference potential is supplied to an anode of a photodiode that photoelectrically converts incident light and generates a photoelectric conversion current, a back gate of a first conversion transistor that converts the photoelectric conversion current into a voltage and outputs the voltage from a gate, a back gate of a second conversion transistor that has a drain short-circuited to a gate and converts the photoelectric conversion current into a voltage and outputs the voltage from a gate, and a back gate of an amplification transistor that amplifies a voltage between a gate having a potential according to the photoelectric conversion current and a source having a reference potential determined in advance and outputs the voltage from a drain.

BRIEF DESCRIPTION OF DRAWINGS

FIG. 33 is a circuit diagram illustrating another configuration example of the negative potential supply unit and the negative potential controller.

FIG. 36 is an enlarged sectional view of a substrate of a light receiving circuit of the light receiving substrate.

MODE FOR CARRYING OUT THE INVENTION

Hereinafter, a mode for carrying out the present technology will be described. Note that the description will be given in the following order.
1. Embodiment
2. Modifications 1. Embodiment Configuration Example of Imaging Device FIG. 1 is a block diagram illustrating a configuration example of an imaging device 1 according to an embodiment of the present technology.

Figure 1:
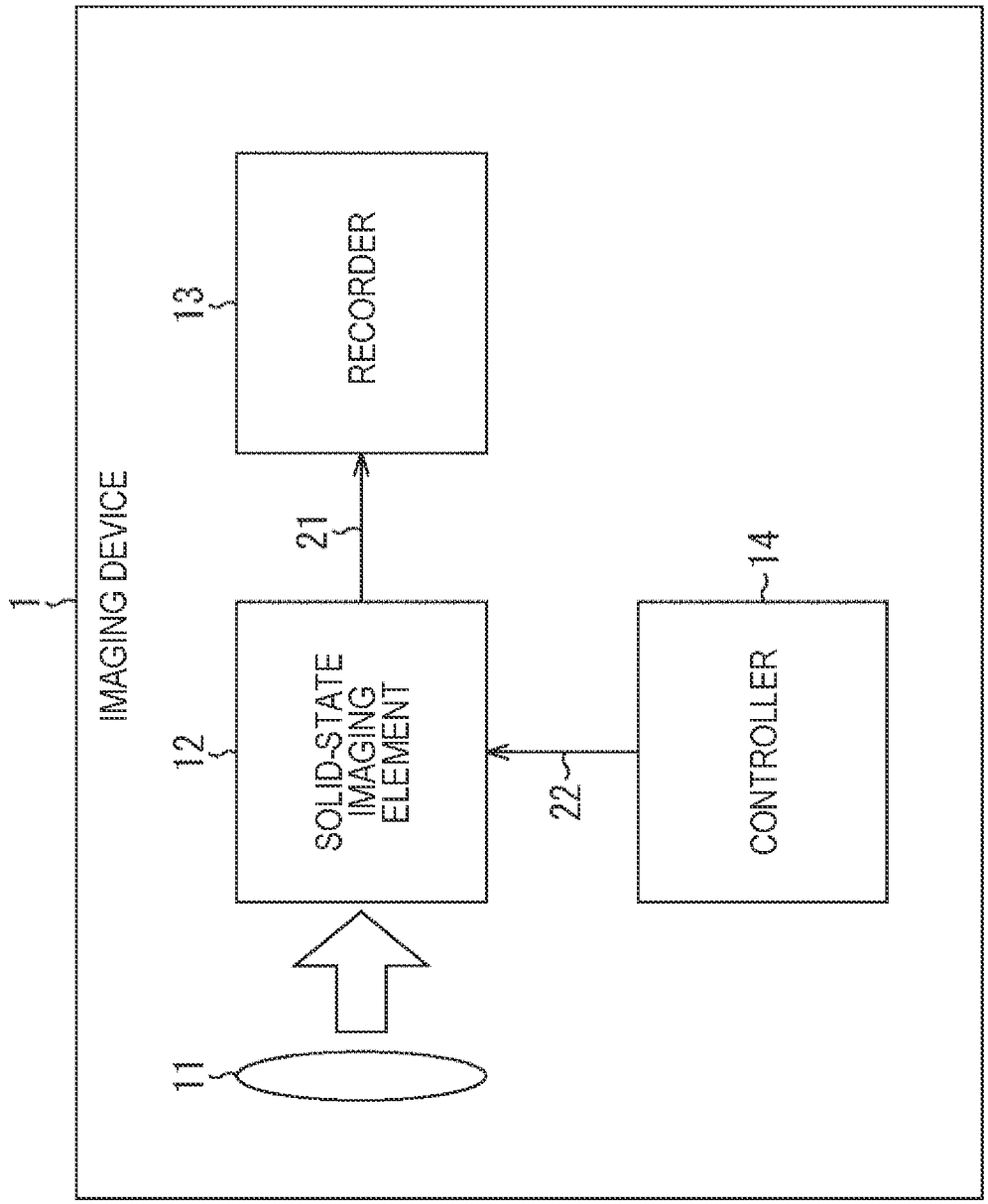
FIG. 1 is a block diagram illustrating a configuration example of an imaging device according to an embodiment of the present technology.

As illustrated in FIG. 1, the imaging device 1 includes an imaging lens 11, a solid-state imaging element 12, a recorder 13, and a controller 14. As the imaging device 1, a camera mounted on a wearable device, a smartphone, a mobile phone, or the like, an in-vehicle camera, a digital still camera, a digital video camera, or the like is assumed.

The imaging lens 11 condenses incident light from a subject and guides the light to the solid-state imaging element 12.

The solid-state imaging element 12 is an example of an event detection device to which the present technology is applied. The solid-state imaging element 12 detects, as an address event, that an absolute value of a change amount in luminance exceeds a threshold value, for every of a plurality of pixels. This address event includes, for example, an on-event indicating that an amount of increase in luminance exceeds an upper limit threshold value and an off-event indicating that an amount of decrease in luminance falls below a lower limit threshold value less than the upper limit threshold value.

The solid-state imaging element 12 generates a detection signal indicating a detection result of the address event for each pixel. Each detection signal includes an on-event detection signal VCH indicating the presence or absence of an on-event and an off-event detection signal VCL indicating the presence or absence of an off-event. Note that, although detecting the presence or absence of both the on-event and the off-event, the solid-state imaging element 12 can detect only one of the on-event or the off-event.

The solid-state imaging element 12 executes predetermined signal processing such as image recognition processing of image data including the detection signal, and outputs the processed data to the recorder 13 via a signal line 21.

The recorder 13 is a memory or a storage such as a random access memory (RAM), and records data supplied from the solid-state imaging element 12.

The controller 14 is a processor such as a microcontroller or a central processing unit (CPU), supplies a control signal via a signal line 22, and controls the solid-state imaging element 12 to capture image data.

Configuration Example of Solid-State Imaging Element

Figure 2:
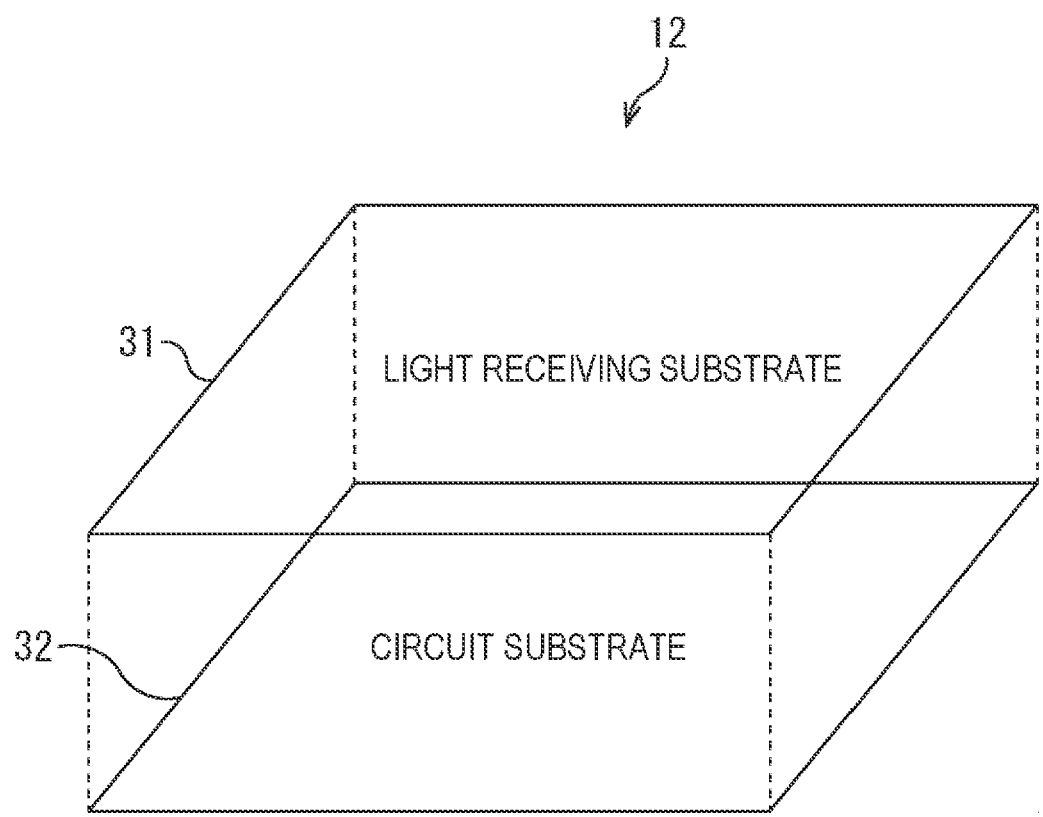
FIG. 2 is a diagram illustrating an example of a stacked structure of a solid-state imaging element.

FIG. 2 is a diagram illustrating an example of a stacked structure of the solid-state imaging element 12.

As illustrated in FIG. 2, the solid-state imaging element 12 includes a circuit substrate 32 and a light receiving substrate 31 stacked on the circuit substrate 32. These substrates are electrically connected via a connection portion such as a via. Note that the substrates can be connected by Cu—Cu bonding or a bump instead of a via.

Figure 3:
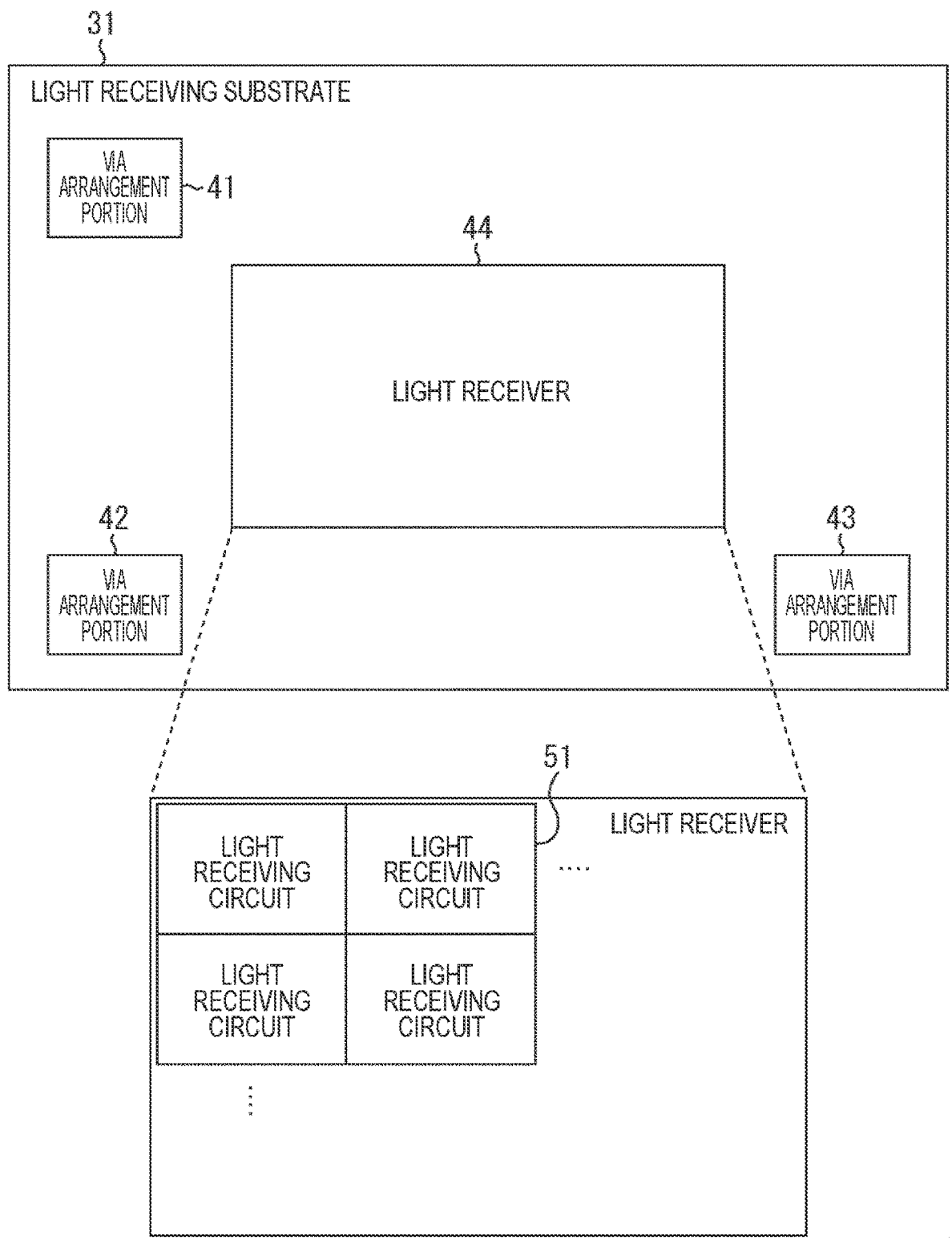
FIG. 3 is a plan view illustrating an example of a light receiving substrate.

FIG. 3 is a plan view illustrating an example of the light receiving substrate 31.

As illustrated in FIG. 3, the light receiving substrate 31 is provided with via arrangement portions 41 to 43 and a light receiver 44.

In the via arrangement portions 41 to 43, a via connected to the circuit substrate 32 is disposed.

In the light receiver 44, a plurality of light receiving circuits 51 is arranged in a two-dimensional lattice pattern. The light receiving circuit 51 photoelectrically converts incident light to generate a photoelectric conversion current, and performs voltage-current conversion of the photoelectric conversion current to output a voltage signal. A pixel address including a row address and a column address is assigned to each of the light receiving circuits 51.

Figure 4:
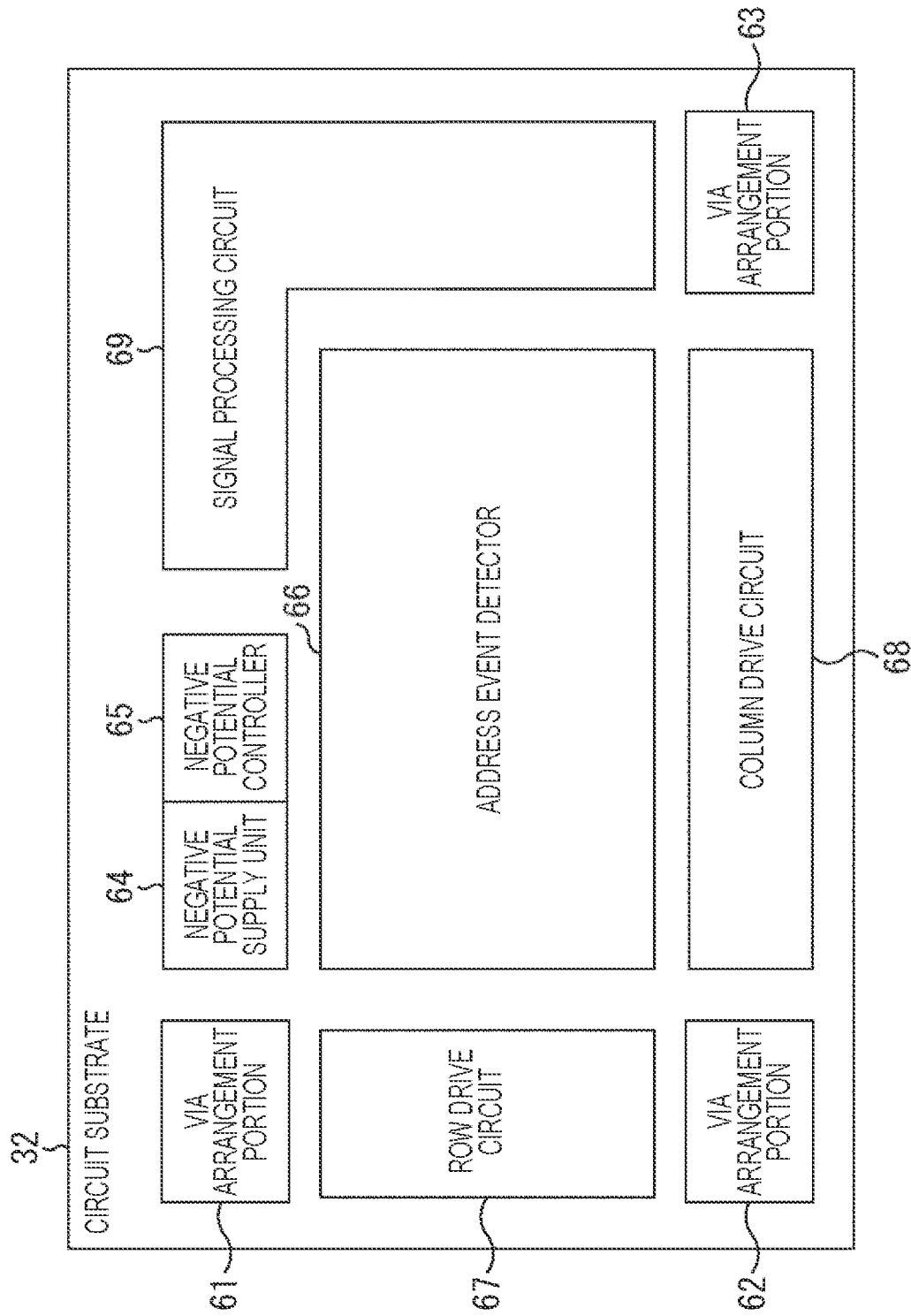
FIG. 4 is a plan view illustrating an example of a circuit substrate.

FIG. 4 is a plan view illustrating an example of the circuit substrate 32.

As illustrated in FIG. 4, the circuit substrate 32 is provided with via arrangement portions 61 to 63, a negative potential supply unit 64, a negative potential controller 65, an address event detector 66, a row drive circuit 67, a column drive circuit 68, and a signal processing circuit 69.

In the via arrangement portions 61 to 63, a via connected to the light receiving substrate 31 is disposed.

The negative potential supply unit 64 supplies a potential lower than a predetermined reference potential (ground potential or the like) as a negative potential to the light receiving substrate 31 under the control of the negative potential controller 65. Effects generated by the supply of the negative potential will be described later.

The negative potential controller 65 controls the negative potential supply unit 64 to supply a negative potential according to the temperature of the light receiving substrate 31 to the light receiving substrate 31.

The address event detector 66 generates a detection signal on the basis of the voltage signal supplied from each of the plurality of light receiving circuits 51, and outputs the detection signal to the signal processing circuit 69.

The row drive circuit 67 selects a row address and causes the address event detector 66 to output a detection signal corresponding to the row address.

The column drive circuit 68 selects a column address and cause the address event detector 66 to output a detection signal corresponding to the column address.

The signal processing circuit 69 executes predetermined signal processing on the detection signal supplied from the address event detector 66.

Specifically, the signal processing circuit 69 arranges the detection signals as pixel signals in a two-dimensional lattice pattern, and acquires image data having 2-bit information for each pixel. The signal processing circuit 69 executes signal processing such as image recognition processing on the image data.

Figure 5:
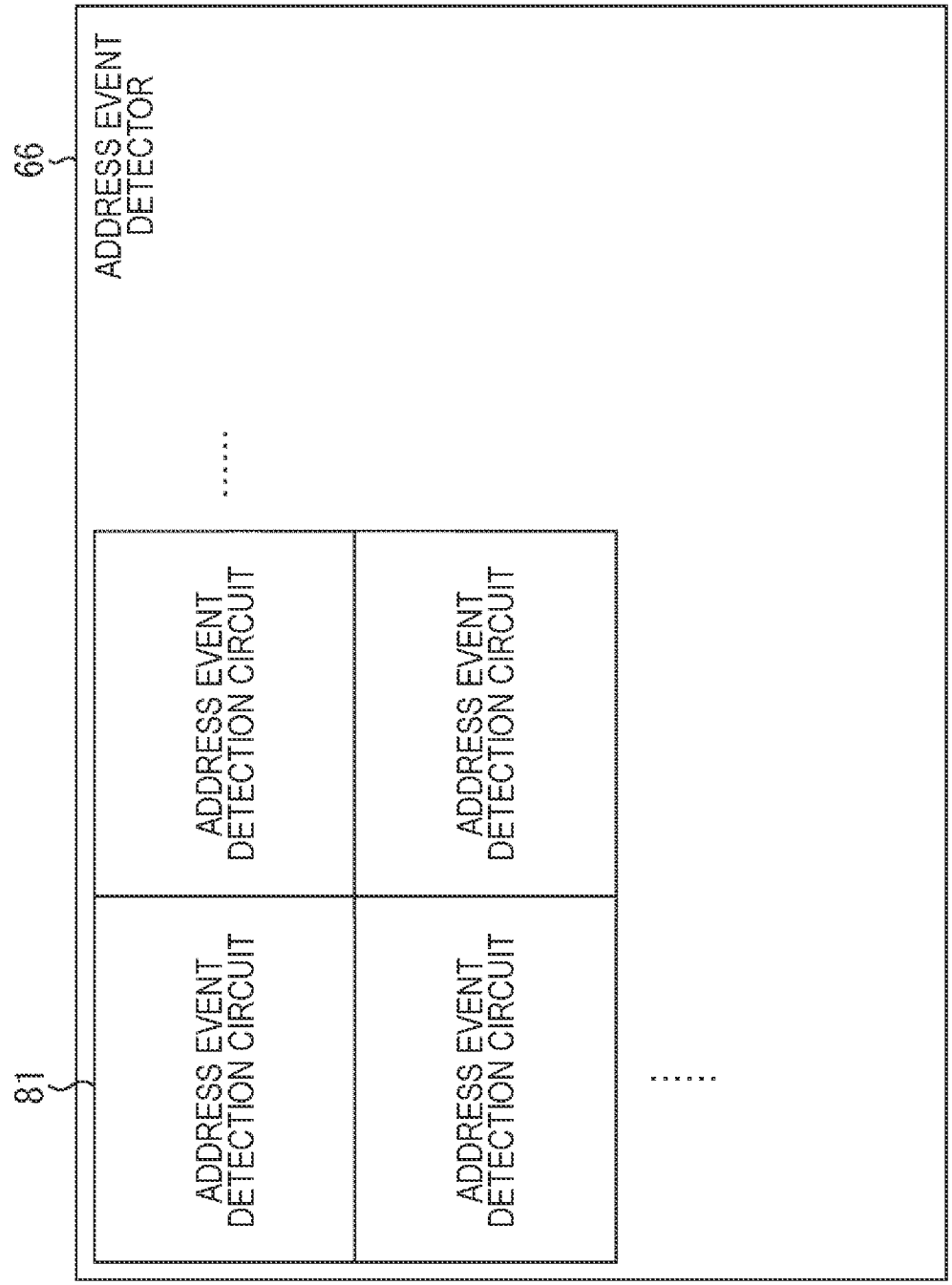
FIG. 5 is a plan view illustrating an example of an address event detector.

FIG. 5 is a plan view illustrating an example of the address event detector 66.

As illustrated in FIG. 5, in the address event detector 66, a plurality of address event detection circuits 81 is arranged in a two-dimensional lattice pattern. Each of the address event detection circuits 81 to which a pixel address is assigned is connected to the light receiving circuit 51 having the same address.

The address event detection circuit 81 quantizes the voltage signal from the light receiving circuit 51 and outputs the quantized voltage signal as a detection signal.

Figure 6:
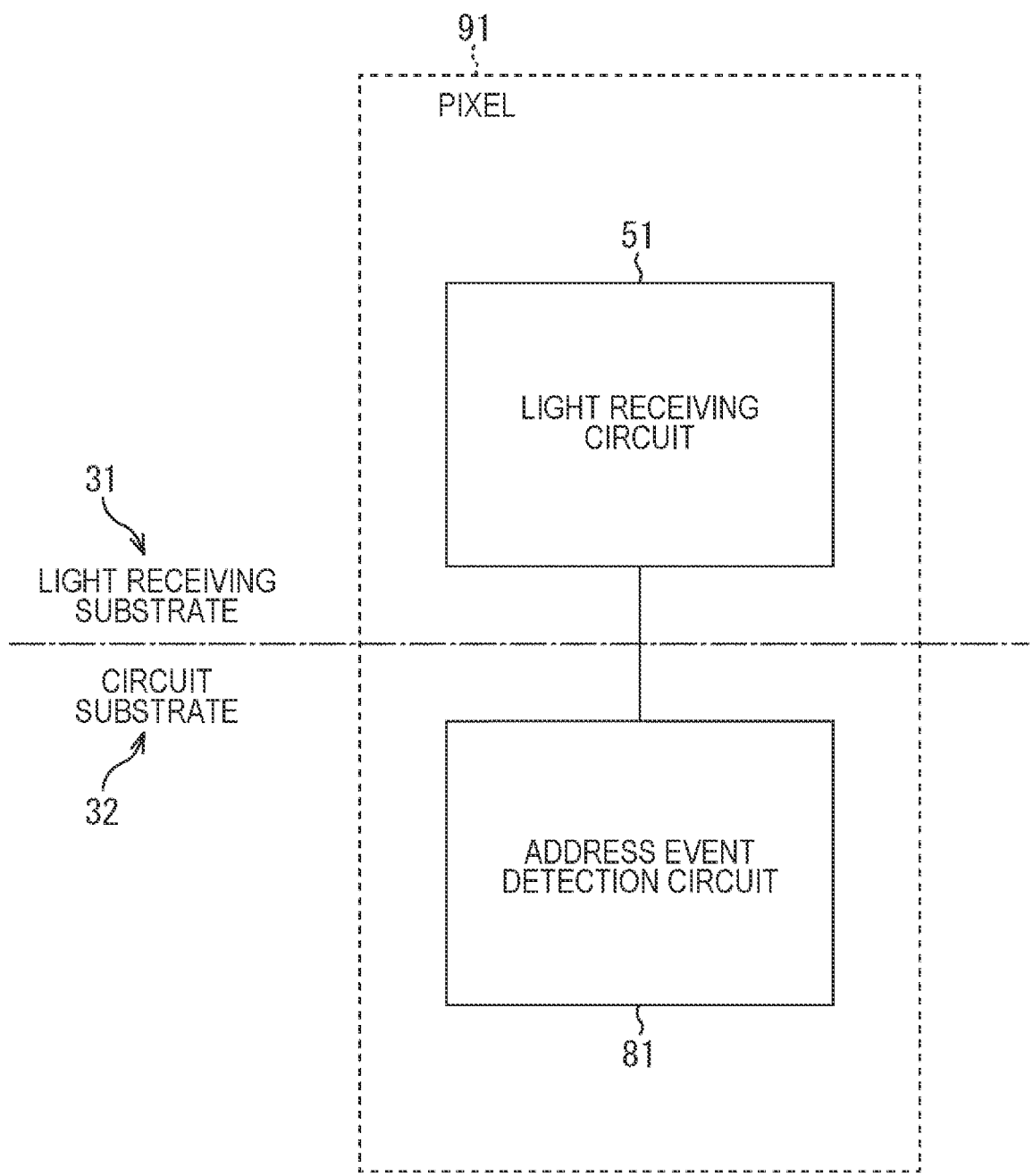
FIG. 6 is a view for describing a configuration of a pixel.

FIG. 6 is a diagram for describing a configuration of a pixel 91.

As illustrated in FIG. 6, each of the pixels 91 includes the light receiving circuit 51 in the light receiving substrate 31 and the address event detection circuit 81 in the circuit substrate 32 to which the same pixel address is assigned.

Figure 7:
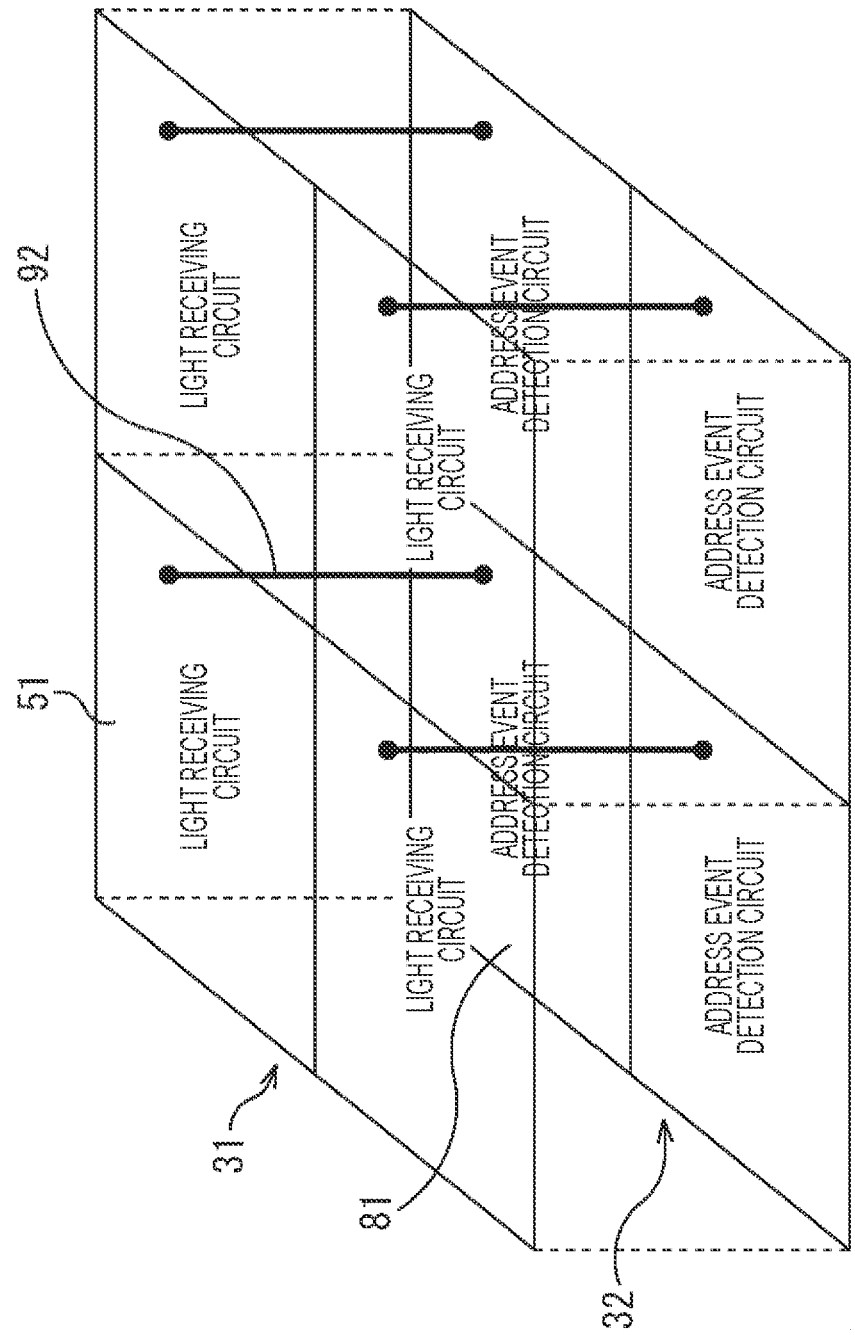
FIG. 7 is a view for describing a configuration of the pixel.

As illustrated in FIG. 7, on each of the substrates, a plurality of light receiving circuits 51 and a plurality of address event detection circuits 81 are arranged in a two-dimensional lattice pattern. Therefore, in the solid-state imaging element 12, the plurality of pixels 91 configured by the above is arranged in a two-dimensional lattice pattern.

The light receiving circuit 51 and the address event detection circuit 81 constituting the pixel are connected via a signal line 92.

Figure 8:
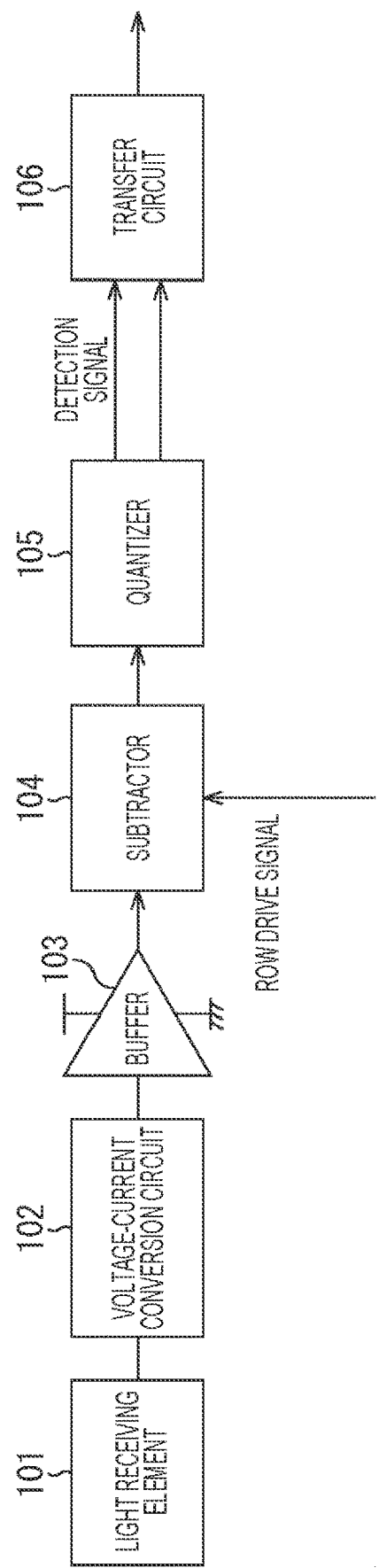
FIG. 8 is a block diagram illustrating a configuration example of the pixel.

FIG. 8 is a block diagram illustrating a configuration example of the pixel 91.

As illustrated in FIG. 8, the pixel 91 includes a light receiving element 101, a voltage-current conversion circuit 102, a buffer 103, a subtractor 104, a quantizer 105, and a transfer circuit 106.

The light receiving element 101 includes a photodiode that photoelectrically converts incident light to generate a photoelectric conversion current. The photoelectric conversion current generated by the light receiving element 101 is supplied to the voltage-current conversion circuit.

The voltage-current conversion circuit 102 logarithmically converts the photoelectric conversion current supplied from the light receiving element 101 into a voltage signal.

The voltage signal generated by the voltage-current conversion circuit 102 is supplied to the buffer 103.

The buffer 103 holds the voltage signal supplied from the voltage-current conversion circuit 102. The voltage signal from the buffer 103 is supplied to the subtractor 104.

The subtractor 104 lowers a level of the voltage signal supplied from the buffer 103 in accordance with a row drive signal supplied from the row drive circuit 67. The voltage signal after the level is lowered by the subtractor 104 is supplied to the quantizer 105.

The quantizer 105 quantizes an analog voltage signal into a digital detection signal by comparing the voltage signal supplied from the subtractor 104 with a predetermined threshold value. The quantizer 105 compares the voltage signal with each of an upper limit threshold value and a lower limit threshold value, and supplies a comparison result to the transfer circuit 106 as a 2-bit detection signal.

The transfer circuit 106 transfers the detection signal supplied from the quantizer 105 to the signal processing circuit 69 in accordance with a column drive signal supplied from the column drive circuit 68.

Configuration Example of Voltage-Current Conversion Circuit

Example of First Configuration (Example in which Fixed Negative Potential is Supplied)

Figure 9:
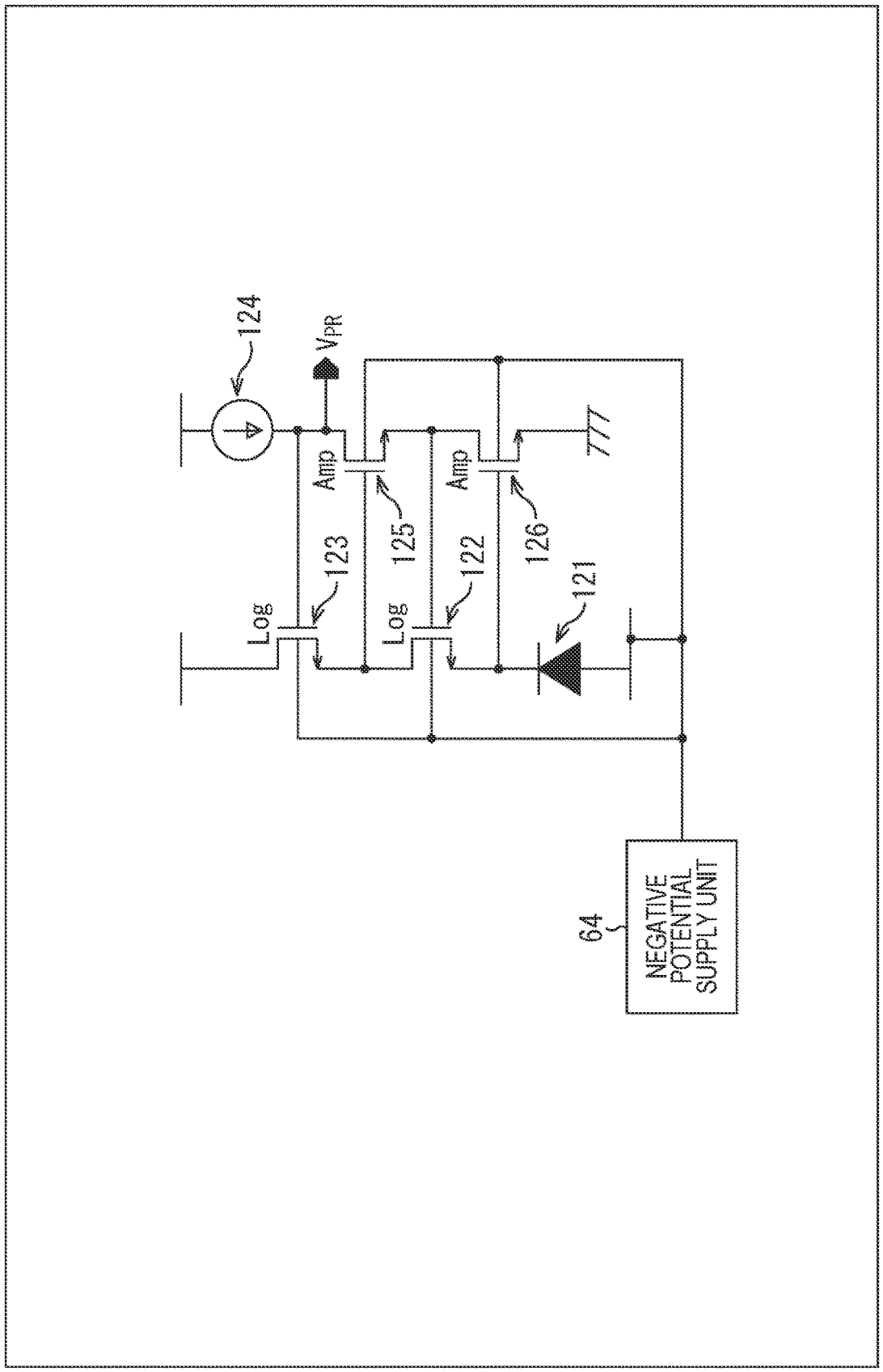
FIG. 9 is a circuit diagram illustrating an example of a first configuration of a voltage-current conversion circuit.

FIG. 9 is a circuit diagram illustrating an example of a first configuration of the voltage-current conversion circuit 102.

As illustrated in FIG. 9, the voltage-current conversion circuit 102 includes Log transistors 122 and 123 and Amp transistors 125 and 126. As these transistors, for example, metal-oxide-semiconductor (MOS) transistors are used. In the following description, these transistors, if not required to be distinguished, are simply referred to as transistors.

The source of the Log transistor 122 is connected to a cathode of a photodiode 121 provided in the light receiving element 101, and the drain of the Log transistor 122 is connected to the source of the Log transistor 123 and the gate of the Amp transistor 125. The gate of the Log transistor 122 is connected to the source of the Amp transistor 125 and the drain of the Amp transistor 126.

The drain of the Log transistor 123 is connected to a terminal of a power supply voltage, and the gate of the Log transistor 123 is connected to a terminal of the constant current source 124, the drain of the Amp transistor 125, and an input terminal of the buffer 103. The Log transistor 122 and the Log transistor 123 are connected in series between the terminal of the power supply voltage and the cathode of the photodiode 121.

The Log transistors 122 and 123 convert the photoelectric conversion current into a voltage between the gate and the source, and output the voltage from the gate.

The source of the Amp transistor 126 is connected to a terminal of a reference potential (ground potential GND or the like), and the gate of the Amp transistor 126 is connected to the cathode of the photodiode 121 and the source of the Log transistor 122. The Amp transistor 125 and the Amp transistor 126 are connected in series between the terminal of the constant current source 124 and the terminal of the reference potential.

The Amp transistor 126 amplifies a voltage between the gate having a potential according to the photoelectric conversion current and the source having the reference potential, and outputs the amplified voltage from the drain.

The Amp transistor 125 amplifies a voltage between the gate having a potential according to the photoelectric conversion current and the source having a potential according to the voltages output from the Log transistor 122 and the Amp transistor 126, and outputs the amplified voltage from the drain.

By such a configuration, the photoelectric conversion current from the photodiode 121 is converted into a voltage signal of an output voltage $V_{PR}$. The output voltage $V_{PR}$ at this time is represented by the following equation (1).

[Math. 1]

$$V_{PR}=2 \cdot V_{GS,Log}+2 \cdot V_{GS,Amp} \quad (1)$$

The equation (1) represents that the output voltage $V_{PR}$ is a voltage obtained by adding each output voltage $V_{GS, Log}$ of the Log transistors 122 and 123 and each output voltage $V_{GS, Amp}$ of the Amp transistors 125 and 126.

In the equation (1), $V_{GS, Log}$ represents a signal component of the output voltages $V_{PR}$, and $V_{GS, Amp}$ represents an offset component of the output voltage $V_{PP}$. Here, the signal component and the offset component of the output voltage $V_{PR}$ greatly depend on a predetermined threshold voltage $V_{th}$ of the transistor.

In FIG. 9, the negative potential supply unit 64 supplies a fixed negative potential lower than the reference potential to an anode of the photodiode 121 and a back gate of each of the Log transistors 122 and 123 and the Amp transistors 125 and 126.

Specifically, the negative potential supply unit 64 supplies the negative potential to a P-well region of the light receiving substrate 31. In this P-well region, the photodiode 121 is embedded, and back gates (bulk) of the Log transistors 122 and 123 and the Amp transistors 125 and 126 are formed. Therefore, by supplying the negative potential to the P-well region, the negative potential can be supplied to the anode of the photodiode 121 and the back gate of each of the Log transistors 122 and 123 and the Amp transistors 125 and 126.

By setting the anode of the photodiode 121 to a negative potential, a reverse bias of the photodiode 121 increases as compared with a case where the potential is set to a reference potential. As a result, the sensitivity of the photodiode 121 increases, and a dark current can be reduced. Furthermore, by setting the back gates of the Log transistors 122 and 123 and the Amp transistors 125 and 126 to a negative potential, the threshold voltage of each transistor becomes higher due to a substrate bias effect as compared with the case where the potential of the transistors are set to the reference potential. It is therefore possible to prevent a gate-source voltage of the transistors from becoming 0 or less. When the gate-source voltage becomes 0 or less, a normal output cannot be obtained due to the circuit configuration of the voltage-current conversion circuit 102. Therefore, such a situation can be suppressed by supplying a negative potential. In this way, a signal quality of the detection signal can be improved by improving the sensitivity of the photodiode 121, decreasing the dark current, and increasing the threshold voltage.

Example of Second Configuration (Example of Back Bias Control)

Figure 10:
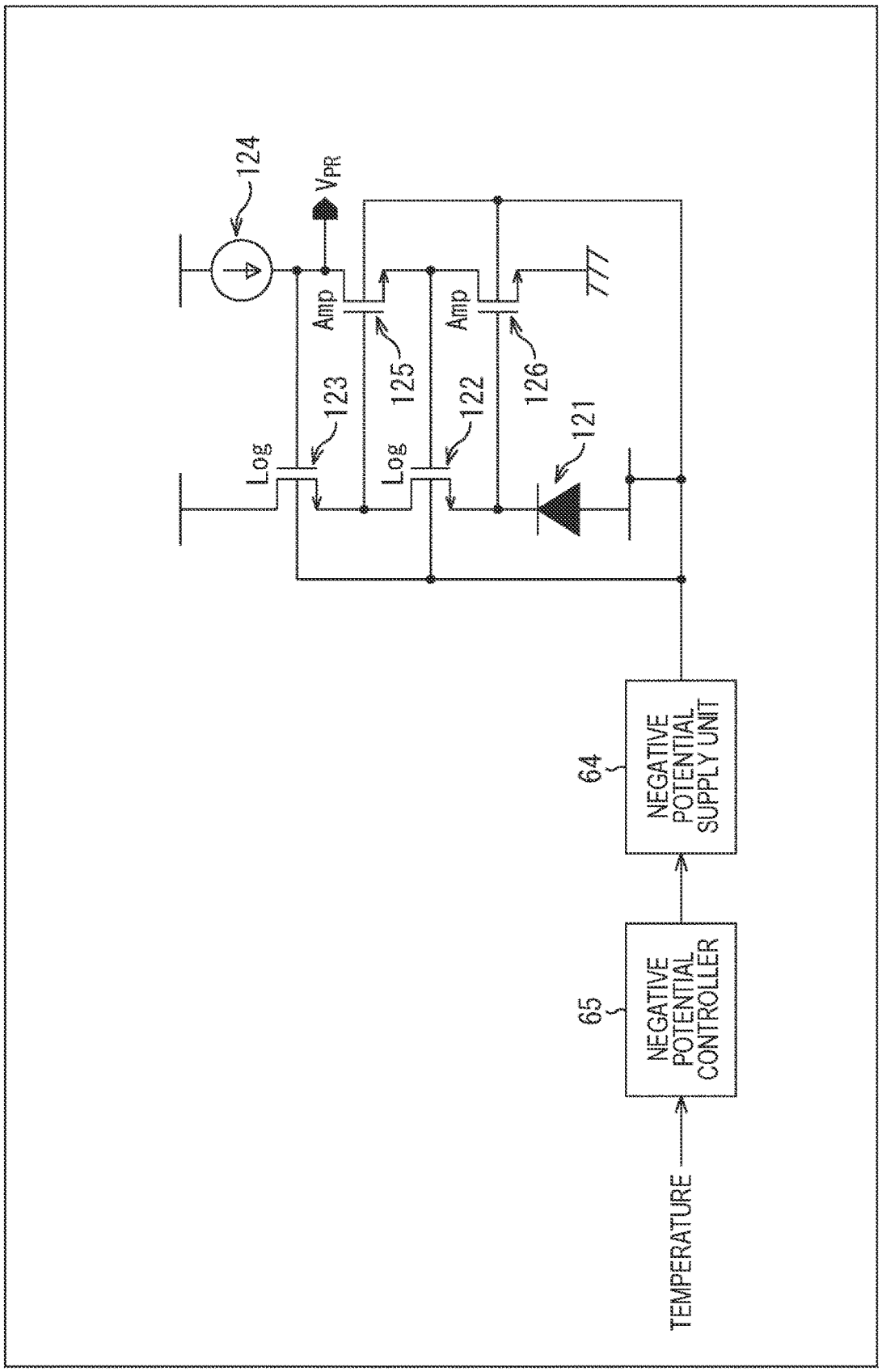
FIG. 10 is a circuit diagram illustrating an example of a second configuration of the voltage-current conversion circuit.

FIG. 10 is a circuit diagram illustrating an example of a second configuration of the voltage-current conversion circuit 102. In FIG. 10, the same configurations as the configurations in FIG. 9 are denoted by the same reference signs. Redundant description will be omitted as appropriate.

The configuration of the voltage-current conversion circuit 102 illustrated in FIG. 10 is different from the configuration illustrated in FIG. 9 in that the negative potential controller 65 is provided in a preceding stage of the negative potential supply unit 64.

The negative potential controller 65 controls the negative potential supply unit 64 to supply a negative potential according to the temperature of the light receiving substrate 31.

The negative potential supply unit 64 supplies a negative potential that fluctuates in accordance with the temperature to the anode of the photodiode 121 and a back gate of each of the Log transistors 122 and 123 and the Amp transistors 125 and 126.

Note that the output voltage $V_{PR}$ in a case where a negative potential according to the temperature is supplied is represented by the above equation (1), similarly to a case where a fixed negative potential is supplied. That is, the signal component and the offset component of the output voltage $V_{PR}$ greatly depend on the predetermined threshold voltage $V_{th}$ of the transistor.

Figure 11:
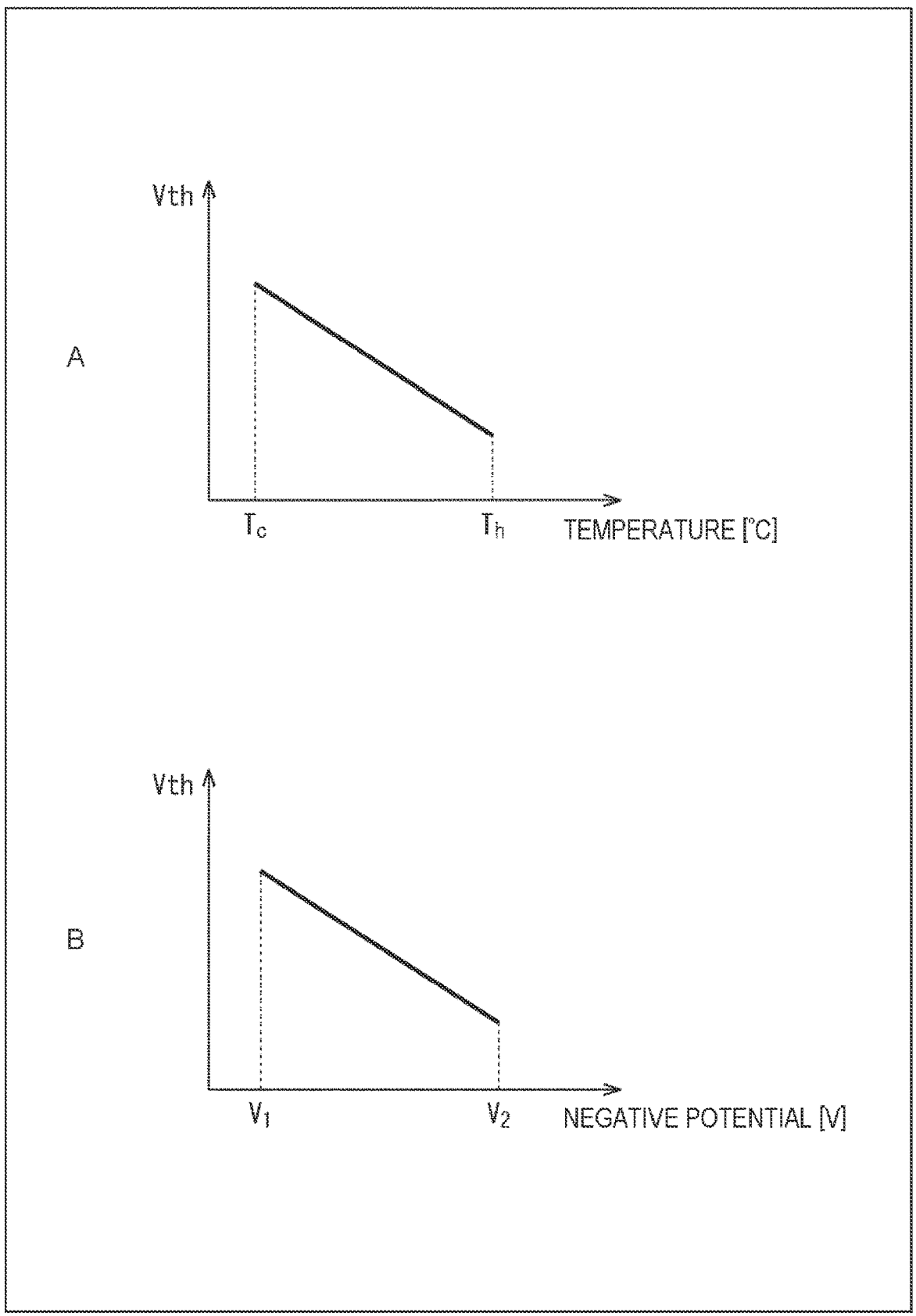
FIG. 11 is a diagram illustrating characteristics of a threshold voltage of a transistor.

FIG. 11 is a diagram illustrating characteristics of a threshold voltage of the transistor.

A of FIG. 11 illustrates a relationship between the temperature and the predetermined threshold voltage of the transistor. The horizontal axis represents the temperature, and the vertical axis represents the threshold voltage $V_{th}$.

As illustrated in A of FIG. 11, the threshold voltage $V_{th}$ of the transistor depends on the temperature, and a threshold voltage at a temperature $T_h$ is lower than a threshold voltage at a temperature $T_c$ ($T_h > T_c$).

B of FIG. 11 illustrates a relationship between the negative potential (back bias) and the predetermined threshold voltage of the transistor. The horizontal axis represents the negative potential, and the vertical axis represents the threshold voltage $V_t$h.

As illustrated in B of FIG. 11, the threshold voltage $V_{th}$ of the transistor depends on the negative potential, and a threshold voltage at a negative potential $V_2$ is lower than a threshold voltage at a negative potential $V_1$ ($V_2 > V_1$).

Figure 12:
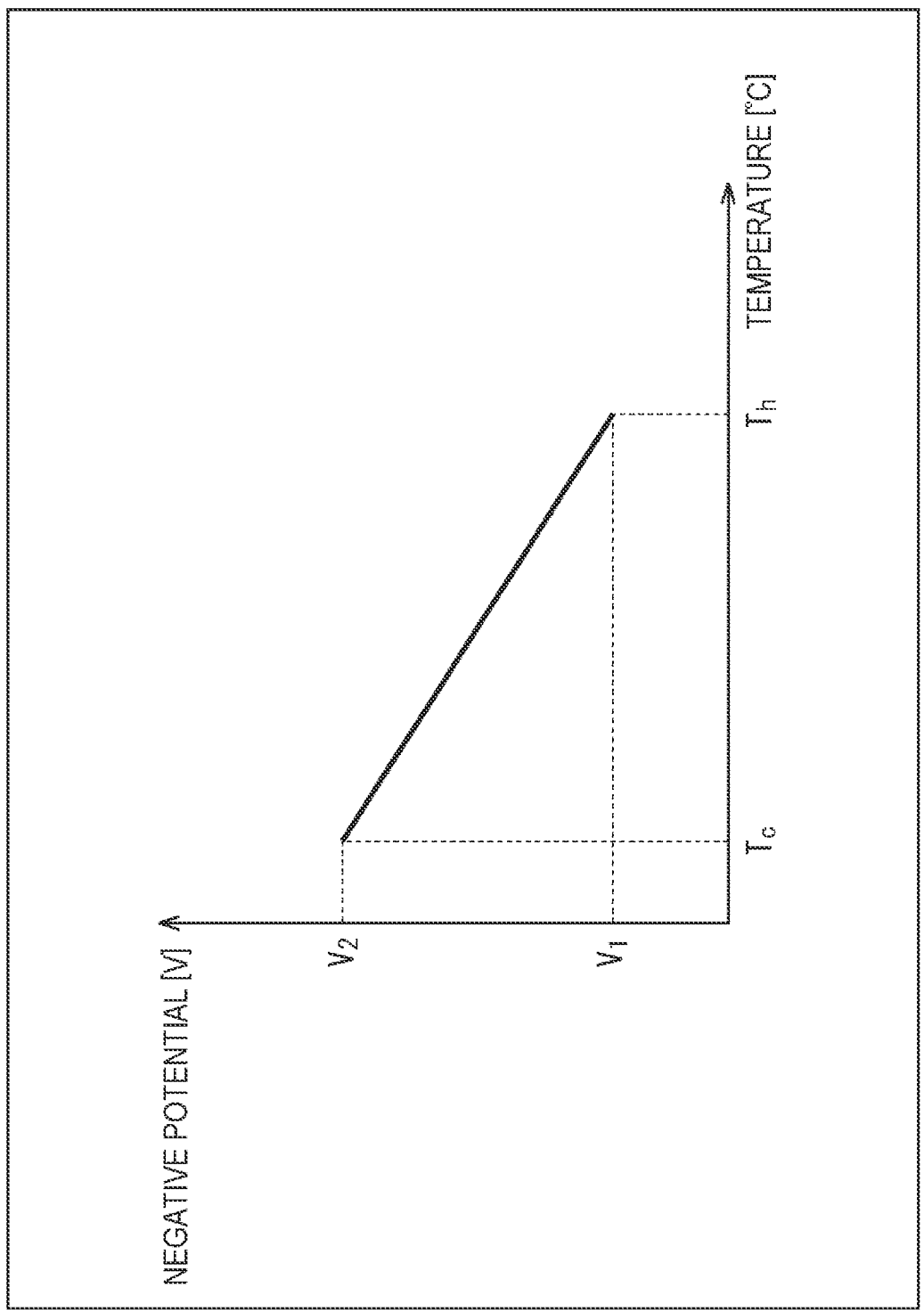
FIG. 12 is a diagram illustrating an example of a negative potential supplied by a negative potential supply unit in FIG. 10.

FIG. 12 is a diagram illustrating an example of the negative potential supplied by the negative potential supply unit 64 in FIG. 10.

Under the control of the negative potential controller 65, the negative potential supply unit 64 supplies, to a transistor or the like, a negative potential that cancels a fluctuation of the threshold voltage $V_{th}$ due to temperature by a fluctuation of the negative potential. For example, as illustrated in FIG. 12, the negative potential is controlled so as to have a value decreasing as the temperature increases.

In the example of FIG. 12, the negative potential $V_2$ is supplied in the case of the temperature $T_c$, and the negative potential $V_1$ is supplied in the case of the temperature $T_h$. For example, in a case where the temperature is $-20°$ C., a negative potential of $-0.2$ V is supplied, and in a case where the temperature is 75° C., a negative potential of $-1.2$ V is supplied.

Figure 13:
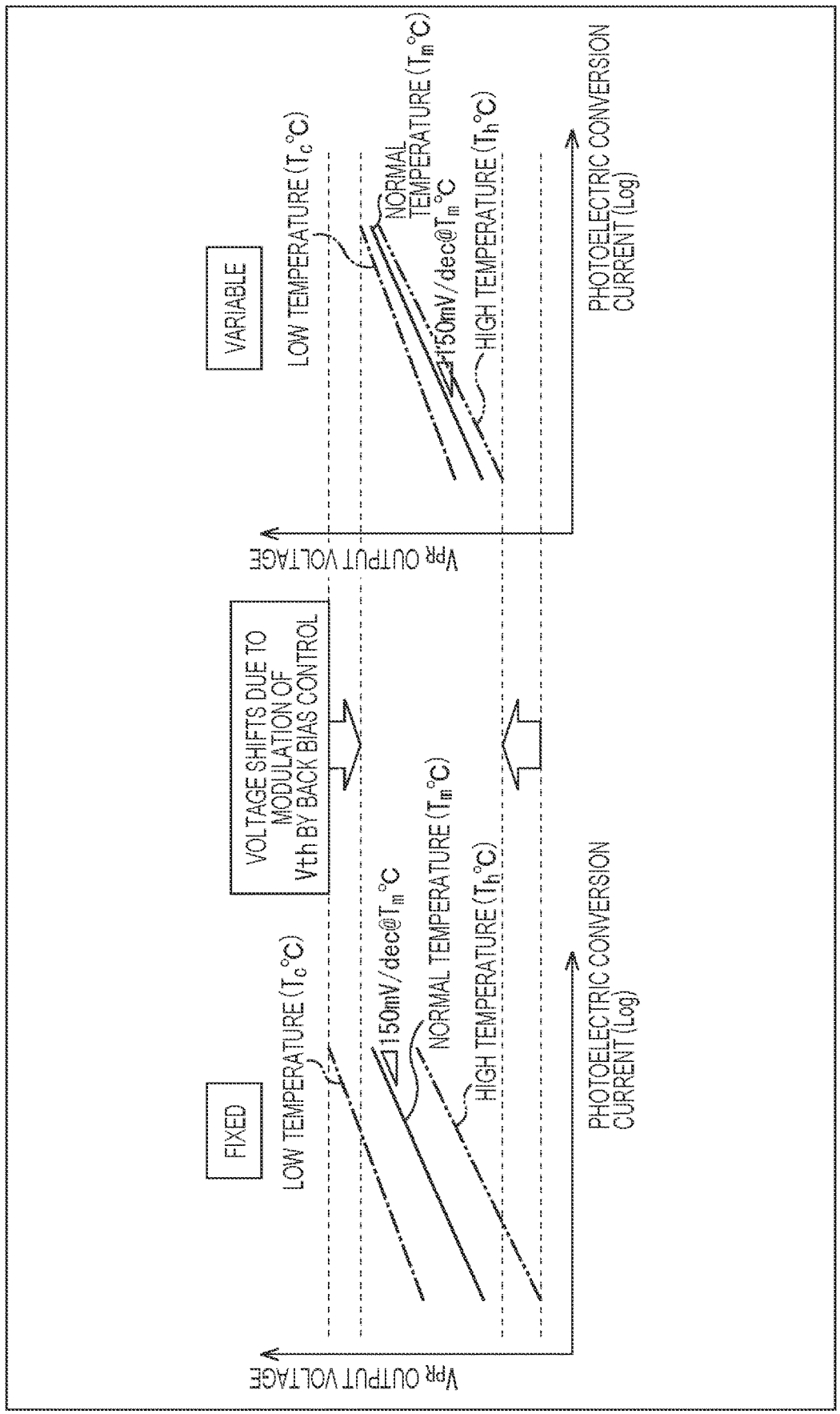
FIG. 13 is a diagram illustrating examples of a range of an output voltage in a case where a fixed negative potential is supplied and in a case where a variable negative potential is supplied.

FIG. 13 is a diagram illustrating examples of a range of the output voltage $V_{PR}$ in a case where a fixed negative potential is supplied and in a case where a variable negative potential is supplied. In FIG. 13, the horizontal axis represents the photoelectric conversion current, and the vertical axis represents the output voltage $V_{PR}$.

The left side of FIG. 13 illustrates a relationship between the photoelectric conversion current and the output voltage $V_{PR}$ in a case where a fixed negative potential is supplied at the high temperature ($T_h°$ C.), a normal temperature ($T_m°$ C.), and the low temperature ($T_c°$ C.). For example, the high temperature is 75° C., the normal temperature is 25° C., and the low temperature is $-20°$ C. As illustrated on the left side of FIG. 13, in a case where a fixed negative potential is supplied, a fluctuation range of the output voltage $V_{PR}$ due to a temperature change increases. The configuration on the left side of FIG. 13 in a case where the fixed negative potential is supplied corresponds to the first configuration of the voltage-current conversion circuit 102 in FIG. 9.

The right side of FIG. 13 illustrates a relationship between the photoelectric conversion current and the output voltage $V_{PR}$ in a case where a negative potential according to the temperature is supplied at the high temperature ($T_h°$ C.), the normal temperature ($T_m°$ C.), and the low temperature ($T_c°$ C.). In a case where a negative potential according to the temperature is supplied, as compared with a case where a fixed negative potential is supplied, the threshold voltage $V_{th}$ is modulated by controlling the negative potential as indicated by the outlined arrow in FIG. 13, and thus, an upper limit of the output voltage $V_{PR}$ is shifted in a negative direction, and a lower limit of the output voltage $V_{PR}$ is shifted in a positive direction. Note that, in both the case where a fixed negative potential is supplied and the case where a negative potential according to the temperature is supplied, the gradient of a gain at the normal temperature is, for example, 150 mV/dec.

The configuration in a case where the variable negative potential on the right side of FIG. 13 is supplied corresponds to the second configuration of the voltage-current conversion circuit 102 in FIG. 10. That is, in the second configuration of the voltage-current conversion circuit 102 in FIG. 10, the negative potential controller 65 controls the negative potential supply unit 64 to supply the negative potential according to the temperature on the basis of information regarding the temperature affectable to the threshold voltage $V_{th}$ of the transistors including the Log transistors 122 and 123 and the Amp transistors 125 and 126.

As the temperature affectable to the threshold voltage $V_{th}$ of the transistor, for example, the temperature of the above-described light receiving substrate 31 or the surrounding thereof can be used. Note that, as the threshold voltage $V_{th}$ of the transistors, all the transistors of the Log transistors 122 and 123 and the Amp transistors 125 and 126 may be targeted, or at least one of the transistors may be targeted.

Therefore, when the negative potential according to the temperature is supplied, an output range of the output voltage $V_{PR}$ becomes smaller than an output range in a case where the fixed negative potential is supplied.

In a case where the output range of the output voltage $V_{PR}$ is large, there is a possibility that a sufficient dynamic range cannot be secured. It is not desirable to increase the power supply voltage in order to secure a sufficient dynamic range because power consumption increases. In the second configuration of the voltage-current conversion circuit 102 in FIG. 10, since the output range is small, a sufficient dynamic range can be secured without increasing the power supply voltage.

Example of Third Configuration (Example of Increasing Transistors)

Figure 14:
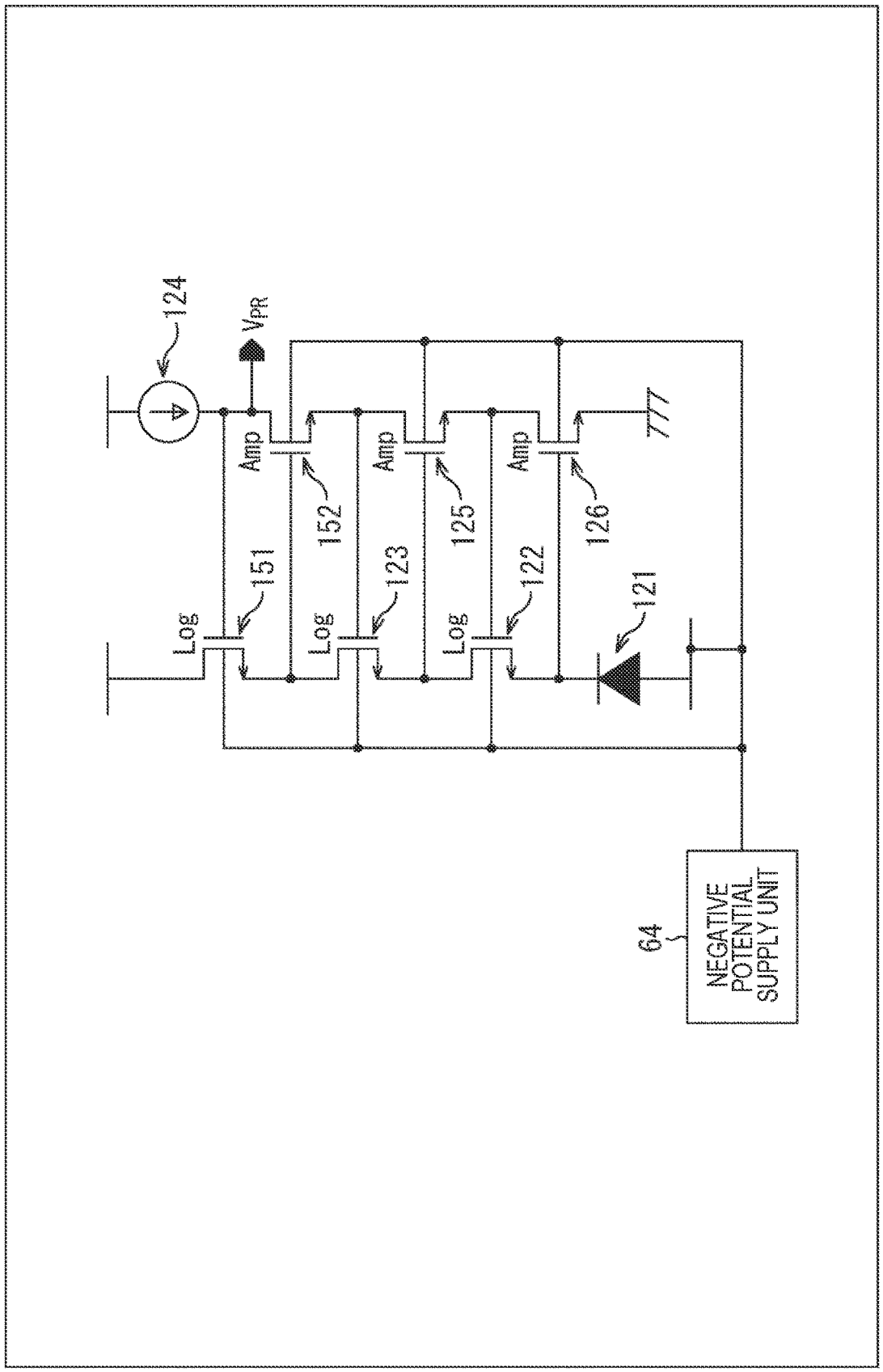
FIG. 14 is a circuit diagram illustrating a third configuration example of the voltage-current conversion circuit.

FIG. 14 is a circuit diagram illustrating an example of a third configuration of the voltage-current conversion circuit 102. In FIG. 14, the same configurations as the configurations in FIG. 9 are denoted by the same reference signs. Redundant description will be omitted as appropriate.

The configuration of the voltage-current conversion circuit 102 illustrated in FIG. 14 is different from the configuration illustrated in FIG. 9 in that a Log transistor 151 and an Amp transistor 152 are provided. That is, in the first configuration, two stages of a combination of the Log transistor and the Amp transistor are provided, but in the third configuration, a combination of three stages of transistors is provided.

The drain of the Log transistor 151 is connected to the terminal of the power supply voltage, and the gate of the Log transistor 151 is connected to the terminal of the constant current source 124, the drain of the Amp transistor 152, and the input terminal of the buffer 103. The Log transistor 151, the Log transistor 122, and the Log transistor 123 are connected in series between the terminal of the power supply voltage and the cathode of the photodiode 121.

The Log transistor 151 converts the photoelectric conversion current into a voltage between the gate and the source, and outputs the voltage from the gate.

The source of the Amp transistor 152 is connected to the gate of the Log transistor 123 and the drain of the Amp transistor 125, and the gate of the Amp transistor 152 is connected to the drain of the Log transistor 123 and the source of the Log transistor 151. The Amp transistor 152, the Amp transistor 125, and the Amp transistor 126 are connected in series between the terminal of the constant current source 124 and the terminal of the reference potential.

The Amp transistor 152 amplifies a voltage between the gate having a potential according to the photoelectric conversion current and the source having a potential according to the voltages output from the Log transistor 123 and the Amp transistor 125, and outputs the amplified voltage from the drain.

The negative potential supply unit 64 supplies a fixed negative potential to a back gate of each of the Log transistor 151 and the Amp transistor 152.

By such a configuration, the photoelectric conversion current from the photodiode 121 is converted into a voltage signal of an output voltage $V_{PR}$. The output voltage $V_{PR}$ at this time is represented by the following equation (2).

[Math. 2]

$$V_{PR} = 3 \cdot V_{GS, Log} + 3 \cdot V_{GS, Amp} \quad (2)$$

The equation (2) represents that the output voltage $V_{PR}$ is a voltage obtained by adding each output voltage $V_{GS, Log}$ of the Log transistors 122, 123, and 151 and each output voltage $V_{GS, Amp}$ of the Amp transistors 125, 126, and 152.

Figure 15:
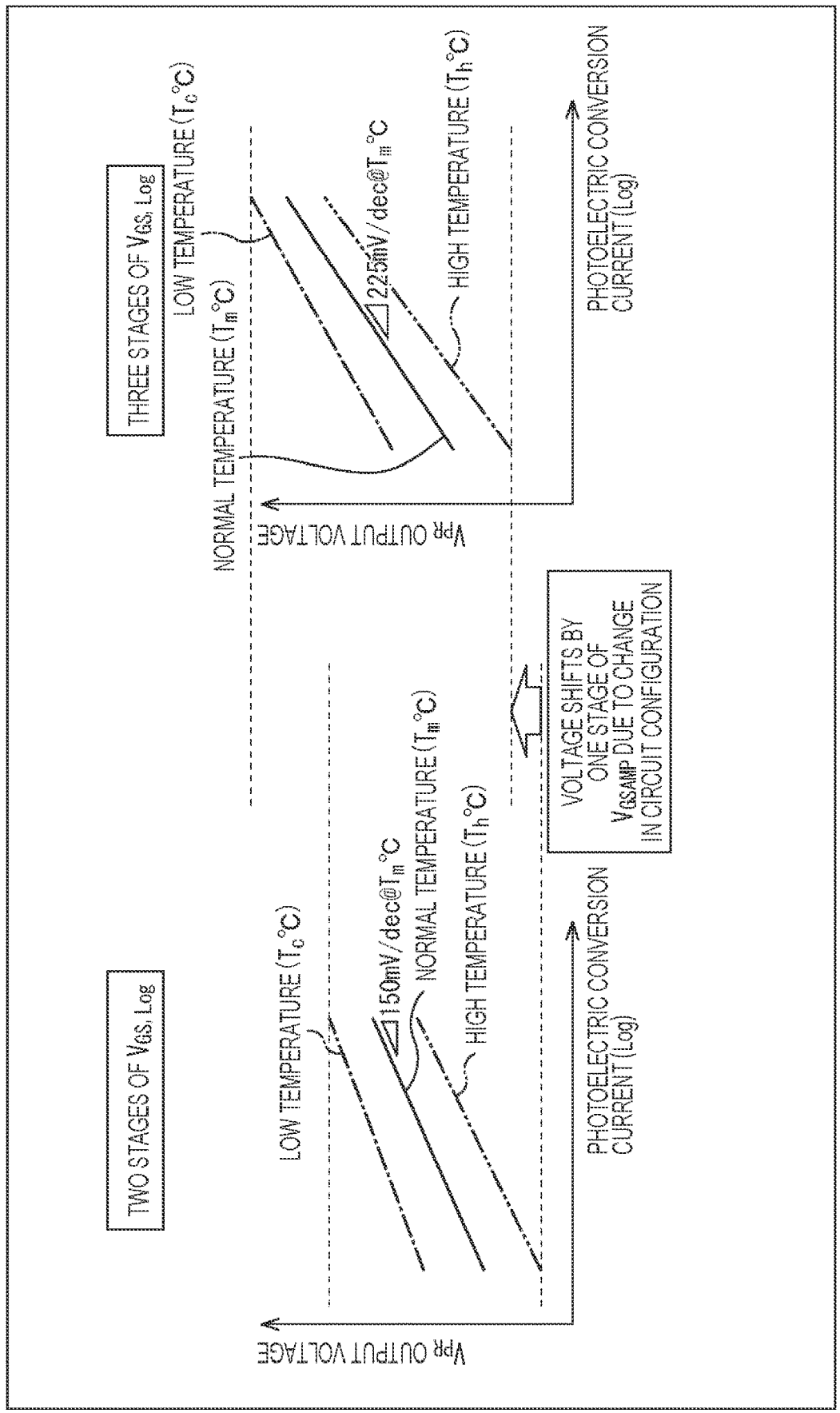
FIG. 15 is a diagram illustrating an example of a range of an output voltage in a case where a combination of two stages and three stages of transistors is provided.

FIG. 15 is a diagram illustrating an example of a range of the output voltage $V_{PR}$ in a case where a combination of two stages and three stages of transistors is provided. In FIG. 15, the horizontal axis represents the photoelectric conversion current, and the vertical axis represents the output voltage $V_{PR}$.

The left side of FIG. 15 illustrates a relationship between the photoelectric conversion current and the output voltage $V_{PR}$ at the high temperature ($T_h$° C.), the normal temperature ($T_m$° C.), and the low temperature ($T_c$° C.) in a case where a combination of two stages of transistors is provided. In a case where a combination of two stages is provided, the gradient of the gain at the normal temperature is, for example, 150 mV/dec. The configuration on the left side of FIG. 15 in a case where a combination of two stages of transistors is provided corresponds to the first configuration of the voltage-current conversion circuit 102 in FIG. 9.

The right side of FIG. 15 illustrates a relationship between the photoelectric conversion current and the output voltage $V_{PR}$ at the high temperature ($T_h$° C.), the normal temperature ($T_m$° C.), and the low temperature ($T_c$° C.) in a case where a combination of three stages of transistors is provided. In a case where a combination of three stages is provided, the gradient of the gain at the normal temperature is, for example, 225 mV/dec. The configuration on the right side of FIG. 15 in a case where a combination of three stages of transistors is provided corresponds to the third configuration of the voltage-current conversion circuit 102 in FIG. 14.

In a case where a combination of three stages of transistors is provided, as compared with a case where a combination of two stages of transistors is provided, the output voltage $V_{PR}$ is shifted in the positive direction by the voltages $V_{GS, Amp}$ of the offset component due to a change in the circuit configuration as indicated by the outlined arrow in FIG. 15.

Therefore, as the number of combinations of transistors increases, the gain of the voltage-current conversion circuit 102 increases and the output range increases. By increasing the gain of the voltage-current conversion circuit 102, it is possible to increase a signal-noise rate (SNR) of the pixel signal output by the signal processing circuit 69.

Example of Fourth Configuration (Example of Diode-Connected Transistor)

Figure 16:
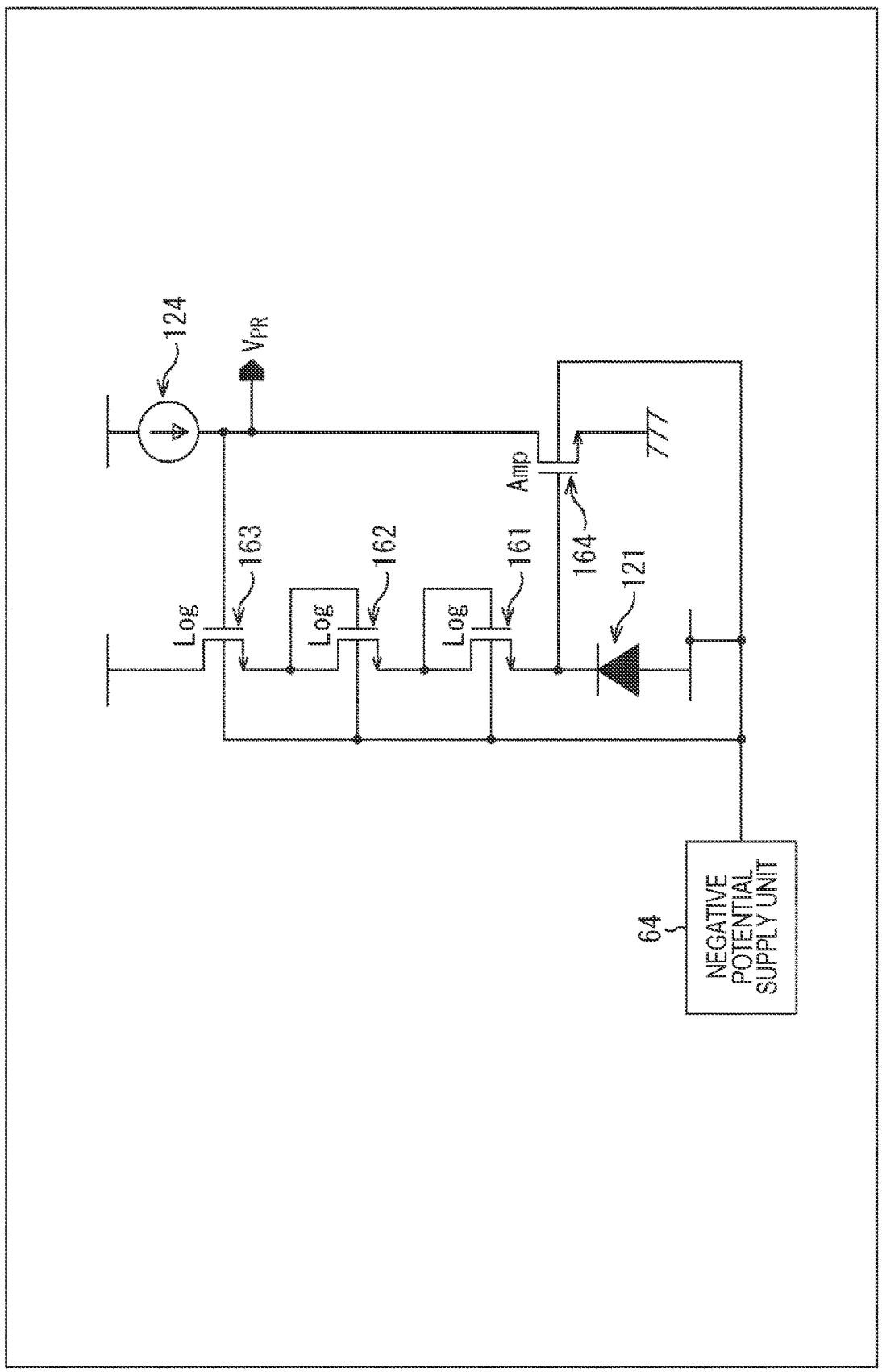
FIG. 16 is a circuit diagram illustrating a fourth configuration example of the voltage-current conversion circuit.

FIG. 16 is a circuit diagram illustrating an example of a fourth configuration of the voltage-current conversion circuit 102. In FIG. 16, the same configurations as the configurations in FIG. 14 are denoted by the same reference signs. Redundant description will be omitted as appropriate.

The configuration of the voltage-current conversion circuit 102 illustrated in FIG. 16 is different from the configuration illustrated in FIG. 14 in that Log transistors 161 to 163 and an Amp transistor 164 are provided instead of the Log transistors 122, 123, and 151 and the Amp transistor 125, 126, and 152.

Each of the Log transistors 161 and 162 has a configuration in which the drain is short-circuited or, as it is called, diode-connected to the gate. That is, in the third configuration, a combination of three stages is provided, but in the fourth configuration, a combination of one stage of the Log transistor and the Amp transistor and two diode-connected Log transistors are provided.

The source of the Log transistor 161 is connected to the cathode of the photodiode 121, and the gate and the drain of the Log transistor 161 are connected to the source of the Log transistor 162. The gate and the drain of the Log transistor 162 are connected to the source of the Log transistor 163.

The drain of the Log transistor 163 is connected to the terminal of the power supply voltage, and the gate of the Log transistor 163 is connected to the terminal of the constant current source 124, the drain of the Amp transistor 164, and the input terminal of the buffer 103. The Log transistors 161 to 163 are connected in series between the terminal of the power supply voltage and the cathode of the photodiode 121.

The Log transistors 161 to 163 convert the photoelectric conversion current into a voltage between the gate and the source, and output the voltage from the gate.

The source of the Amp transistor 164 is connected to a terminal of a reference potential, and the gate of the Amp transistor 164 is connected to the cathode of the photodiode 121 and the source of the Log transistor 161. The Amp transistor 164 is connected in series between the terminal of the constant current source 124 and the terminal of the reference potential.

The Amp transistor 164 amplifies a voltage between the gate having a potential according to the photoelectric conversion current and the source having the reference potential, and outputs the amplified voltage from the drain.

The negative potential supply unit 64 supplies a fixed negative potential to a back gate of each of the Log transistors 161 to 163 and the Amp transistor 164.

By such a configuration, the photoelectric conversion current from the photodiode 121 is converted into a voltage signal of an output voltage $V_{PR}$. The output voltage $V_{PR}$ at this time is represented by the following equation (3).

[Math. 3]

$$V_{PR} = 3 \cdot V_{GS,Log} + V_{GS, Amp} \tag{3}$$

The equation (3) represents that the output voltage $V_{PR}$ is a voltage obtained by adding each output voltage $V_{GS, Log}$ of the diode-connected Log transistors 161 and 162, the output voltage $V_{GS, Log}$ of the Log transistor 163 not diode-connected, and the output voltage $V_{GS, Amp}$ of the Amp transistor 164.

Figure 17:
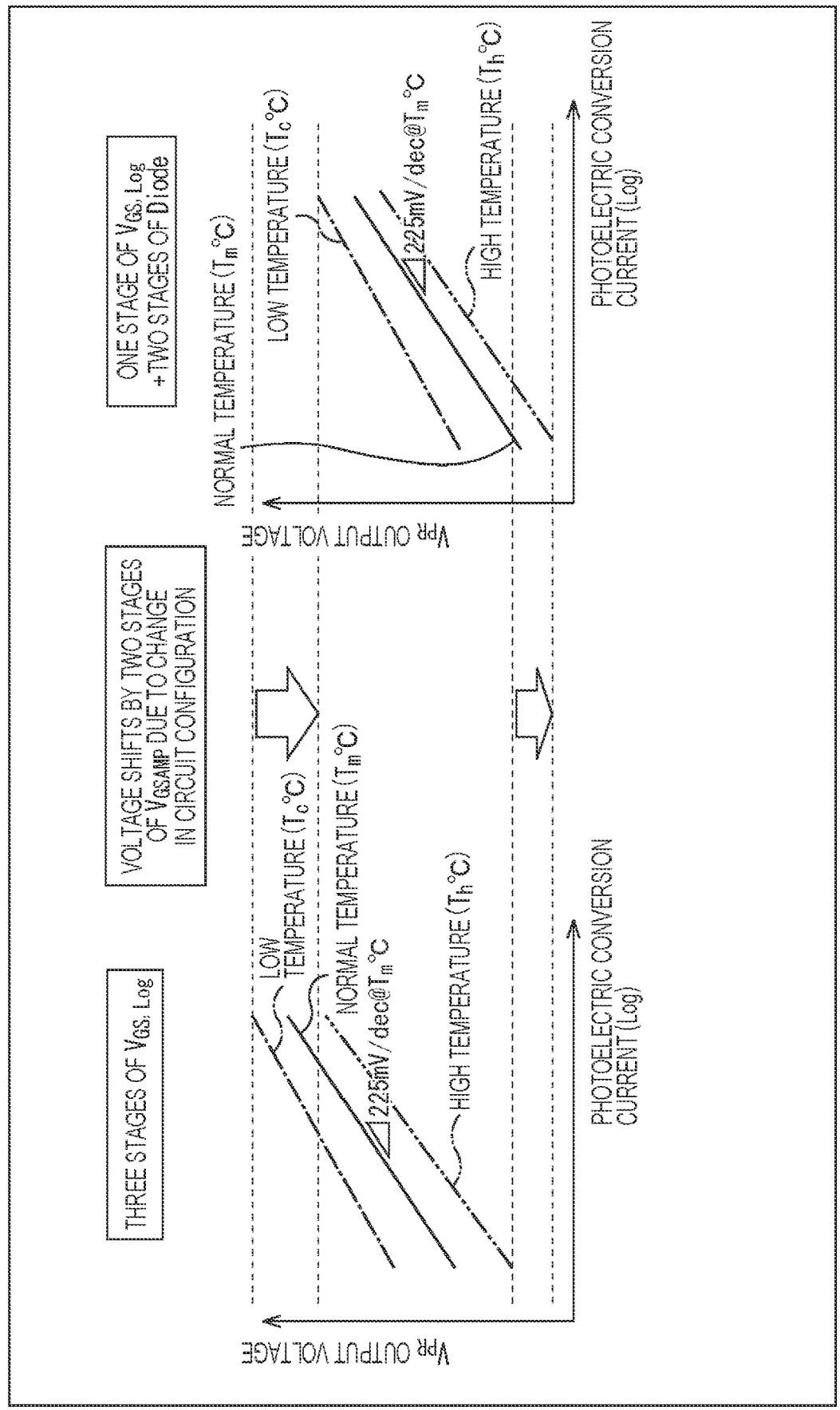
FIG. 17 is a diagram illustrating examples of a range of an output voltage in a case where a combination of three stages of transistors is provided and in a case where two stages of diode-connected Log transistors are provided.

FIG. 17 is a diagram illustrating examples of a range of an output voltage in a case where a combination of three stages of transistors is provided and in a case where two stages of diode-connected Log transistors are provided. In FIG. 17, the horizontal axis represents the photoelectric conversion current, and the vertical axis represents the output voltage $V_{PR}$.

The left side of FIG. 17 illustrates a relationship between the photoelectric conversion current and the output voltage $V_R$ at the high temperature ($T_h°$ C.), the normal temperature ($T_m°$ C.), and the low temperature ($T_c°$ C.) in a case where a combination of three stages of transistors is provided. The configuration on the left side of FIG. 17 in a case where a combination of three stages of transistors is provided corresponds to the example of the third configuration of the voltage-current conversion circuit 102 in FIG. 14.

The right side of FIG. 17 illustrates a relationship between the photoelectric conversion current and the output voltage $V_{PR}$ at the high temperature ($T_h°$ C.), the normal temperature ($T_m°$ C.), and the low temperature ($T_c°$ C.) in a case where a combination of one stage of transistor and two stages of diode-connected Log transistors are provided. The configuration on the right side of FIG. 17 in a case where two stages of diode-connected Log transistors are provided corresponds to the example of the fourth configuration of the voltage-current conversion circuit 102 in FIG. 16.

In a case where two stages of diode-connected Log transistors are provided, the output voltage $V_{PR}$ is shifted in the negative direction by $2 \cdot V_{GS, Amp}$ of the offset component by the output of the two stages of Amp transistors due to a change in the circuit configuration as illustrated by the outlined arrow in FIG. 17 as compared with a case where a combination of three stages is provided.

The gradient of the gain is 225 mV/dec in both the case where a combination of three stages of transistors is provided and the case where two stages of diode-connected Log transistors are provided. Therefore, by providing two diode-connected Log transistors instead of a combination of two stages of the Log transistor and the Amp transistor, an upper limit of the output range can be reduced without changing the gain.

Note that, in a case where two stages of diode-connected Log transistors are provided, there is a possibility that linearity is deteriorated when the temperature is high and the photoelectric conversion current is low. A configuration for suppressing the occurrence of the deterioration in linearity will be described later.

Example of Fifth Configuration (Example in which Diode-Connected Transistor and Back Bias Control are Combined)

Figure 18:
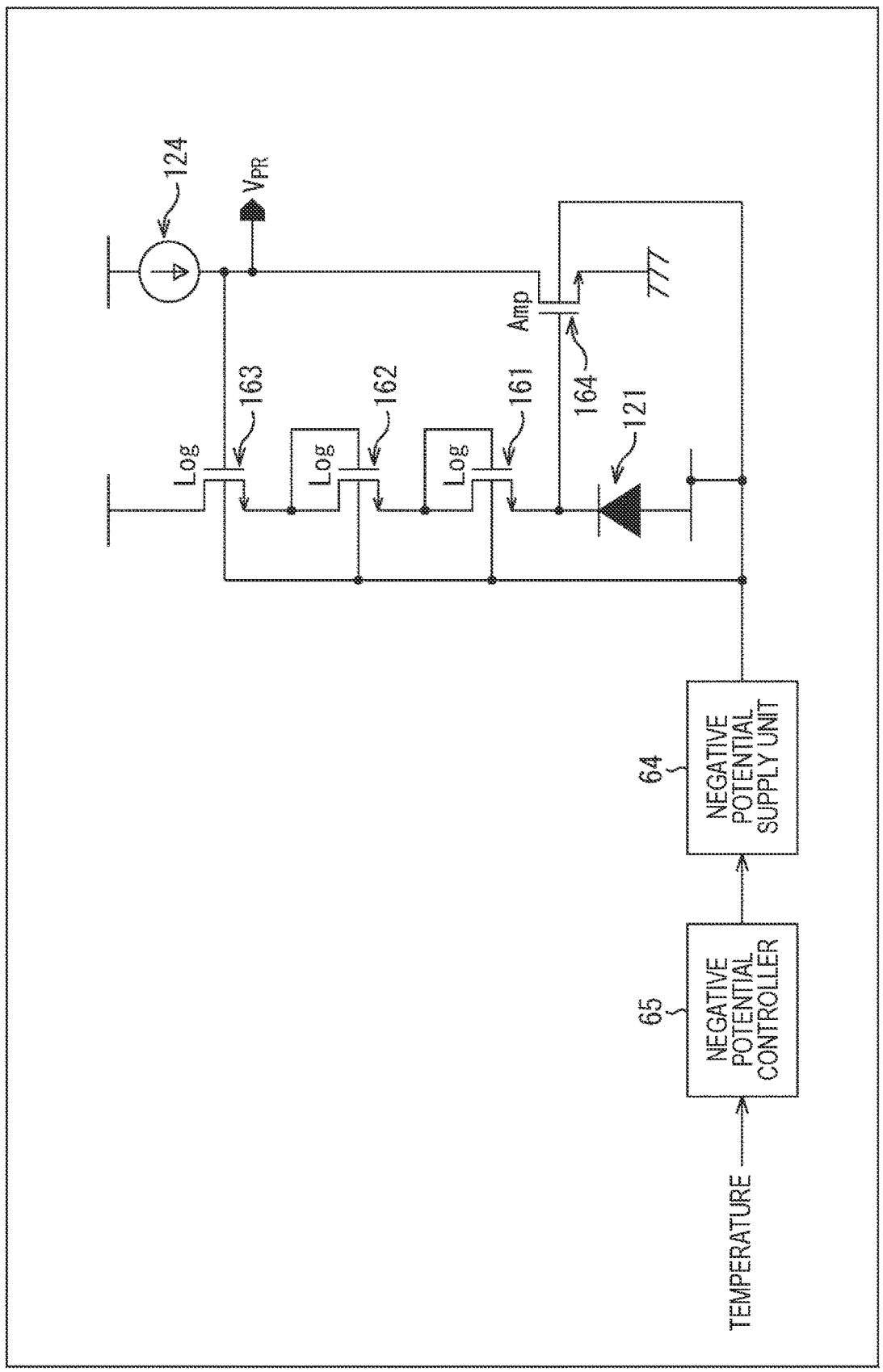
FIG. 18 is a circuit diagram illustrating a fifth configuration example of the voltage-current conversion circuit.

FIG. 18 is a circuit diagram illustrating an example of a fifth configuration of the voltage-current conversion circuit 102. In FIG. 18, the same configurations as the configurations in FIG. 16 are denoted by the same reference signs. Redundant description will be omitted as appropriate.

The configuration of the voltage-current conversion circuit 102 illustrated in FIG. 18 is different from the configuration illustrated in FIG. 16 in that the negative potential controller 65 is provided in a preceding stage of the negative potential supply unit 64.

The negative potential controller 65 controls the negative potential supply unit 64 to supply a negative potential according to the temperature of the light receiving substrate 31.

The negative potential supply unit 64 supplies a negative potential that fluctuates in accordance with the temperature to the anode of the photodiode 121 and a back gate of each of the Log transistors 161 to 163 and the Amp transistor 164.

Note that the output voltage $V_{PR}$ in a case where a negative potential according to the temperature is supplied is represented by the equation (3), similarly to a case where a fixed negative potential is supplied. That is, the signal component and the offset component of the output voltage $V_{PR}$ greatly depend on the predetermined threshold voltage $V_{th}$ of the transistor.

Figure 19:
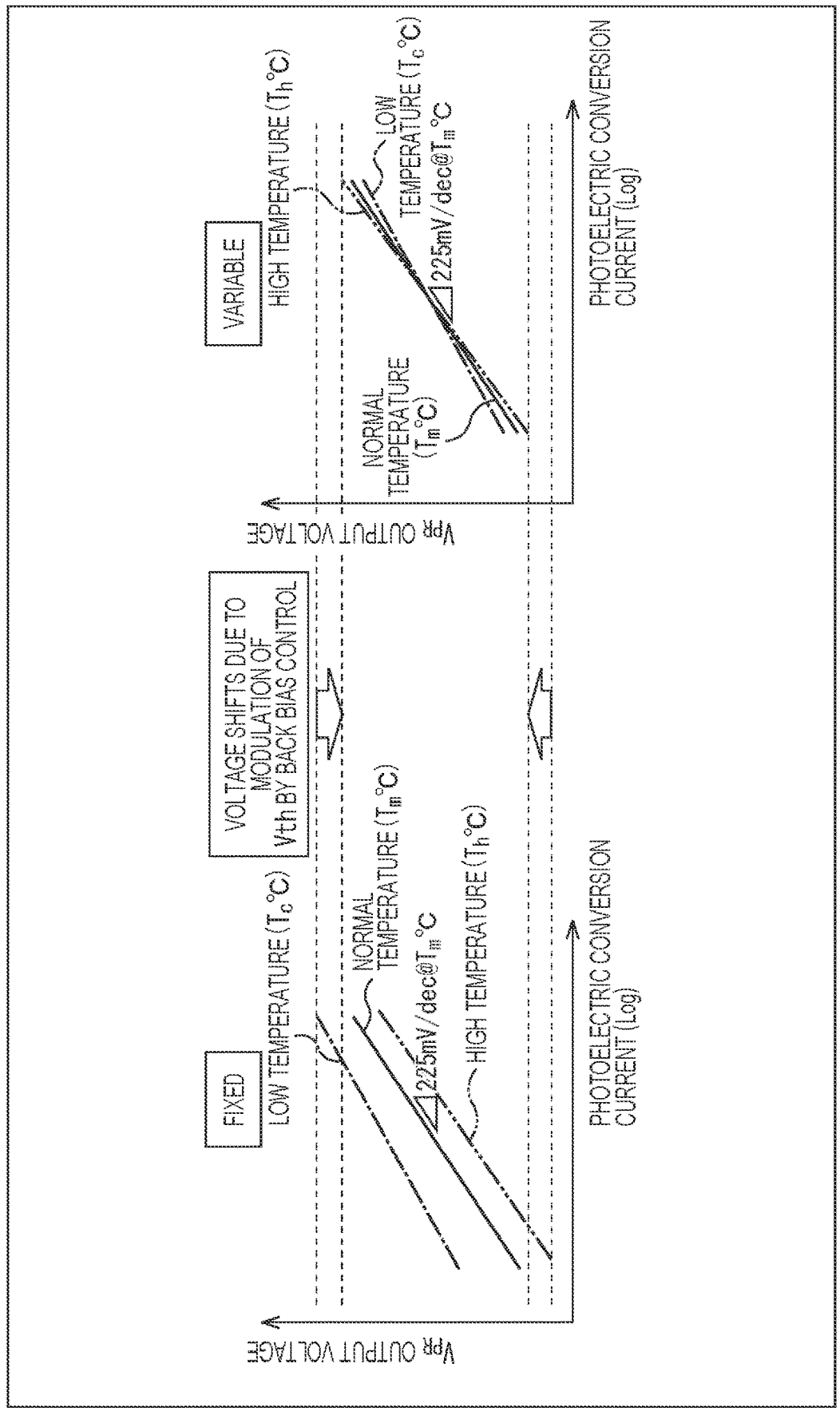
FIG. 19 is a diagram illustrating examples of a range of an output voltage in a case where a fixed negative potential is supplied and in a case where a negative potential according to temperature is supplied.

FIG. 19 is a diagram illustrating examples of a range of an output voltage in a case where a fixed negative potential is supplied and in a case where a negative potential according to temperature is supplied. In FIG. 19, the horizontal axis represents the photoelectric conversion current, and the vertical axis represents the output voltage $V_{PR}$.

The left side of FIG. 19 illustrates a relationship between the photoelectric conversion current and the output voltage $V_{PR}$ at the high temperature ($T_h°$ C.), the normal temperature ($T_m°$ C.), and the low temperature ($T_c°$ C.) in a case where two stages of diode-connected Log transistors are provided and in a case where a fixed negative potential is supplied. The configuration on the left side of FIG. 19 in a case where the fixed negative potential is supplied corresponds to the example of the fourth configuration of the voltage-current conversion circuit 102 in FIG. 16.

In this case, a fluctuation range of the output due to a temperature change increases, and the output range increases. In addition, when the temperature is high and the photoelectric conversion current is low, the value of the voltage $V_{GS}$ between the gate and the source of the diode-connected Log transistor does not become a positive value, and thus there is a possibility that the linearity is deteriorated. In the diode-connected transistor, as illustrated on the left side of FIG. 20, a voltage $V_{DS}$ between the drain and the source is equal to the voltage $V_{GS}$ between the gate and the source.

Figure 20:
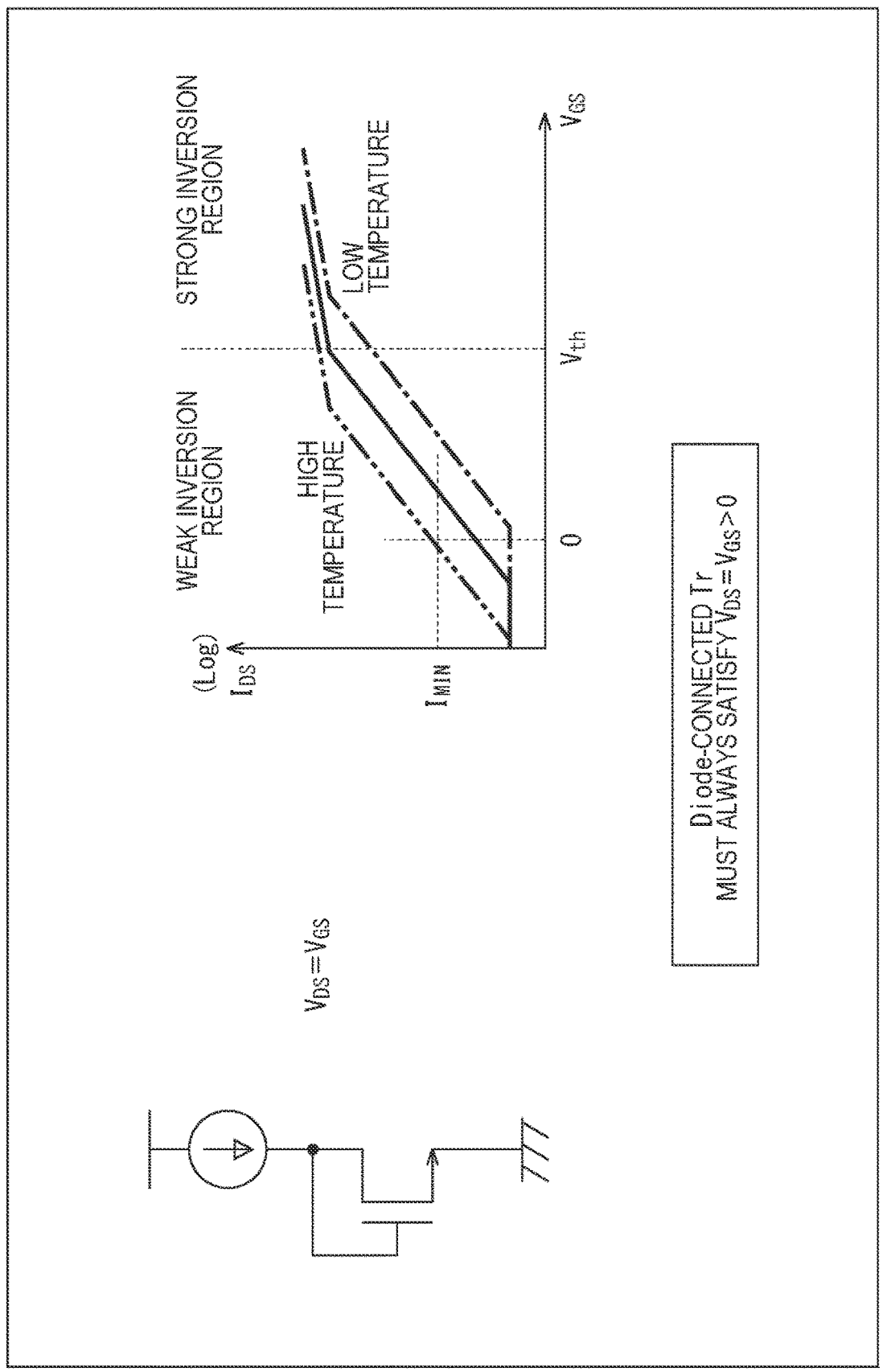
FIG. 20 is a diagram for describing characteristics of a diode-connected transistor.

A relationship between the voltage $V_{GS}$ between the gate and the source and a current $I_{DS}$ between the drain and the source at this time is illustrated on the right side of FIG. 20. When the temperature changes from normal temperature to high temperature, the threshold voltage $V_{th}$, which is a voltage at a boundary between a strong inversion region and a weak inversion region, shifts in the negative direction, and as illustrated on the right side of FIG. 20, the value of the voltage $V_{GS}$ at a predetermined current value also shifts in the negative direction.

Therefore, when the temperature increases from normal temperature to high temperature, $I_{MIN}$, which is a value of the current $I_{DS}$ at which the value of the voltage $V_{GS}$ becomes 0, becomes a high value. In a case where the voltage $V_{GS}$ is not a positive value in the diode-connected transistor, linearity is degraded, and thus, it is desirable that the voltage $V_{GS}$ is always a positive value.

The right side of FIG. 19 illustrates a relationship between the photoelectric conversion current and the output voltage $V_{PR}$ at the high temperature ($T_h°$ C.), the normal temperature ($T_m°$ C.), and the low temperature ($T_c°$ C.) in a case where two stages of diode-connected Log transistors are provided and in a case where a negative potential according to the temperature is supplied. The configuration on the right side of FIG. 19 in a case where the negative potential according to the temperature is supplied corresponds to the example of the fifth configuration of the voltage-current conversion circuit 102 in FIG. 18.

In a case where a negative potential according to the temperature is supplied, as compared with a case where a fixed negative potential is supplied, the threshold voltage $V_{th}$ is modulated by controlling the negative potential as indicated by the outlined arrow in FIG. 19, and thus, the upper limit of the output voltage $V_{PR}$ is shifted in the negative direction and the lower limit of the output voltage $V_{th}$ is shifted in a positive direction. Note that, in both the case where a fixed negative potential is supplied and the case where a negative potential according to the temperature is supplied, the gradient of a gain at the normal temperature is, for example, 225 mV/dec.

Therefore, by supplying a negative potential according to the temperature, the output range can be also reduced without changing the gain in a case where two stages of diode-connected Log transistors are provided. By reducing the output range, a sufficient dynamic range can be secured.

In addition, since the influence of the fluctuation of the threshold voltage $V_{th}$ due to the temperature is canceled by controlling the negative potential, the fluctuation of the current $I_{MIN}$ due to the temperature is suppressed. Therefore, in a case where the temperature is high and the photoelectric conversion current is low, the value of the photoelectric conversion current is also less likely to be lower than the value of the current $I_{MIN}$, and thus the linearity is less likely to be deteriorated and can be improved.

As described above, by providing the two stages of diode-connected Log transistors and supplying the negative potential according to the temperature, it is possible to achieve a high-gain voltage-current conversion circuit capable of operating at a low power supply voltage while securing a sufficient dynamic range.

Arrangement Example of Voltage-Current Conversion Circuit

Figure 21:
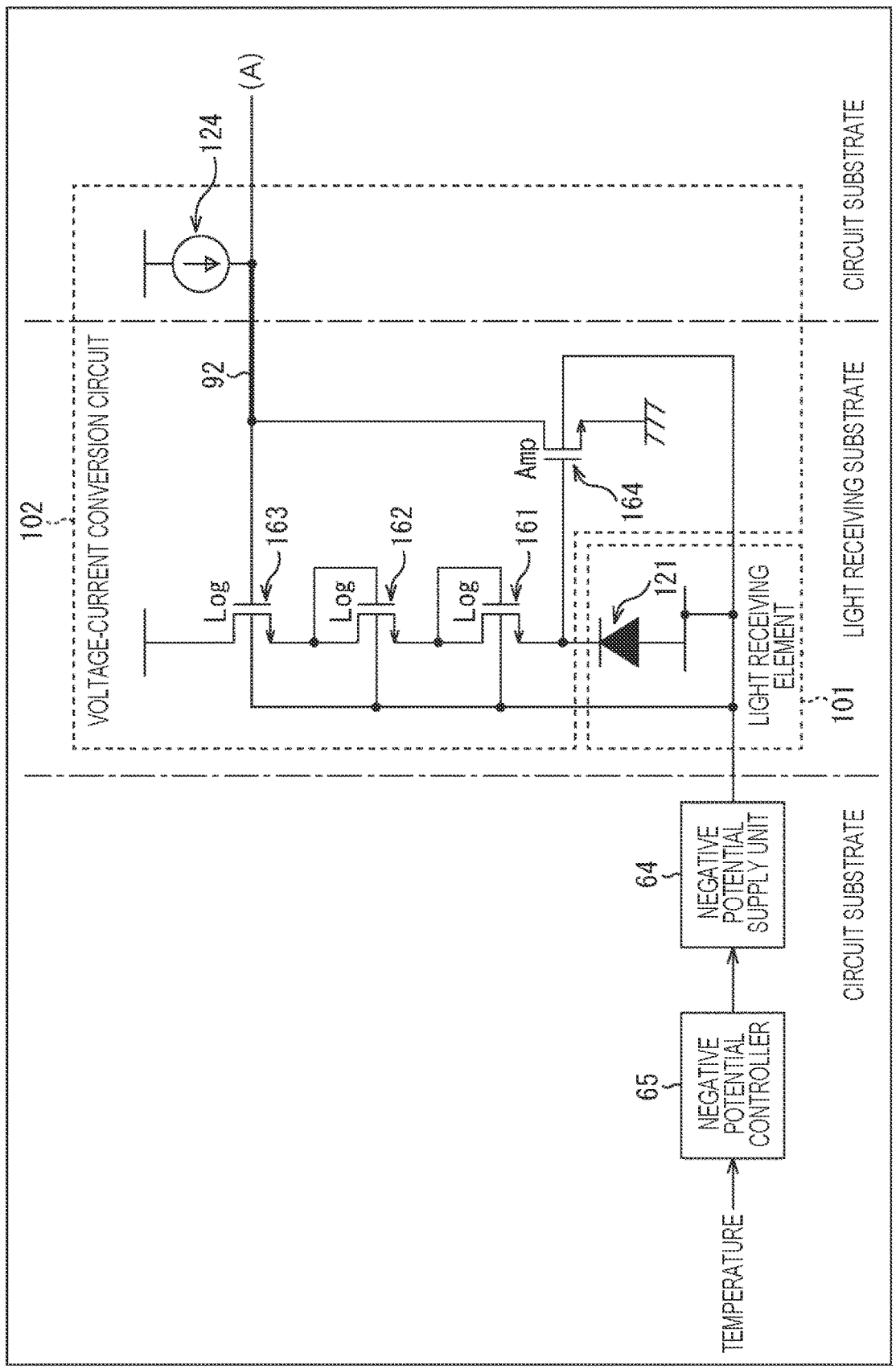
FIG. 21 is a diagram illustrating an arrangement example of a circuit such as a voltage-current conversion circuit.

FIG. 21 is a diagram illustrating an arrangement example of a circuit such as the voltage-current conversion circuit 102.

As described above, the negative potential supply unit 64 and the negative potential controller 65 are provided on the circuit substrate 32. The light receiving element 101 including the photodiode 121 is provided on the light receiving substrate 31.

In the configuration of the voltage-current conversion circuit 102, the Log transistors 161 to 163 and the Amp transistor 164 are provided on the light receiving substrate 31, and the constant current source 124 is provided on the circuit substrate 32. Although FIG. 21 illustrates the voltage-current conversion circuit 102 having the fifth configuration, in the first to fourth configurations, too, a configuration other than the constant current source 124 is provided on the light receiving substrate 31, and the constant current source 124 is provided on the circuit substrate 32.

Other Configuration Examples

Figure 22:
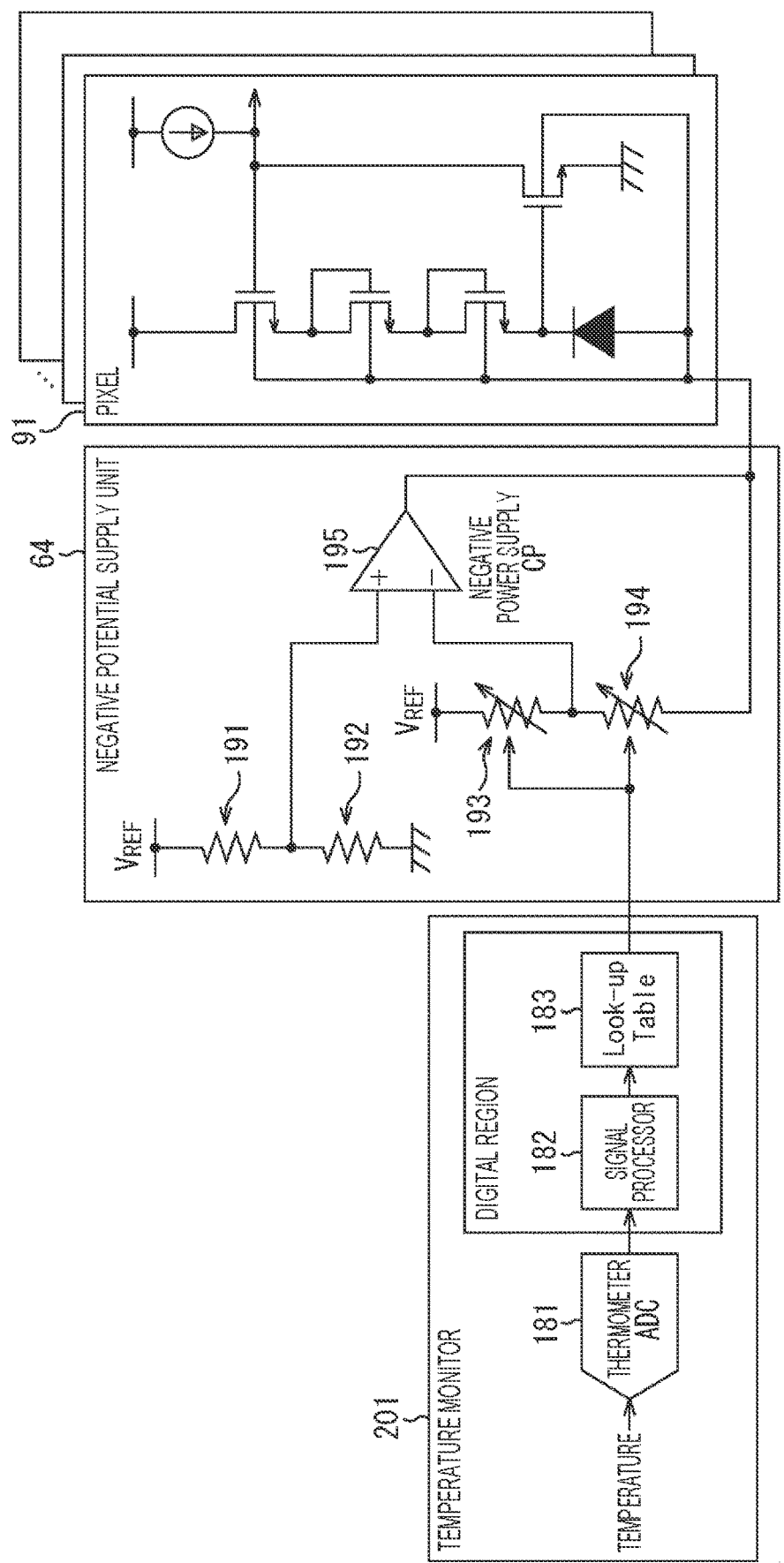
FIG. 22 is a diagram illustrating a configuration example of the negative potential supply unit and a negative potential controller.

Configuration Examples of Negative Potential Supply Unit and Negative Potential Controller FIG. 22 is a diagram illustrating a configuration example of the negative potential supply unit 64 and the negative potential controller 65.

As illustrated in FIG. 22, in the negative potential controller 65, a temperature monitor 201 is achieved. The temperature monitor 201 includes a thermometer analog to digital converter (ADC) 181, a signal processor 182, and a look-up table 183. The signal processor 182 and the look-up table 183 have a configuration of a digital region that handles digital signals.

The thermometer ADC 181 measures the temperature of the light receiving substrate 31 and generates temperature data indicating the measurement result. The temperature data generated by the thermometer ADC 181 is supplied to the signal processor 182.

The signal processor 182 performs various types of signal processing on the temperature data supplied from the thermometer ADC 181. For example, calibration of an error of a measured temperature, suppression of noise by a filter (for example, a moving average filter), and hysteresis are performed by the signal processor 182. The hysteresis is processing performed to prevent excessive voltage switching operation near a threshold value.

The temperature monitor 201 refers to information recorded in the look-up table 183 and controls resistance values of the variable resistances 193 and 194 so as to cause the negative potential supply unit 64 to output the negative potential according to the temperature data after the signal processing by the signal processor 182. In the look-up table 183, the temperature data and the resistance values are recorded in association with each other. The negative potential controller 65 functions as a potential controller that controls the negative potential supply unit 64 on the basis of information indicating a relationship between the temperature data and the negative potential.

The negative potential supply unit 64 includes resistances 191 and 192, the variable resistances 193 and 194, and a negative power supply charge pump (CP) 195.

The resistances 191 and 192 are connected in series between a terminal of a REF voltage $V_{REF}$ and the terminal of the ground potential. A connection point between the resistance 191 and the resistance 192 is connected to a non-inverting input terminal of the negative power supply CP 195.

The variable resistances 193 and 194 are connected in series between the terminal of the REF voltage $V_{REF}$ and the terminal of the ground potential. A connection point between the variable resistance 193 and the variable resistance 194 is connected to an inverting input terminal of the negative power supply CP 195.

The negative power supply CP 195 compares the voltage supplied to the non-inverting input terminal with the voltage supplied to the inverting input terminal, and supplies a negative potential according to the potential difference to the voltage-current conversion circuit 102 of each pixel 91.

Note that a value with which the output voltage of the voltage-current conversion circuit 102 falls within a target voltage range at each temperature recorded in the look-up table 183 is set as the REF voltage $V_{REF}$. The set value of the REF voltage $V_{REF}$ is obtained by being evaluated in advance.

Figure 23:
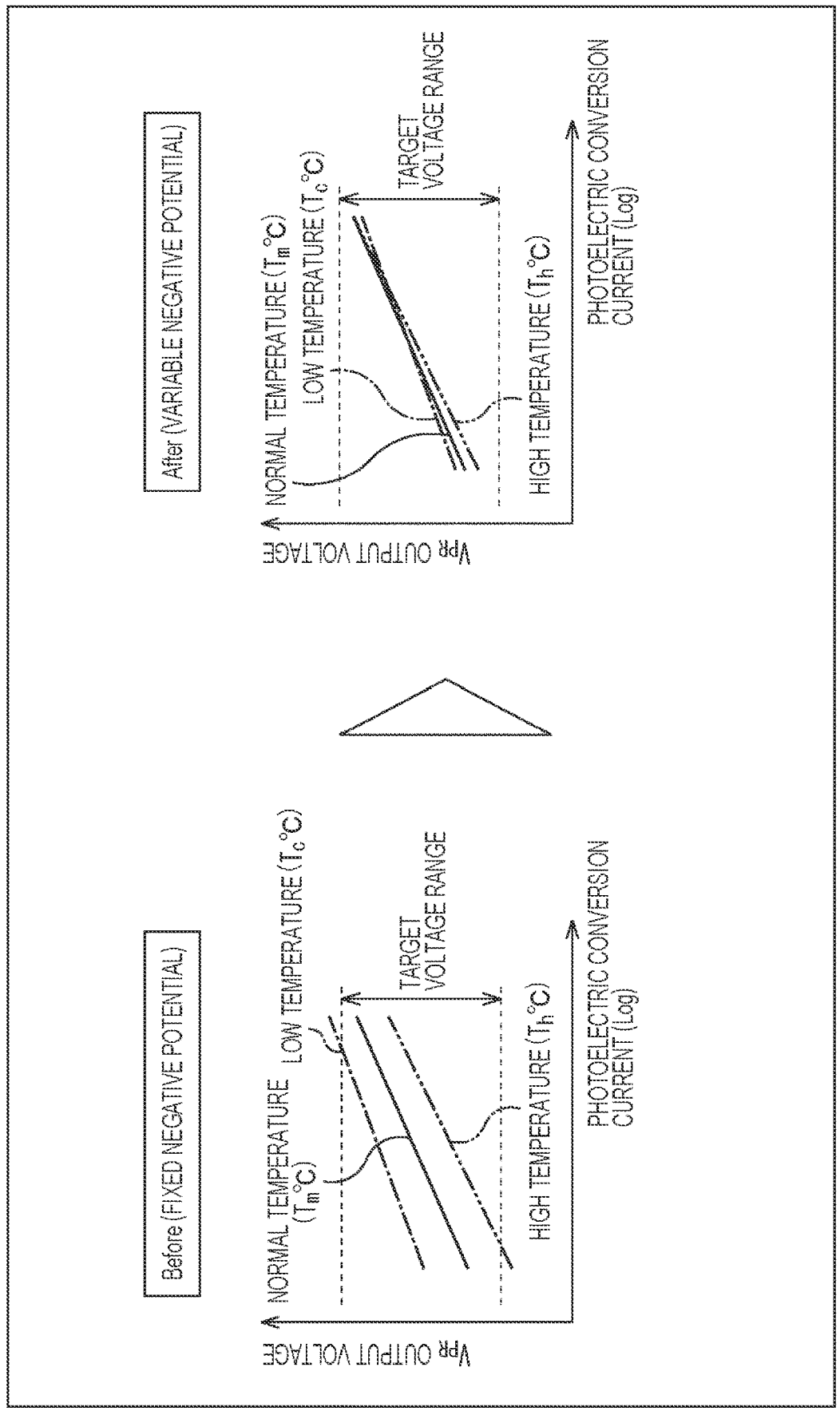
FIG. 23 is a diagram illustrating a change in an output range of the output voltage of the voltage-current conversion circuit due to supply of the negative potential generated by using a REF voltage.

FIG. 23 is a diagram illustrating a change in an output range of the output voltage of the voltage-current conversion circuit 102 due to supply of the negative potential generated by using the REF voltage $V_{REF}$.

By supplying a fixed negative potential to the voltage-current conversion circuit 102, as illustrated on the left side of FIG. 23, when the temperature is low and the photoelectric conversion current is high, an output voltage higher than an upper limit of the target voltage range is output. In addition, when the temperature is high and the photoelectric conversion current is low, an output voltage lower than a lower limit of the target voltage range is output.

By supplying a negative potential generated by using the REF voltage $V_{REF}$ and according to the temperature to the voltage-current conversion circuit 102, an output voltage within the target voltage range can be output from the voltage-current conversion circuit 102 under any temperature condition as illustrated on the right side of FIG. 23.

Configuration Example of Buffer, Subtractor, and Quantizer

Figure 24:
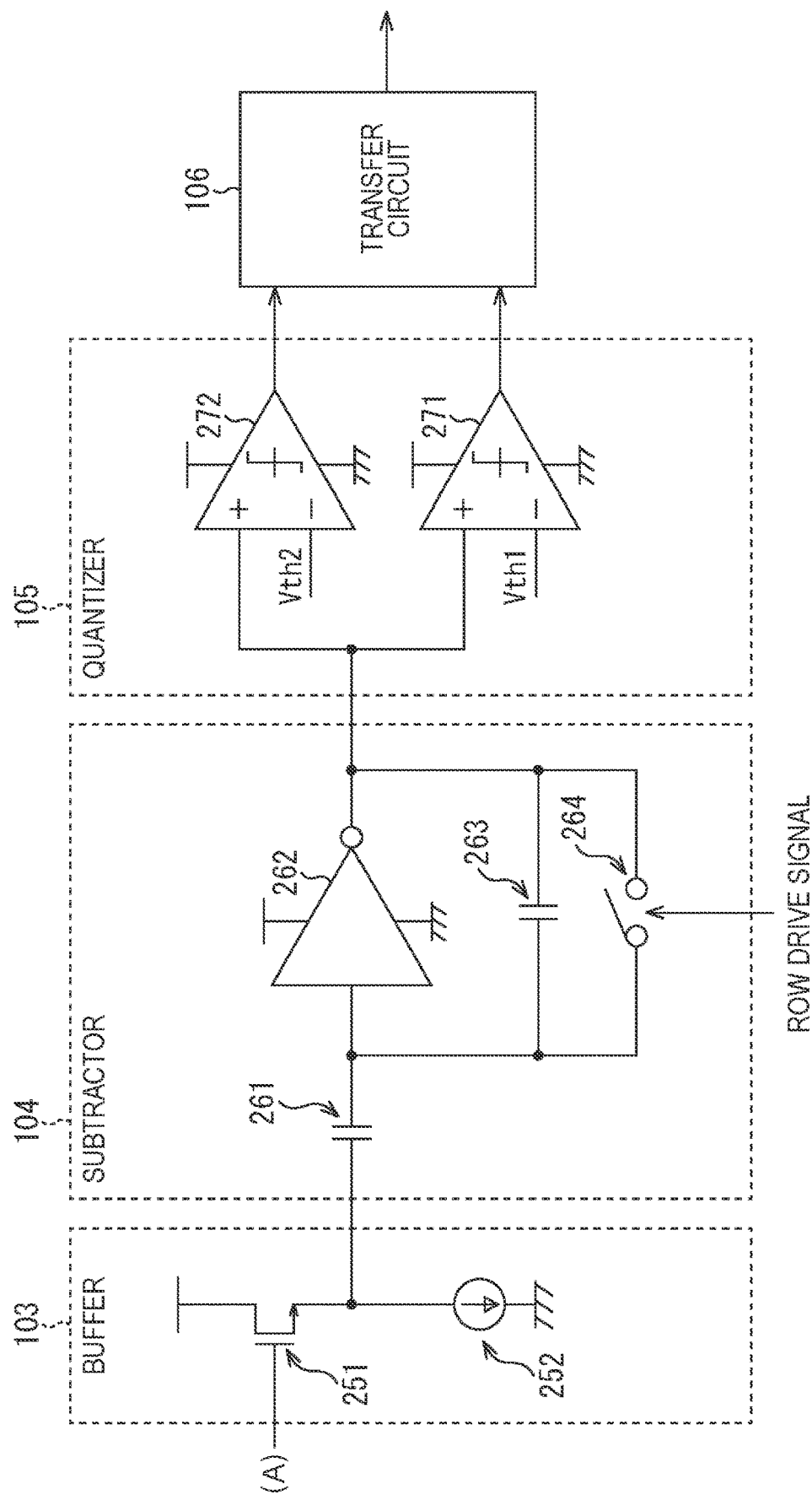
FIG. 24 is a circuit diagram illustrating a configuration example of a buffer, a subtractor, and a quantizer.

FIG. 24 is a circuit diagram illustrating a configuration example of the buffer 103, the subtractor 104, and the quantizer 105.

As illustrated in FIG. 24, the buffer 103 includes a transistor 251 and a constant current source 252. For example, a MOS transistor is used as the transistor 251.

The transistor 251 and the constant current source 252 are connected in series between the terminal of the power supply voltage and the terminal of the ground potential. The gate of the transistor 251 is connected to an output terminal of the voltage-current conversion circuit 102. A voltage signal is output to the subtractor 104 from a connection point between the transistor 251 and the constant current source 252.

The subtractor 104 includes a capacitor 261, an inverter 262, a capacitor 263, and a switch 264.

One end of the capacitor 261 is connected to an output terminal of the buffer 103, and the other end is connected to an input terminal of the inverter 262.

The inverter 262 inverts a voltage signal input via the capacitor 261. The inverter 262 outputs the inverted signal. The capacitor 263 is connected in parallel to the inverter 262. The switch 264 opens and closes a path connecting both ends of the capacitor 263 in accordance with a row drive signal.

Such a configuration allows a subtraction operation of the voltage signal supplied from the buffer 103. The gain of a subtraction result at this time is obtained on the basis of a capacitance values of the capacitor 261 and the capacitor 263. The voltage signal as the subtraction result by the subtractor 104 is output to the quantizer 105.

The quantizer 105 includes comparators 271 and 272.

A non-inverting input terminal of the comparators 271 and 272 is connected to an output terminal of the subtractor 104. A bias voltage $V_{th1}$ indicating an upper limit threshold value is applied to an inverting input terminal of the comparator 271, and a bias voltage $V_{th2}$ indicating a lower limit threshold value is applied to an inverting input terminal of the comparator 272.

The comparator 271 compares the voltage signal supplied from the subtractor 104 with the bias voltage $V_{th1}$ indicating the upper limit threshold value, and outputs a signal indicating the comparison result to the transfer circuit 106 as an on-event detection signal. For example, in a case where the voltage signal exceeds the upper limit threshold value, a high-level on-event detection signal is output.

The comparator 272 compares the voltage signal supplied from the subtractor 104 with the bias voltage $V_{th2}$ indicating the lower limit threshold value, and outputs a signal indicating the comparison result to the transfer circuit 106 as an off-event detection signal. For example, in a case where the voltage signal falls below the lower limit threshold value, a low-level off-event detection signal is output.

The buffer 103, the subtractor 104, the quantizer 105, and the transfer circuit 106 are provided on the circuit substrate 32. Note that the configurations of the circuits respectively disposed on the light receiving substrate 31 and the circuit substrate 32 are not limited to the above configurations. For example, the entire light receiving element 101 and the voltage-current conversion circuit 102 may be disposed on the light receiving substrate 31, and the other components may be disposed on the circuit substrate 32. Alternatively, the light receiving element 101, the voltage-current conversion circuit 102, and the buffer 103 may be disposed on the light receiving substrate 31, and the other components may be disposed on the circuit substrate 32. Alternatively, the light receiving element 101, the voltage-current conversion circuit 102, the buffer 103, and the capacitor 261 may be disposed on the light receiving substrate 31, and the other components may be disposed on the circuit substrate 32. Alternatively, the light receiving element 101, the voltage-current conversion circuit 102, the buffer 103, the subtractor 104, and the quantizer 105 may be disposed on the light receiving substrate 31, and the other components may be disposed on the circuit substrate 32.

2. Modifications

Modification of Second Configuration of Voltage-Current Conversion Circuit

Figure 25:
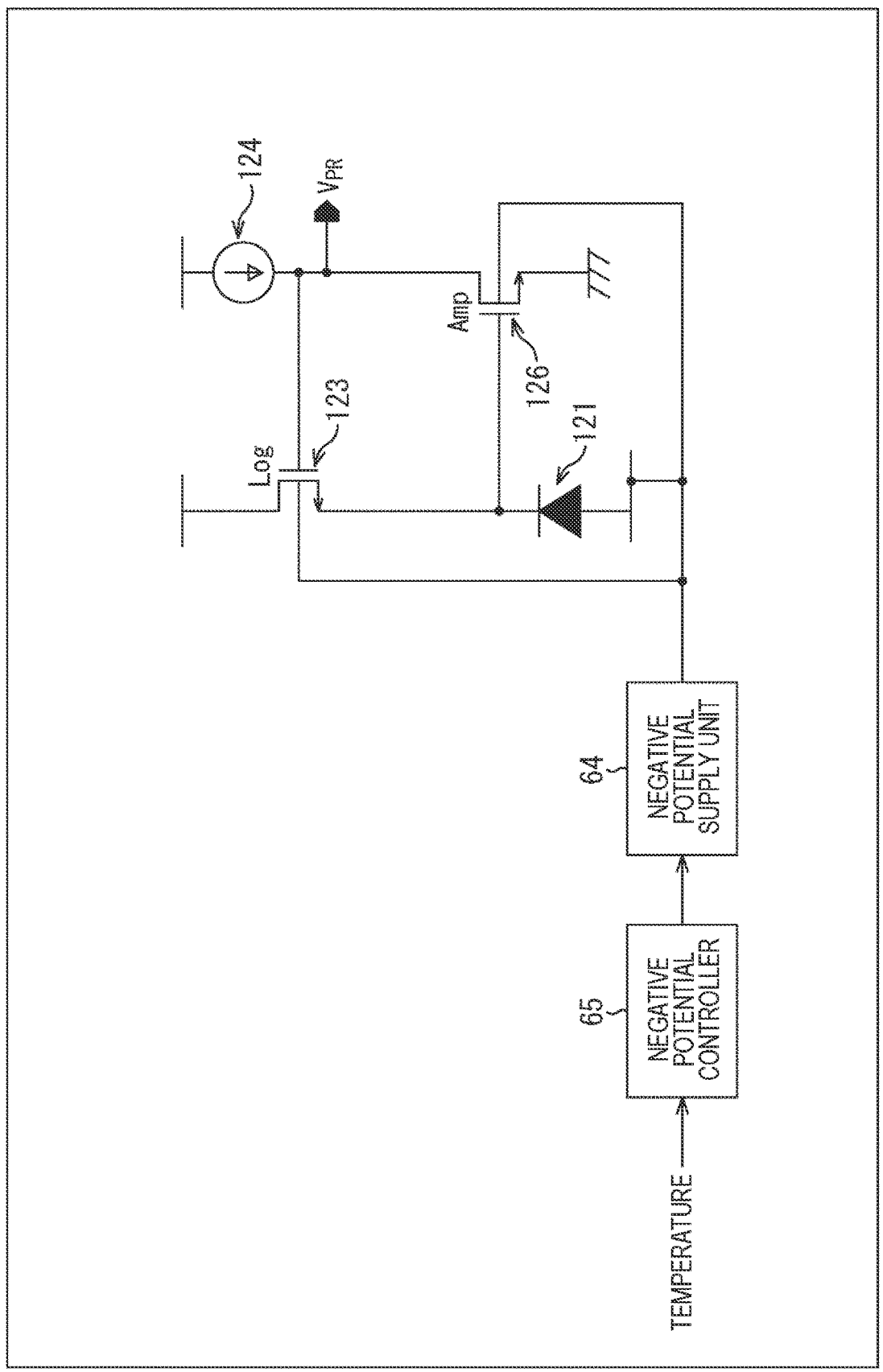
FIG. 25 is a circuit diagram illustrating a modification of the second configuration of the voltage-current conversion circuit.

FIG. 25 is a circuit diagram illustrating a modification of the second configuration of the voltage-current conversion circuit 102.

The modification in FIG. 25 has a configuration in which the number of combinations of the Log transistors and the Amp transistors in the second configuration of the voltage-current conversion circuit 102 described in FIG. 10 is changed to one stage. In other words, as compared with the voltage-current conversion circuit 102 in FIG. 10, the Log transistor 122 and the Amp transistor 125 are not provided in the modification in FIG. 25.

The source of the Log transistor 123 is connected to the cathode of the photodiode 121, and the gate of the Log transistor 123 is connected to the terminal of the constant current source 124, the drain of the Amp transistor 126, and the input terminal of the buffer 103. The Log transistor 123 is connected in series between the terminal of the power supply voltage and the cathode of the photodiode 121.

The Amp transistor 126 is connected in series between the terminal of the constant current source 124 and the terminal of the reference potential.

By such a configuration, the photoelectric conversion current from the photodiode 121 is converted into a voltage signal of an output voltage $V_R$. The output voltage $V_R$ at this time is represented by the following equation (4).

[Math. 4]

$$V_{PR} = V_{GS,\,Log} + V_{GS,\,Amp} \tag{4}$$

The equation (4) represents that the output voltage $V_{PR}$ is a voltage obtained by adding the output voltage $V_{GS,\,Log}$ of the Log transistor 123 and the output voltages $V_{GS,\,Amp}$ of the Amp transistor 126.

Figure 26:
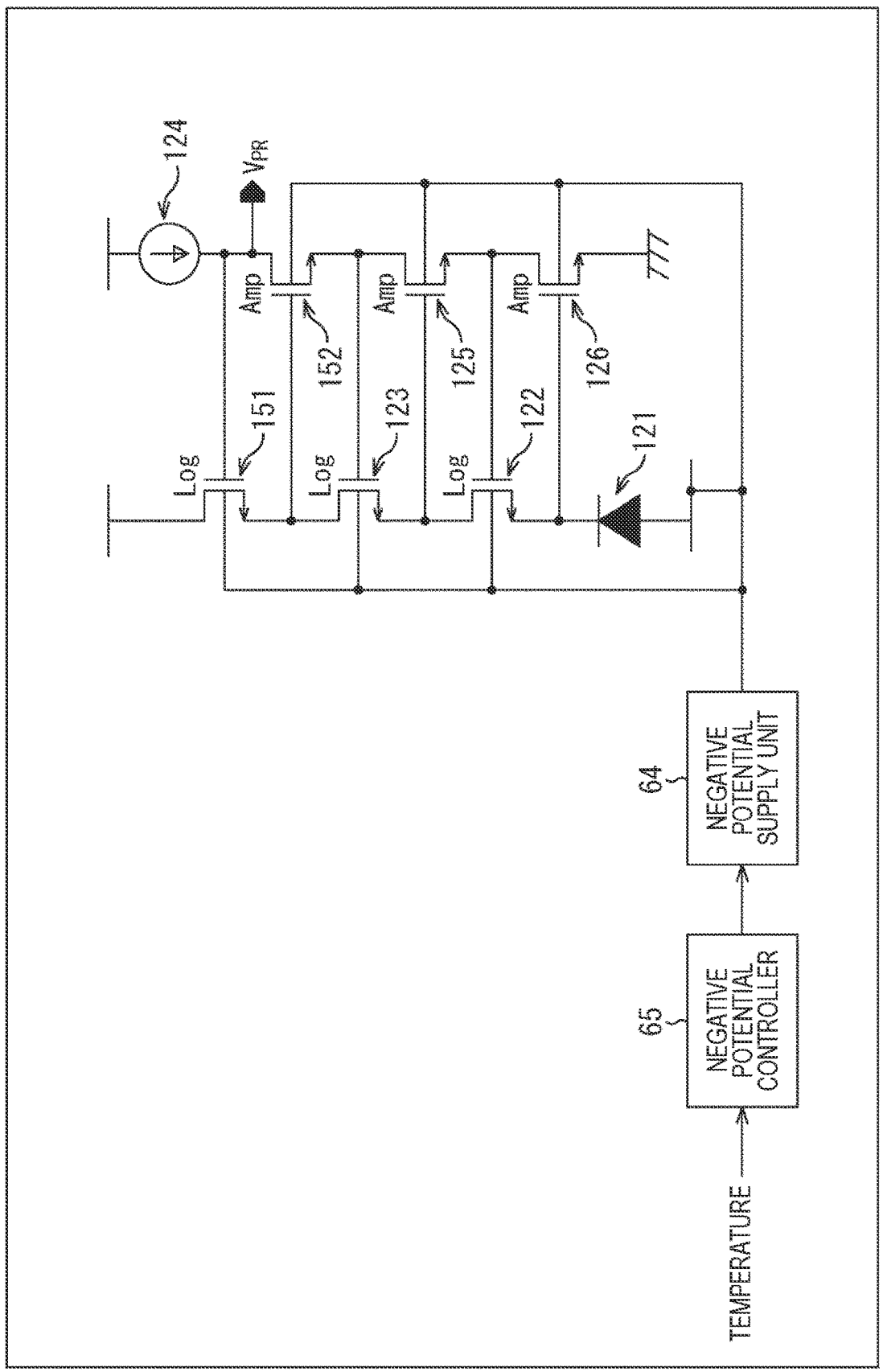
FIG. 26 is a circuit diagram illustrating another modification of the second configuration of the voltage-current conversion circuit.

FIG. 26 is a circuit diagram illustrating another modification of the second configuration of the voltage-current conversion circuit 102.

The modification in FIG. 26 has a configuration in which the number of combinations of the Log transistors and the Amp transistors in the second configuration of the voltage-current conversion circuit 102 described in FIG. 10 is changed to three stages. In other words, as compared with the voltage-current conversion circuit 102 in FIG. 10, the Log transistor 151 and the Amp transistor 152 are provided in the modification in FIG. 26.

Furthermore, the modification in FIG. 26 has the same configuration as the configuration in which the negative potential controller 65 is provided in the third configuration of the voltage-current conversion circuit 102 described in FIG. 14.

The negative potential supply unit 64 supplies a negative potential according to the temperature to the photodiode 121 and the back gate of each of the Log transistors 122, 123, and 151 and the Amp transistors 125, 126, and 152 under the control of the negative potential controller 65.

Note that the output voltage $V_{PR}$ in this case is represented by the above equation (2).

As described above, the number of combinations of the Log transistors and the Amp transistors provided in the second configuration of the voltage-current conversion circuit 102 can be an arbitrary number of stages of one or more stages.

By increasing the number of combinations of transistors, the gain of the voltage-current conversion circuit 102 can be increased, and the SNR of the pixel signal can be increased. However, in a case where a fixed negative potential is supplied, as the number of combinations of transistors increases, the output range of the output voltage of the voltage-current conversion circuit 102 greatly depends on the temperature, and there is a possibility that a sufficient dynamic range cannot be secured.

In this case, a sufficient dynamic range can be secured by increasing the power supply voltage, which is not desirable since power consumption increases. In addition, if the threshold voltage $V_{th}$ is optimized for every transistor, the number of masks in the manufacturing process increases, which is not desirable.

In the second configuration of the voltage-current conversion circuit 102, since the negative potential controlled in accordance with the temperature is supplied, the output range of the output voltage $V_{PR}$ can be adjusted. Therefore, it is possible to achieve the high-gain voltage-current conversion circuit 102 while ensuring a sufficient dynamic range without increasing the power consumption and optimizing the threshold voltage $V_{th}$ for every transistor, and to maximize the SNR of the pixel signal.

Modification of Fifth Configuration of Voltage-Current Conversion Circuit

Figure 27:
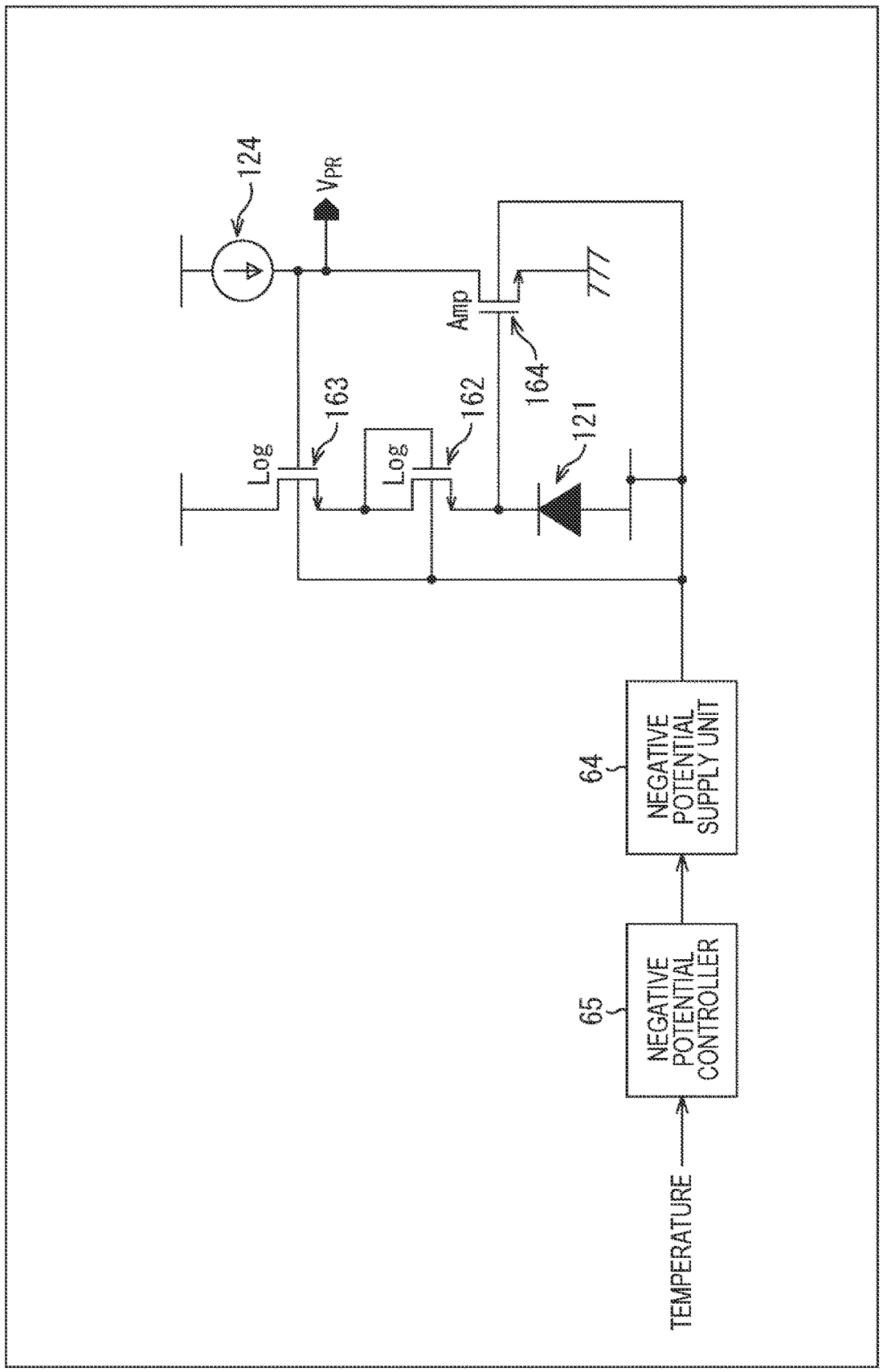
FIG. 27 is a circuit diagram illustrating a modification of the fifth configuration example of the voltage-current conversion circuit.

FIG. 27 is a circuit diagram illustrating a modification of the fifth configuration of the voltage-current conversion circuit 102.

The modification in FIG. 27 has a configuration in which the number of diode-connected Log transistors in the fifth configuration of the voltage-current conversion circuit 102 described in FIG. 18 is changed to one stage. In other words, as compared with the voltage-current conversion circuit 102 in FIG. 18, the Log transistor 161 is not provided in the modification in FIG. 27.

The source of the Log transistor 162 is connected to the cathode of the photodiode 121 and the gate of the Amp transistor 164. The Log transistor 162 and the Log transistor 163 are connected in series between the terminal of the power supply voltage and the cathode of the photodiode 121.

By such a configuration, the photoelectric conversion current from the photodiode 121 is converted into a voltage signal of an output voltage $V_{PR}$. The output voltage $V_{PR}$ at this time is represented by the following equation (5).

[Math. 5]

$$V_{PR} = 2 \cdot V_{GS, Log} + V_{GS, Amp} \quad (5)$$

The equation (5) represents that the output voltage $V_{PR}$ is a voltage obtained by adding the output voltage $V_{GS, Log}$ of the diode-connected Log transistor 162, the output voltage $V_{GS, Log}$ of the Log transistor 163 not diode-connected, and the output voltage $V_{GS, Amp}$ of the Amp transistor 164.

Figure 28:
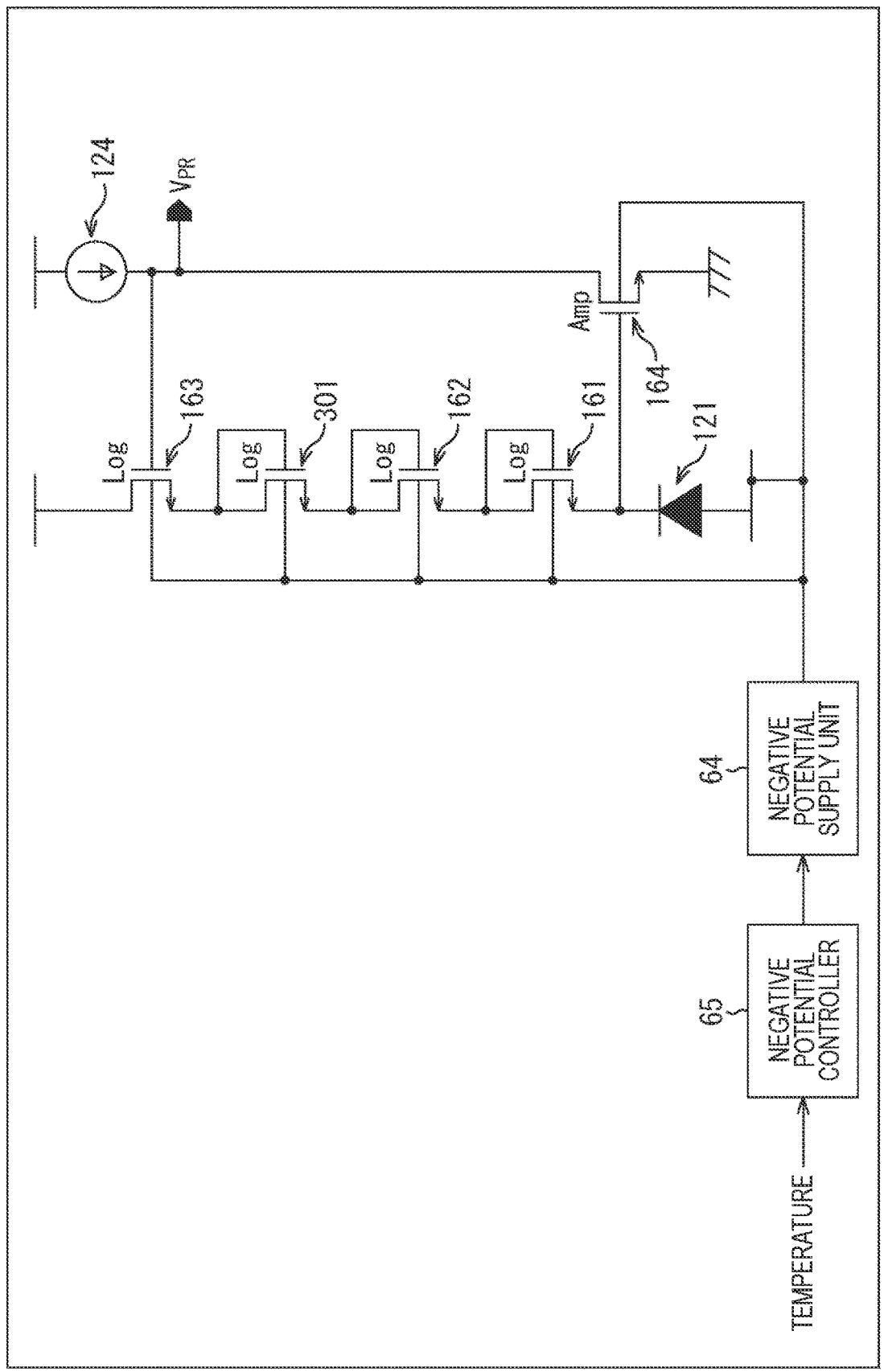
FIG. 28 is a circuit diagram illustrating another modification of the fifth configuration example of the voltage-current conversion circuit.

FIG. 28 is a circuit diagram illustrating another modification of the fifth configuration of the voltage-current conversion circuit 102.

The modification in FIG. 28 has a configuration in which the number of diode-connected Log transistors in the fifth configuration of the voltage-current conversion circuit 102 described in FIG. 18 is changed to three stages. In other words, as compared with the voltage-current conversion circuit 102 in FIG. 18, a diode-connected Log transistor 301 is provided in the modification in FIG. 28.

The source of the Log transistor 301 is connected to the drain of the Log transistor 162, and the gate and the drain of the Log transistor 301 are connected to the source of the Log transistor 163.

The Log transistor 301 converts the photoelectric conversion current into a voltage between the gate and the source, and outputs the voltage from the gate.

The negative potential supply unit 64 also supplies a negative potential according to the temperature to the Log transistor 301 under the control of the negative potential controller 65.

By such a configuration, the photoelectric conversion current from the photodiode 121 is converted into a voltage signal of an output voltage $V_R$. The output voltage $V_R$ at this time is represented by the following equation (6).

[Math. 6]

$$V_{PR} = 4 \cdot V_{GS, Log} + V_{GS, Amp} \quad (6)$$

The equation (6) represents that the output voltage $V_{PR}$ is a voltage obtained by adding each output voltage $V_{GS, Log}$ of the diode-connected Log transistors 161, 162, and 301 the output voltage $V_{GS, Log}$ of the Log transistor 163 not diode-connected, and the output voltage $V_{GS, Amp}$ of the Amp transistor 164.

As described above, the number of combinations of the Log transistors provided in the fifth configuration of the voltage-current conversion circuit 102 can be an arbitrary number of stages of one or more stages. Note that, in the fourth configuration, too, the number of diode-connected Log transistors can be an arbitrary number of stages of one or more stages.

When the diode-connected Log transistor is in an operation state in which the voltage $V_{GS}$ between the gate and the source is larger than 0, the diode-connected Log transistor can output a voltage equivalent to the output voltage $V_{GS, Log}$ of the Log transistor not diode-connected.

By providing one stage of diode-connected Log transistor instead of a combination of one stage of Log transistor and Amp transistor, it is not necessary to provide one stage of Amp transistor, and thus the number of Amp transistors can be reduced.

Since the number of Amp transistors is reduced, the upper limit of the output range of the output voltage of the voltage-current conversion circuit is reduced, and thus there is room for higher gain.

Furthermore, in the fifth configuration of the voltage-current conversion circuit 102, since the negative potential fluctuated in accordance with the temperature is supplied, the output range can be adjusted. Therefore, it is possible to achieve the high-gain voltage-current conversion circuit 102 while ensuring a sufficient dynamic range without increasing the power consumption and optimizing the threshold voltage $V_th$ for every transistor, and to maximize the SNR of the pixel signal.

Modification of Circuit Substrate

Figure 29:
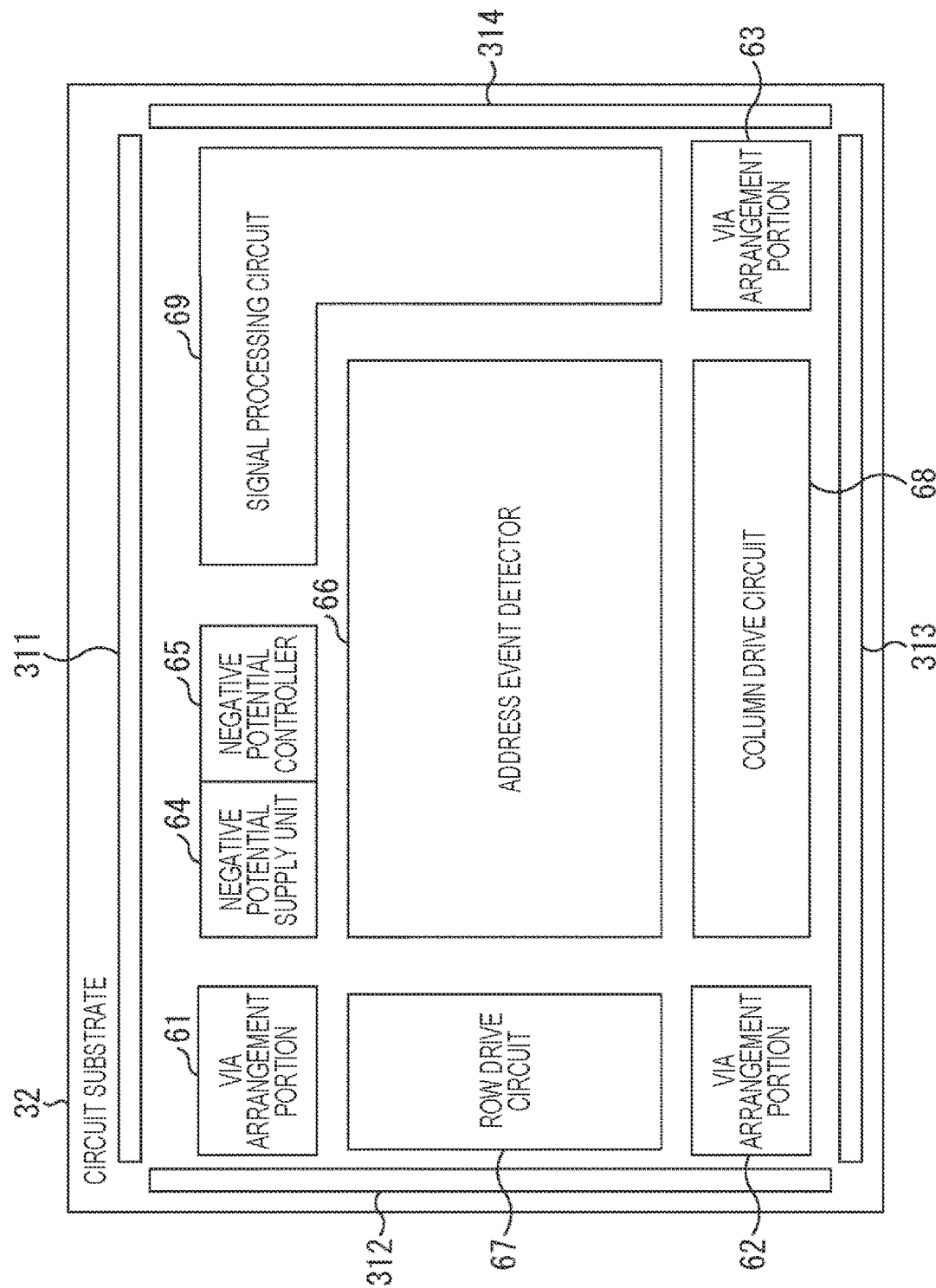
FIG. 29 is a plan view illustrating a modification of the circuit substrate.

FIG. 29 is a plan view illustrating a modification of the circuit substrate 32.

The configuration of the circuit substrate 32 illustrated in FIG. 29 is different from the configuration illustrated in FIG. 4 in that terminal units 311 to 314 are provided at upper, lower, left, and right edges of the circuit substrate 32, respectively.

The terminal unit 311 is provided at an upper end of the circuit substrate 32, and the terminal unit 312 is provided at a left end of the circuit substrate 32. The terminal unit 313 is provided at a lower end of the circuit substrate 32, and the terminal unit 314 is provided at a right end of the circuit substrate 32. Each of the terminal units 311 to 314 includes, for example, a plurality of pad electrodes disposed in parallel. Note that although FIG. 29 illustrates a configuration in which four terminal units are provided corresponding to the upper, lower, left, and right edges of the circuit substrate 32, it is not always necessary to provide four terminal units such as the terminal units 311 to 313 corresponding to the upper, lower, and left edges, for example.

In the circuit substrate 32, the negative potential supply unit 64 and the negative potential controller 65 are provided between the terminal unit 311 and the address event detector 66.

Modification of Solid-State Imaging Element

In addition to the pixels that detects an address event, pixels that detects luminance may be provided in the solid-state imaging element 12. In this case, an event detection circuit used to detect an address event and a luminance detection circuit used to detect luminance (intensity) are arranged in the light receiver 44 of the light receiving substrate 31. In the following description, these detection circuits, if not required to be distinguished, are simply referred to as detection circuits.

Figure 30:
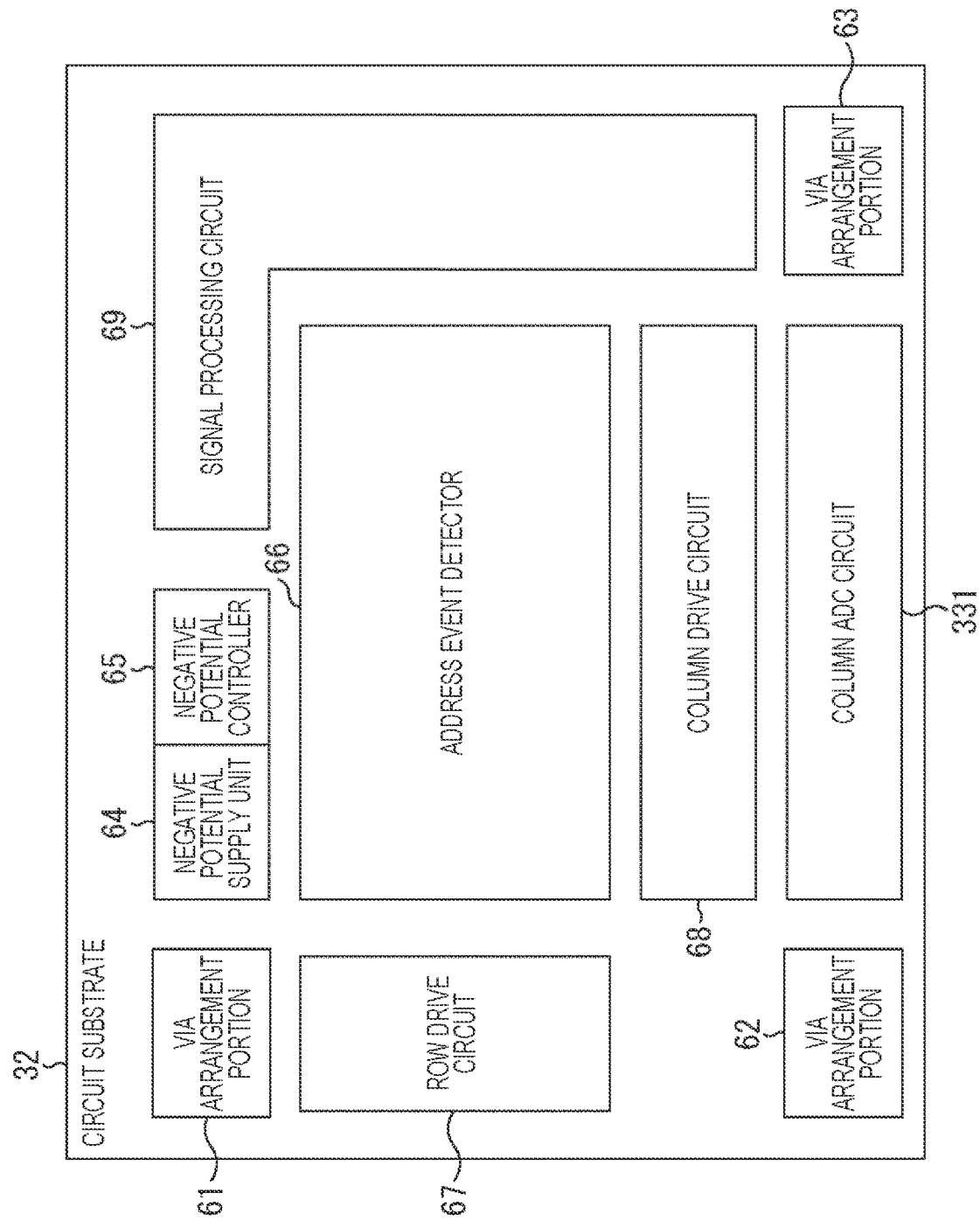
FIG. 30 is a plan view illustrating an example of the circuit substrate in a case where a pixel that detects luminance is provided.

FIG. 30 is a plan view illustrating an example of the circuit substrate 32 in a case where a pixel that detects luminance is provided.

The configuration of the circuit substrate 32 illustrated in FIG. 30 is different from the configuration illustrated in FIG. 4 in that a column ADC circuit 331 is provided.

The column ADC circuit 331 performs predetermined signal processing on a luminance signal output from the luminance detection circuit for every column of the luminance detection circuit of the light receiver 44, and temporarily holds the pixel signal after the signal processing. The pixel signals subjected to the signal processing in the column ADC circuit 331 are sequentially output to the signal processing circuit 69.

The signal processing circuit 69 performs predetermined signal processing on the pixel signal supplied from the column ADC circuit 331, and acquires image data having luminance information for every pixel.

Figure 31:
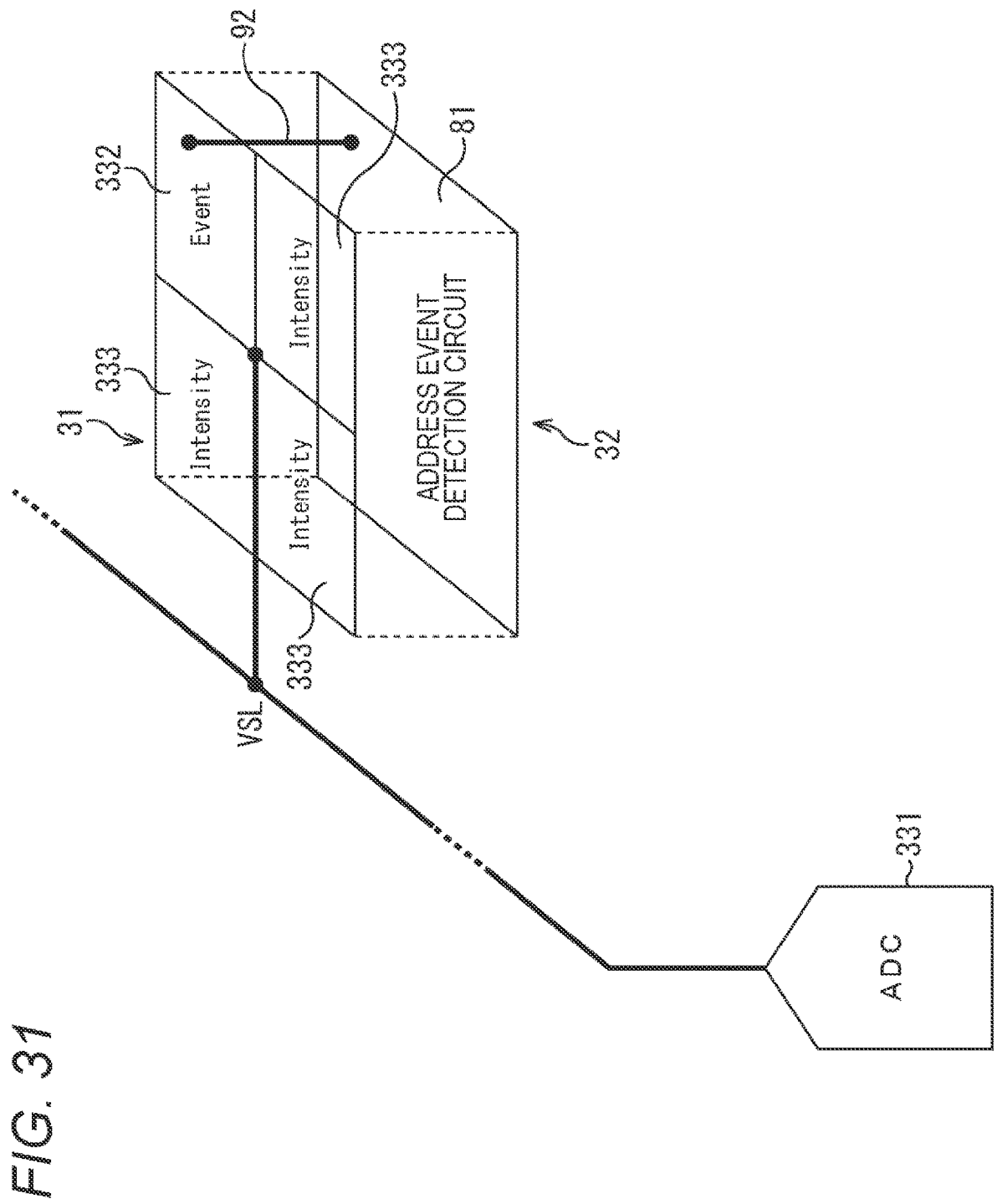
FIG. 31 is a diagram for describing the arrangement of a pixel that detects an address event and a pixel that detects luminance.

FIG. 31 is a diagram for describing the arrangement of a pixel that detects an address event and a pixel that detects luminance.

In the light receiver 44 of the light receiving substrate 31, event detection circuits 332 and luminance detection circuits 333 are disposed in a two-dimensional lattice pattern. In FIG. 31, four detection circuits are disposed in a lattice pattern in the light receiver 44. Among the four detection circuits, one event detection circuit 332 is disposed at an upper right position, and three luminance detection circuits 333 are disposed at other positions.

In the address event detector 66, the address event detection circuit 81 is disposed in a region corresponding to the four detection circuits.

The event detection circuit 332 corresponds to the light receiving circuit 51 described above, and is connected to the address event detection circuit 81 having the same address via the signal line 92.

The three luminance detection circuits 333 are collectively connected to the column ADC circuit 331 via a vertical signal line (VSL).

Figure 32:
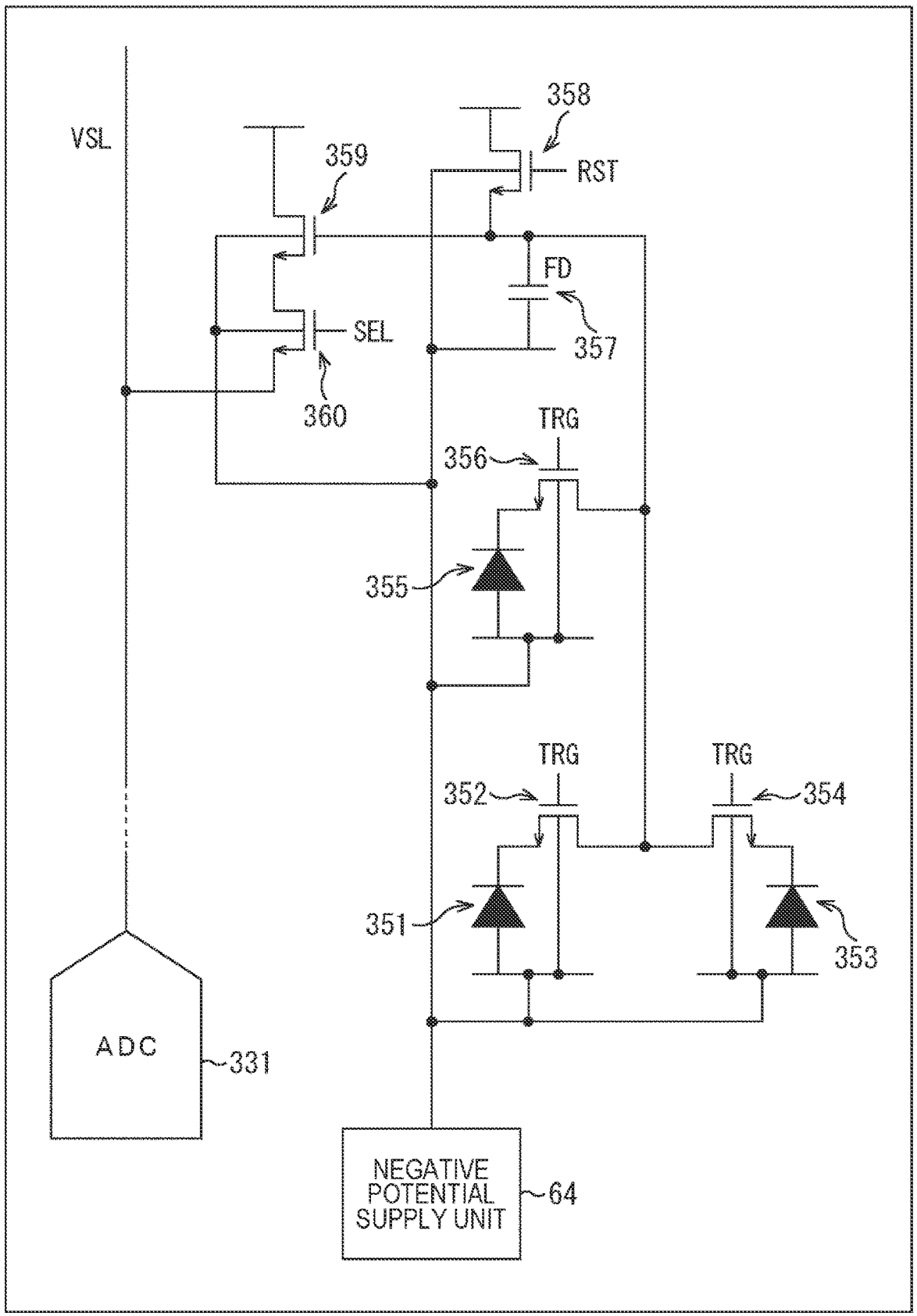
FIG. 32 is a circuit diagram illustrating a configuration example of three luminance detection circuits.

FIG. 32 is a circuit diagram illustrating a configuration example of the three luminance detection circuits 333.

As illustrated in FIG. 32, the luminance detection circuit 333 includes photodiodes 351, 353, and 355, transfer transistors 352, 354, and 356, a floating diffusion (FD) 357, a reset transistor 358, an amplification transistor 359, and a selection transistor 360.

A fixed negative potential is supplied to each configuration of the luminance detection circuit 333 by the negative potential supply unit 64.

When turned on by a transfer signal TRG supplied to the gate, the transfer transistor 352 reads a signal charge generated by the photodiode 351 and transfers the signal charge to the FD 357.

When turned on by the transfer signal TRG supplied to the gate, the transfer transistor 354 reads a signal charge generated by the photodiode 353 and transfers the signal charge to the FD 357.

When turned on by the transfer signal TRG supplied to each gate, the transfer transistor 356 reads a signal charge generated by the photodiode 355 and transfers the signal charge to the FD 357.

The FD 357 holds the signal charge read from the photodiodes 351, 353, and 355.

When turned on by a reset signal RST, the reset transistor 358 causes the signal charge held in the FD 357 to discharge to a constant voltage source to reset a potential of the FD 357.

The amplification transistor 359 outputs a pixel signal according to the potential of the FD 357. That is, the amplification transistor 359 constitutes a source follower circuit along with a load MOS (not shown) as a constant current source, and outputs the pixel signal indicating a level according to the signal charge held in the FD 359 to the column ADC circuit 331 via the selection transistor 360.

When turned on by a selection signal SEL, the selection transistor 360 outputs a pixel signal to the column ADC circuit 331 via the VSL.

Note that, in the light receiving substrate 31, a p-well region where the event detection circuit 332 is formed and a p-well region where the luminance detection circuit 333 is formed are separated. As a result, it is possible to supply different negative potentials to each of the event detection circuit 332 and the luminance detection circuit 333 such that a negative potential according to the temperature is supplied to each configuration of the event detection circuit 332 and a fixed negative potential is supplied to each configuration of the luminance detection circuit 333.

Modification of Negative Potential Supply Unit and Negative Potential Controller FIG. 33 is a circuit diagram illustrating another configuration example of the negative potential supply unit 64 and the negative potential controller 65.

The negative potential supply unit 64 and the negative potential controller 65 are achieved by a negative potential circuit 401 in FIG. 33. The negative potential circuit 401 includes a replica pixel 411 and a negative power supply CP 412. The replica pixels 411 are provided as many as the number of pixels 91 provided in the solid-state imaging element 12.

The replica pixel 411 includes a current source that outputs a maximum current $I_{MAX}$, which is the same current as a photoelectric conversion current output in a case where a maximum amount of light is incident on the photodiode 121 of the pixel 91, and the replica pixel 411 includes the same circuit as the voltage-current conversion circuit 102. The output voltage obtained by logarithmically converting the current $I_{MAX}$ by the replica pixel 411 is supplied to a non-inverting input terminal of the negative power supply CP 412.

The negative power supply CP 412 compares the voltage supplied to the non-inverting input terminal with a maximum voltage $V_{MAX}$ supplied to an inverting input terminal, and supplies a negative potential according to the potential difference to the voltage-current conversion circuit 102 of the pixel 91.

In this way, the control of the negative potential according to the output voltage of the replica pixel 411 is performed for each pixel 91.

Figure 34:
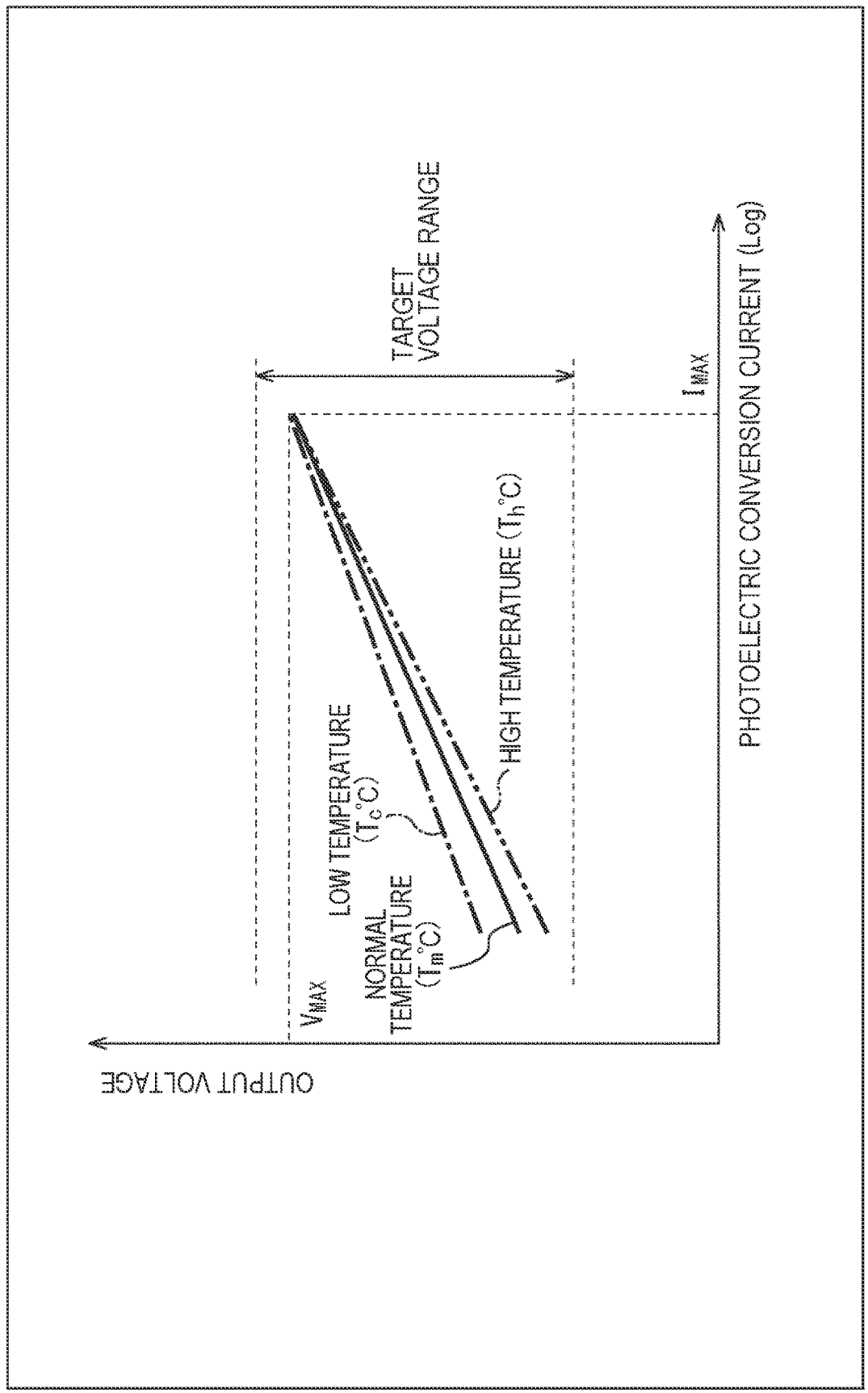
FIG. 34 is a diagram illustrating an example of an output voltage of a voltage-current conversion circuit in a case where a negative potential according to an output voltage of a replica pixel is supplied.

FIG. 34 is a diagram illustrating an example of the output voltage of the voltage-current conversion circuit 102 in a case where a negative potential according to the output voltage of the replica pixel 411 is supplied.

By supplying a negative potential according to the output voltage of the replica pixel 411 to the voltage-current conversion circuit 102, as illustrated in FIG. 34, an output voltage within the target voltage range can be output from the voltage-current conversion circuit 102 under any temperature condition with reference to the output voltage $V_{PR}$ (maximum voltage $V_{MAX}$) when the photoelectric conversion current is the maximum current $I_{MAX}$.

Since a negative potential is output in accordance with the result of comparison of the output voltage output from the replica pixel 411 and the maximum voltage $V_{MAX}$, the negative potential is a negative potential that corrects variation in the output voltage $V_{PR}$ due to the temperature of each transistor provided in the voltage-current conversion circuit 102 and corrects variation in the output voltage V due to skew variation. Therefore, by supplying a negative potential according to the output voltage of the replica pixel 411, it is possible to correct a temperature characteristic and the skew variation of the transistor provided in the voltage-current conversion circuit 102.

Note that, in the voltage-current conversion circuit 102, in a case where the output voltage when the photoelectric conversion current is the maximum current $I_{MAX}$ does not substantially depend on the temperature, the current output from the current source of the replica pixel 411 is desirably set as the maximum current $I_{MAX}$. A current having an intermediate value between a maximum value and a minimum value of the photoelectric conversion current output by the photodiode 121 may be output from the current source of the replica pixel 411.

Well Separation

Figure 35:
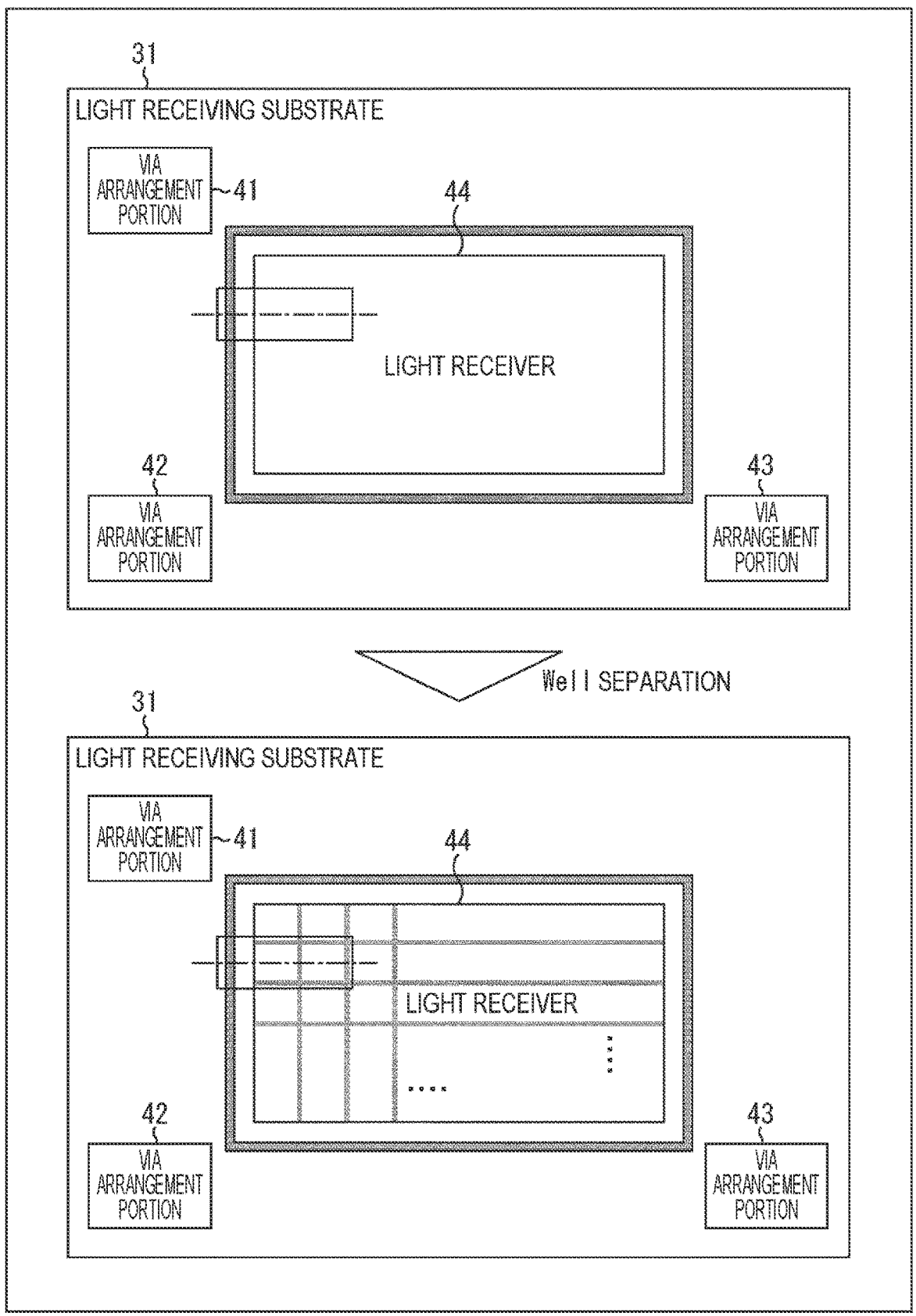
FIG. 35 is a diagram illustrating a configuration example of an electrode provided on the light receiving substrate.

FIG. 35 is a diagram illustrating a configuration example of an electrode provided on the light receiving substrate 31. FIG. 36 is an enlarged sectional view of a substrate of the light receiving circuit 51 of the light receiving substrate 31.

In the upper example in FIG. 35, in the light receiving substrate 31, an electrode that supplies a power supply voltage to an n-type substrate (nsub) region of the light receiving substrate 31 is provided so as to surround a periphery of the light receiver 44, for example, as illustrated with color.

The upper side of FIG. 36 illustrates a cross section of the light receiving substrate 31 on the upper side of FIG. 35 taken along an alternate long and short dash line on the light receiver 44. The plurality of light receiving circuits 51 of the light receiver 44 is formed in one p-well region 452 formed in the nsub region 451 of the light receiving substrate 31. In the p-well region 452, the photodiode 121 is embedded and a transistor 461 is formed.

A power supply voltage $V_{DD}$ is supplied to the nsub region 451 and the drain of the transistor 461, and a negative potential $V_n$ is supplied to the p-well region 452. By supplying the negative potential $V_n$ to the p-well region 452, the negative potential $V_n$ is supplied to the anodes of the photodiodes 121 and the back gates of the transistors 461 of the plurality of light receiving circuits 51.

In the lower example in FIG. 35, an electrode that supplies a power supply voltage to the nsub region of the light receiving substrate 31 is provided so as to surround the periphery of the light receiver 44 and to partition each of the light receiving circuits 51 of the light receiver 44 into a lattice pattern as illustrated with color.

The lower side of FIG. 36 illustrates a cross section of the light receiving substrate 31 on the lower side of FIG. 35 taken along an alternate long and short dash line on the light receiver 44. Each of the plurality of light receiving circuits 51 is formed in a p-well region 453 formed in the nsub region 451 of the light receiving substrate 31. In the p-well region 453, the photodiode 121 is embedded and the transistor 461 is formed.

The power supply voltage $V_{DD}$ is supplied to the nsub region 451 and the drain of the transistor 461. A negative potential $V_{n1}$ is supplied to the left p-well region 453 on the left side, and a negative potential $V_{n2}$ is supplied to the p-well region 453 on the right side.

By supplying the negative potential $V_{n1}$ to the p-well region 453 on the left side, the negative potential $V_{n1}$ is supplied to the anode of the photodiode 121 and the back gate of the transistor 461 of the light receiving circuit 51 formed in the p-well region. Furthermore, by supplying the negative potential $V_{n2}$ to the p-well region 453 on the right side, the negative potential $V_{n2}$ is supplied to the anode of the photodiode 121 and the back gate of the transistor 461 of the light receiving circuit 51 formed in the p-well region.

As described above, by separating the p-well region where each light receiving circuit 51 is formed, it is possible to supply different negative potentials for every light receiving circuit 51 to the photodiode 121 and the transistor 461 of each light receiving circuit 51.

Instead of separating the p-well region for every light receiving circuit 51, the p-well region may be separated for every configuration provided in the light receiving circuit 51. In this case, the negative potential supplied for every configuration formed in each p-well region is controlled.

Figure 37:
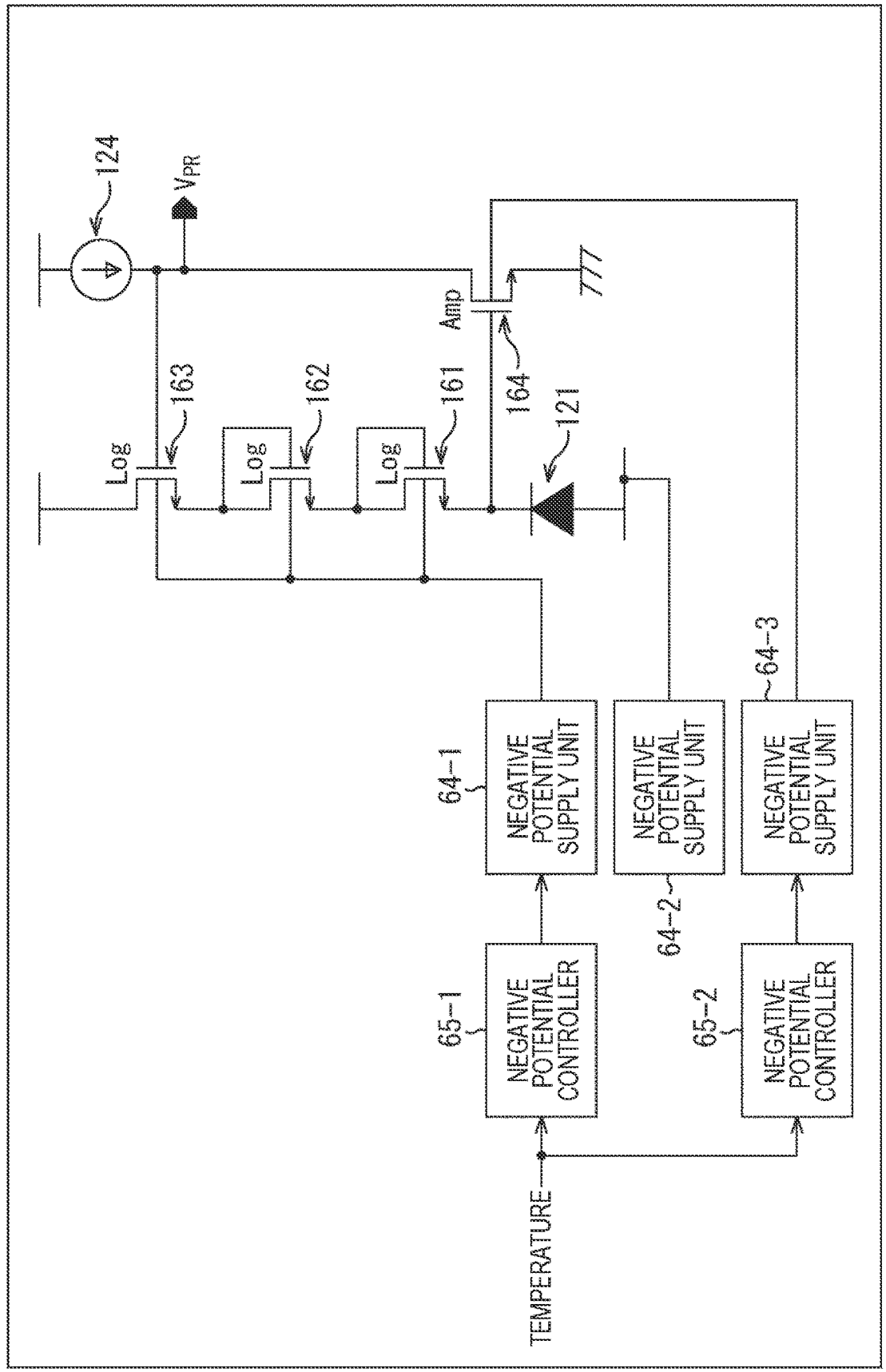
FIG. 37 is a diagram illustrating a configuration example of the negative potential supply unit and the negative potential controller in a case where a p-well region is separated for every configuration of the light receiving circuit.
Figure 38:
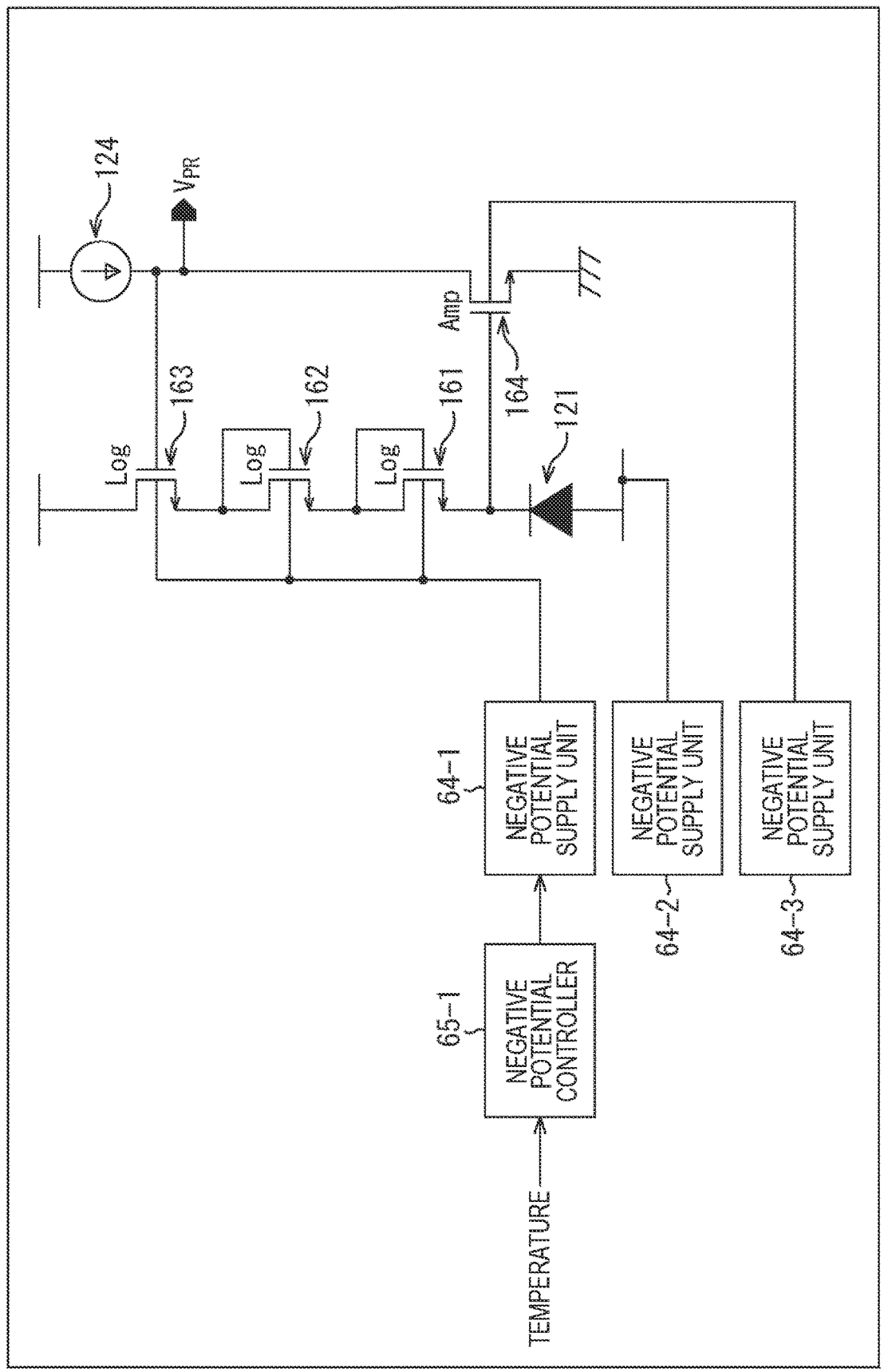
FIG. 38 is a diagram illustrating a configuration example of the negative potential supply unit and the negative potential controller in a case where the p-well region is separated for every configuration of the light receiving circuit.
Figure 39:
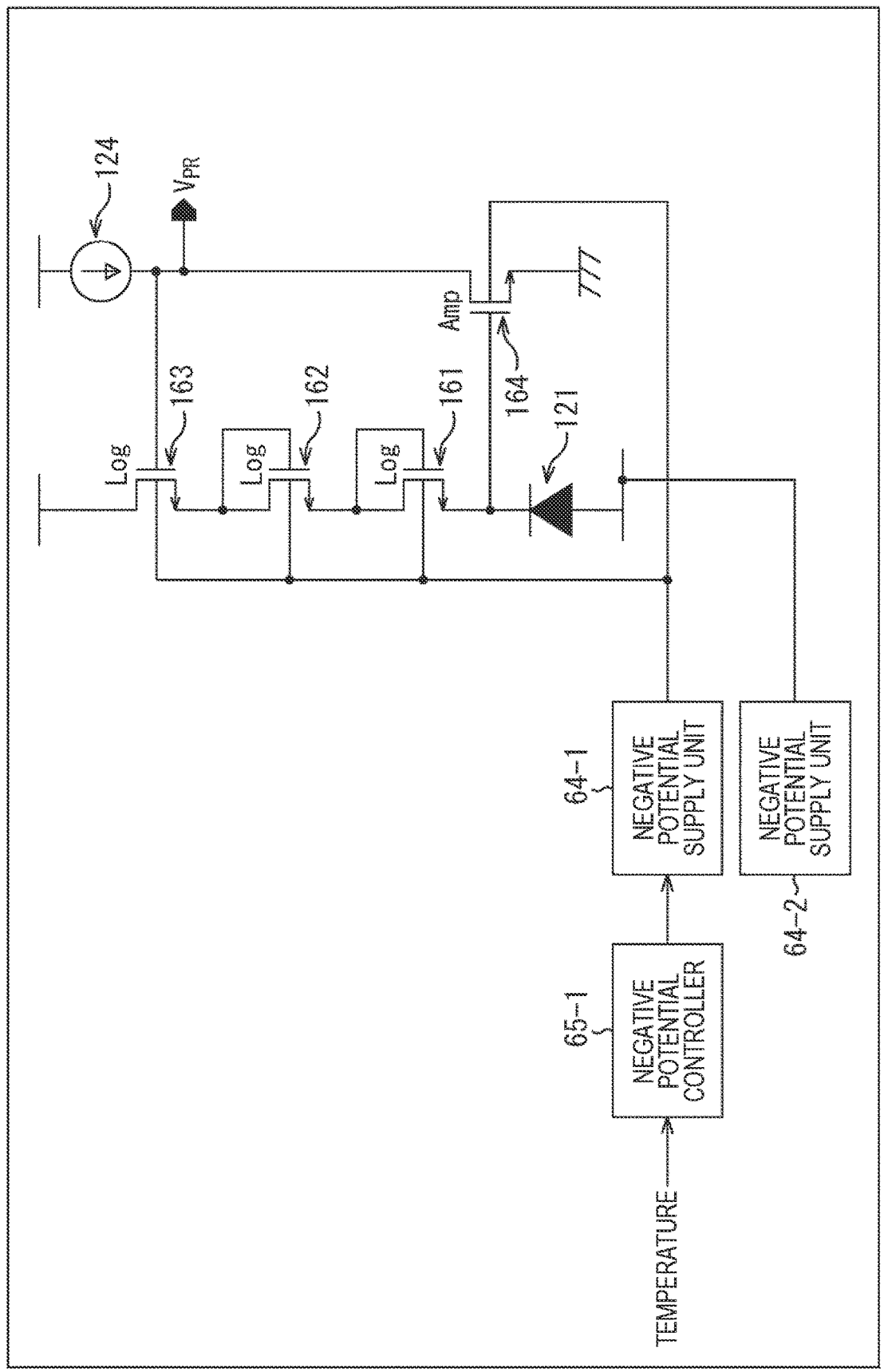
FIG. 39 is a diagram illustrating a configuration example of the negative potential supply unit and the negative potential controller in a case where the p-well region is separated for every configuration of the light receiving circuit.

FIGS. 37 to 39 are diagrams each illustrating a configuration example of the negative potential supply unit 64 and the negative potential controller 65 in a case where the p-well region is separated for every configuration of the light receiving circuit 51. In FIGS. 37 to 39, a case will be described where a negative potential is supplied to each configuration of the voltage-current conversion circuit 102 having the fifth configuration. However, in a case where the voltage-current conversion circuit 102 having any of the first to fourth configurations is provided, the negative potential control for every configuration can be also applied.

FIG. 37 illustrates a configuration example of the negative potential supply unit 64 and the negative potential controller 65 in a case where three p-well regions are formed separately, the three p-well regions including a p-well region in which the photodiode 121 is formed, a p-well region in which the Log transistors 161 to 163 are formed, and a p-well region in which the Amp transistor 164 is formed.

A negative potential controller 65-1 controls a negative potential supply unit 64-1 to supply a negative potential according to the temperature. The negative potential supply unit 64-1 also supplies a negative potential according to the temperature to the back gates of the Log transistors 161 to 163 under the control of the negative potential controller 65-1.

A negative potential supply unit 64-2 supplies a fixed negative potential or reference potential to the anode of the photodiode 121.

A negative potential controller 65-2 controls a negative potential supply unit 64-3 to supply a negative potential according to the temperature. The negative potential supply unit 64-3 also supplies a negative potential according to the temperature to the back gate of the Amp transistor 164 under the control of the negative potential controller 65-2.

FIG. 38 illustrates another configuration example of the negative potential supply unit 64 and the negative potential controller 65 in a case where the three p-well regions described with reference to FIG. 37 are separately formed. The configuration of the negative potential supply unit 64 and the negative potential controller 65 illustrated in FIG. 38 is different from the configuration illustrated in FIG. 37 in that the negative potential controller 65-2 is not provided.

The negative potential supply unit 64-3 supplies a fixed negative potential or reference potential to the back gate of the Amp transistor 164.

FIG. 39 illustrates a configuration example of the negative potential supply unit 64 and the negative potential controller 65 in a case where two p-well regions are formed separately, the two p-well regions including a p-well region in which the photodiode 121 is formed and a p-well region in which the Log transistors 161 to 163 and the Amp transistor 164 are formed.

A negative potential controller 65-1 controls a negative potential supply unit 64-1 to supply a negative potential according to the temperature. The negative potential supply unit 64-1 also supplies a negative potential according to the temperature to the back gates of the Log transistors 161 to 163 and the Amp transistor 164 under the control of the negative potential controller 65-1.

A negative potential supply unit 64-2 supplies a fixed negative potential or reference potential to the anode of the photodiode 121.

As described above, by separating the p-well region in which each configuration of the voltage-current conversion circuit 102 is formed and independently controlling the negative potential supplied to each p-well, fine tuning according to the characteristics of the photodiode and the transistor can be performed.

Application Example to Mobile Body

The technology (the present technology) of the present disclosure is applicable to various products. For example, the technology of the present disclosure may be implemented as a device mounted on any type of mobile bodies, such as an automobile, an electric car, a hybrid electric car, a motorcycle, a bicycle, personal mobility, an airplane, a drone, a ship, a robot, and the like.

Figure 40:
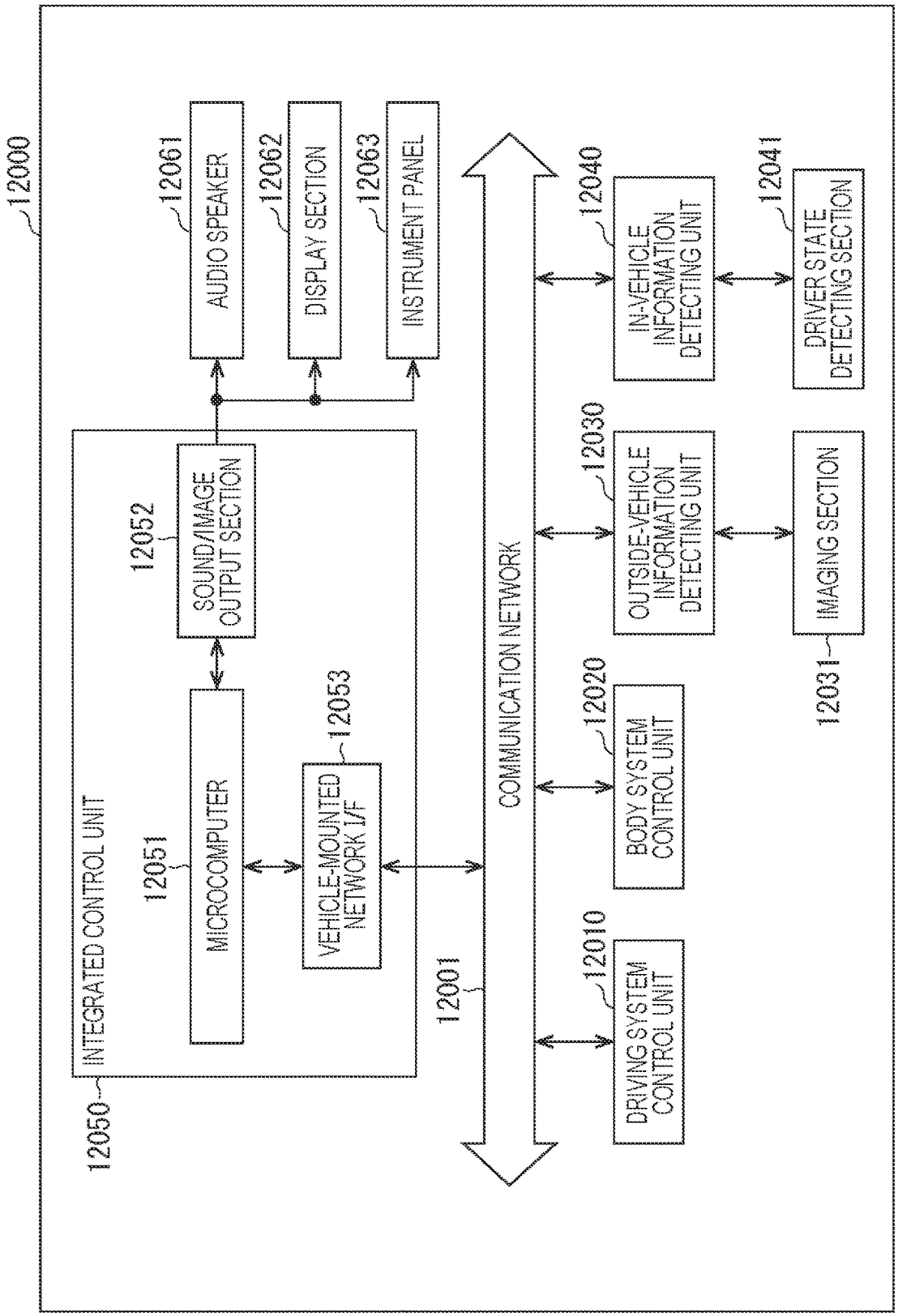
FIG. 40 is a block diagram illustrating an example of a schematic configuration of a vehicle control system.

FIG. 40 is a block diagram illustrating an example of a schematic configuration of a vehicle control system as an example of a mobile body control system to which the technology of the present disclosure can be applied.

The vehicle control system 12000 includes a plurality of electronic control units connected to each other via a communication network 12001. In the example illustrated in FIG. 40, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 40, an audio speaker 12061, a display section 12062, and an instrument panel 12063 are exemplified as the output device. The display section 12062 may, for example, include at least one of an on-board display and a head-up display.

Figure 41:
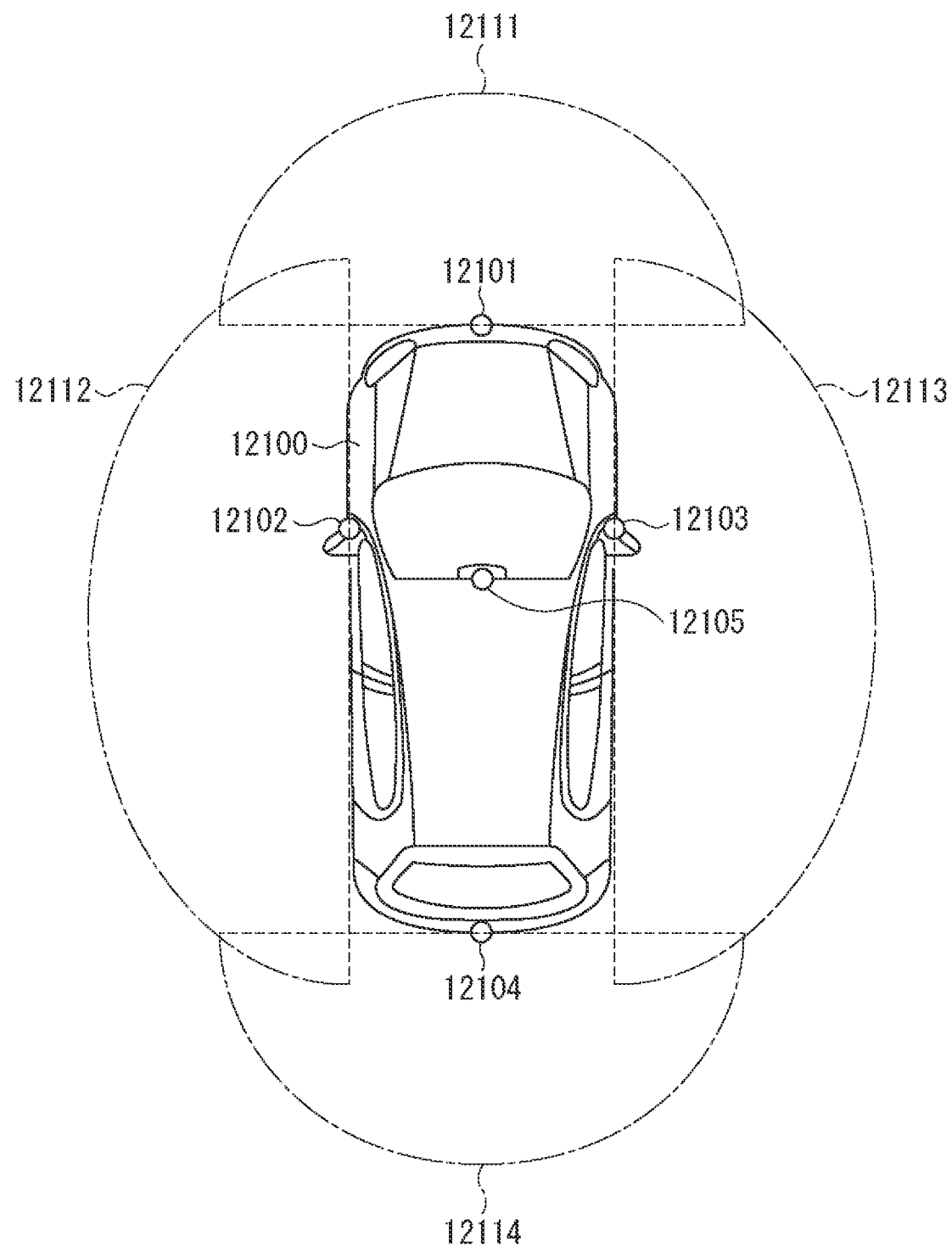
FIG. 41 is an explanatory diagram illustrating an example of installation positions of an outside-vehicle information detecting section and an imaging section.

FIG. 41 is a diagram illustrating an example of the installation position of the imaging section 12031.

In FIG. 41, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that, FIG. 41 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle.

In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology of the present disclosure can be applied has been described above. The technology of the present disclosure can be applied to, for example, the imaging section 12031 among the above-described configurations. Specifically, the imaging device 100 in FIG. 1 can be applied to the imaging section 12031 in FIG. 40. By applying the technology of the present disclosure to the imaging section 12031, a high-gain voltage-current conversion circuit can be achieved while ensuring a sufficient dynamic range, and the SNR of the pixel signal can be improved. Therefore, accuracy of image recognition or the like using the pixel signal can be improved.

Note that the effects described herein are merely examples and are not limited, and other effects may be provided.

The embodiment of the present technology is not limited to the above-described embodiment, and various modifications can be made without departing from the scope of the present technology.

Example of Combinations of Configurations

The present technology can also have the following configurations.

(1)
An event detection device including:
a photodiode that photoelectrically converts incident light and generates a photoelectric conversion current;
a conversion transistor that converts the photoelectric conversion current into a voltage and outputs the voltage from a gate;
an amplification transistor that amplifies a voltage between a gate having a potential according to the photoelectric conversion current and a source having a reference potential determined in advance and outputs the voltage from a drain;
a potential supply unit that supplies a predetermined potential lower than the reference potential to an anode of the photodiode, a back gate of the conversion transistor, and a back gate of the amplification transistor; and
a potential controller that controls the predetermined potential on the basis of information regarding a temperature affectable to a threshold voltage of at least one of the conversion transistor or the amplification transistor.

(2)
The event detection device according to (1), in which the potential controller controls the predetermined potential on the basis of information indicating a relationship between the temperature and the predetermined potential so as to cancel an influence of fluctuation of the threshold voltage due to the temperature.

(3)
The event detection device according to (2), in which the potential controller controls the predetermined potential so that a value of the predetermined potential decreases as the temperature increases.

(4)
The event detection device according to any of (1) to (3), in which the information regarding the temperature includes information regarding a temperature of a light receiving substrate on which the photodiode, the conversion transistor, and the amplification transistor are disposed.

(5)
The event detection device according to (1) or (4), in which the potential controller controls the predetermined potential on the basis of the information regarding the temperature and a skew variation of the conversion transistor and the amplification transistor.

(6)
The event detection device according to (5), in which the potential controller controls the predetermined potential on the basis of an output voltage of a circuit including a current source corresponding to the photodiode, the conversion transistor, and the amplification transistor.

(7)
The event detection device according to any of (1) to (6), in which a plurality of the conversion transistors and a plurality of the amplification transistors are provided.

(8)
The event detection device according to any of (1) to (7), further including:
a buffer that outputs a voltage signal output from the conversion transistor and the amplification transistor;
a subtractor that changes a level of the voltage signal output from the buffer; and
a comparator that compares the voltage signal whose level has changed with a predetermined threshold value.

(9)
The event detection device according to (8), in which at least a part of the buffer, the subtractor, and the comparator is disposed on a circuit substrate stacked on a light receiving substrate on which the photodiode, the conversion transistor, and the amplification transistor are disposed.

(10)
The event detection device according to (9), in which the potential supply unit and the potential controller are disposed at a position between a terminal unit provided on the circuit substrate and a detector in which at least a part of the buffer, the subtractor, and the comparator is disposed.

(11)
The event detection device according to (10), in which the comparator compares the voltage signal whose level has decreased with each of an upper limit threshold value and a lower limit threshold value, and outputs an event signal.

(12)
The event detection device according to any of (1) to (11), in which
the potential supply unit supplies a variable predetermined potential lower than the reference potential and according to the temperature to the conversion transistor, and supplies a fixed predetermined potential lower than the reference potential or the reference potential to the photodiode.

(13)
An event detection device including:
a photodiode that photoelectrically converts incident light and generates a photoelectric conversion current;
a first conversion transistor that converts the photoelectric conversion current into a voltage and outputs the voltage from a gate;
a second conversion transistor that has a drain short-circuited to a gate and converts the photoelectric conversion current to a voltage and outputs the voltage from a gate;
an amplification transistor that amplifies a voltage between a gate having a potential according to the photoelectric conversion current and a source having a reference potential determined in advance and outputs the voltage from a drain; and
a potential supply unit that supplies a predetermined potential lower than the reference potential to an anode of the photodiode, a back gate of the first conversion transistor, a back gate of the second conversion transistor, and a back gate of the amplification transistor.

(14)
The event detection device according to (13), further including
a potential controller that controls the predetermined potential on the basis of information regarding a temperature affectable to a threshold voltage of at least one of the first conversion transistor, the second conversion transistor, or the amplification transistor.

(15)
The event detection device according to (14), in which the potential controller controls the predetermined potential on the basis of information indicating a relationship between the temperature and the predetermined potential so as to cancel an influence of fluctuation of the threshold voltage due to the temperature.

(16)
The event detection device according to (14) or (15), in which
the information regarding the temperature includes information regarding a temperature of a light receiving substrate on which the photodiode, the first conversion transistor, the second conversion transistor, and the amplification transistor are disposed.

(17)
The event detection device according to any of (13) to (16), in which
a plurality of the second conversion transistors is provided.

(18)
The event detection device according to any of (13) to (17), further including:
a buffer that outputs a voltage signal output from the first conversion transistor, the second conversion transistor, and the amplification transistor;
a subtractor that changes a level of the voltage signal output from the buffer; and
a comparator that compares the voltage signal whose level has changed with a predetermined threshold value.

(19)
The event detection device according to (18), in which
at least a part of the buffer, the subtractor, and the comparator is disposed on a predetermined circuit substrate stacked on a light receiving substrate on which the photodiode, the first conversion transistor, the second conversion transistor, and the amplification transistor are disposed.

(20)
The event detection device according to (18) or (19), in which
the comparator compares the voltage signal whose level has decreased with each of an upper limit threshold value and a lower limit threshold value, and outputs an event signal.

REFERENCE SIGNS LIST

12 Solid-state imaging element
31 Light receiving substrate
32 Circuit substrate
41 to 43 Via arrangement portion
44 Light receiver
51 Light receiving circuit
61 to 63 Via arrangement portion
64 Negative potential supply unit
65 Negative potential controller
66 Address event detector
67 Row drive circuit
68 Column drive circuit
69 Signal processing circuit
81 Address event detection circuit
91 Pixel
92 Signal line
101 Light receiving element
102 Voltage-current conversion circuit
103 Buffer
104 Subtractor
105 Quantizer
106 Transfer circuit
121 Photodiode
122, 123 Log transistor
124 Constant current source
125, 126 Amp transistor
151 Log transistor
152 Amp transistor
161 to 163 Log transistor
164 Amp transistor
181 Thermometer ADC
182 Signal processor
183 Look-up table
191, 192 Resistance
193, 194 Variable resistance
195 Negative power supply CP
201 Temperature monitor
271, 272 Comparator
301 Log transistor 311 to 314 Terminal unit
411 Replica pixel
451 nsub region
452, 453 p-well region
461 Transistor

The invention claimed is:

1. An event detection device comprising:
a photodiode that photoelectrically converts incident light and generates a photoelectric conversion current;
a conversion transistor that converts the photoelectric conversion current into a voltage and outputs the voltage from a gate;
an amplification transistor that amplifies a voltage between a gate having a potential according to the photoelectric conversion current and a source having a reference potential determined in advance and outputs the voltage from a drain;
a potential supply unit that supplies a predetermined potential lower than the reference potential to an anode of the photodiode, a back gate of the conversion transistor, and a back gate of the amplification transistor; and
a potential controller that controls the predetermined potential on a basis of information regarding a temperature affectable to a threshold voltage of at least one of the conversion transistor or the amplification transistor.

2. The event detection device according to claim 1, wherein
the potential controller controls the predetermined potential on a basis of information indicating a relationship between the temperature and the predetermined potential so as to cancel an influence of fluctuation of the threshold voltage due to the temperature.

3. The event detection device according to claim 2, wherein
the potential controller controls the predetermined potential so that a value of the predetermined potential decreases as the temperature increases.

4. The event detection device according to claim 1, wherein
the information regarding the temperature includes information regarding a temperature of a light receiving substrate on which the photodiode, the conversion transistor, and the amplification transistor are disposed.

5. The event detection device according to claim 1, wherein
the potential controller controls the predetermined potential on a basis of the information regarding the temperature and a skew variation of the conversion transistor and the amplification transistor.

6. The event detection device according to claim 5, wherein
the potential controller controls the predetermined potential on a basis of an output voltage of a circuit including a current source corresponding to the photodiode, the conversion transistor, and the amplification transistor.

7. The event detection device according to claim 1, wherein
a plurality of the conversion transistors and a plurality of the amplification transistors are provided.

8. The event detection device according to claim 1, further comprising:
a buffer that outputs a voltage signal output from the conversion transistor and the amplification transistor;
a subtractor that changes a level of the voltage signal output from the buffer; and
a comparator that compares the voltage signal whose level has changed with a predetermined threshold value.

9. The event detection device according to claim 8, wherein
at least a part of the buffer, the subtractor, and the comparator is disposed on a circuit substrate stacked on a light receiving substrate on which the photodiode, the conversion transistor, and the amplification transistor are disposed.

10. The event detection device according to claim 9, wherein
the potential supply unit and the potential controller are disposed at a position between a terminal unit provided on the circuit substrate and a detector in which at least a part of the buffer, the subtractor, and the comparator is disposed.

11. The event detection device according to claim 10, wherein
the comparator compares the voltage signal whose level has decreased with each of an upper limit threshold value and a lower limit threshold value, and outputs an event signal.

12. The event detection device according to claim 1, wherein
the potential supply unit supplies a variable predetermined potential lower than the reference potential and according to the temperature to the conversion transistor, and supplies a fixed predetermined potential lower than the reference potential or the reference potential to the photodiode.

13. An event detection device comprising:
a photodiode that photoelectrically converts incident light and generates a photoelectric conversion current;
a first conversion transistor that converts the photoelectric conversion current into a voltage and outputs the voltage from a gate;
a second conversion transistor that has a drain short-circuited to a gate and converts the photoelectric conversion current to a voltage and outputs the voltage from a gate;
an amplification transistor that amplifies a voltage between a gate having a potential according to the photoelectric conversion current and a source having a reference potential determined in advance and outputs the voltage from a drain; and
a potential supply unit that supplies a predetermined potential lower than the reference potential to an anode of the photodiode, a back gate of the first conversion transistor, a back gate of the second conversion transistor, and a back gate of the amplification transistor.

14. The event detection device according to claim 13, further comprising
a potential controller that controls the predetermined potential on a basis of information regarding a temperature affectable to a threshold voltage of at least one of the first conversion transistor, the second conversion transistor, or the amplification transistor.

15. The event detection device according to claim 14, wherein
the potential controller controls the predetermined potential on a basis of information indicating a relationship between the temperature and the predetermined potential so as to cancel an influence of fluctuation of the threshold voltage due to the temperature.

16. The event detection device according to claim 14, wherein
the information regarding the temperature includes information regarding a temperature of a light receiving substrate on which the photodiode, the first conversion transistor, the second conversion transistor, and the amplification transistor are disposed.

17. The event detection device according to claim 13, wherein
a plurality of the second conversion transistors is provided.

18. The event detection device according to claim 13, further comprising:
a buffer that outputs a voltage signal output from the first conversion transistor, the second conversion transistor, and the amplification transistor;
a subtractor that changes a level of the voltage signal output from the buffer; and
a comparator that compares the voltage signal whose level has changed with a predetermined threshold value.

19. The event detection device according to claim 18, wherein
at least a part of the buffer, the subtractor, and the comparator is disposed on a predetermined circuit substrate stacked on a light receiving substrate on which the photodiode, the first conversion transistor, the second conversion transistor, and the amplification transistor are disposed.

20. The event detection device according to claim 18, wherein
the comparator compares the voltage signal whose level has decreased with each of an upper limit threshold value and a lower limit threshold value, and outputs an event signal.

\* \* \* \* \*